United States Patent
Al Majid et al.

(10) Patent No.: US 11,720,640 B2
(45) Date of Patent: *Aug. 8, 2023

(54) SEARCHING SOCIAL MEDIA CONTENT

(71) Applicant: Snap Inc., Santa Monica, CA (US)

(72) Inventors: Newar Husam Al Majid, New York, NY (US); Wisam Dakka, San Francisco, CA (US); Donald Giovannini, Venice, CA (US); Andre Madeira, Saratoga, CA (US); Andrei Damian, San Francisco, CA (US); Seyed Reza Mir Ghaderi, San Francisco, CA (US); Yaming Lin, Palo Alto, CA (US); Ranveer Kunal, San Francisco, CA (US); Congxing Cai, Mountain View, CA (US); Robson Araujo, Mountain View, CA (US); Guilherme Fernandes, Mountain View, CA (US); Jungho Ahn, Palo Alto, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/559,166

(22) Filed: Dec. 22, 2021

(65) Prior Publication Data

US 2022/0114221 A1    Apr. 14, 2022

Related U.S. Application Data

(63) Continuation of application No. 15/900,187, filed on Feb. 20, 2018, now Pat. No. 11,250,075.

(Continued)

(51) Int. Cl.
| G06F 16/951 | (2019.01) |
| G06Q 50/00  | (2012.01) |
| G06F 16/14  | (2019.01) |

(52) U.S. Cl.
CPC ............ *G06F 16/951* (2019.01); *G06F 16/14* (2019.01); *G06Q 50/01* (2013.01)

(58) Field of Classification Search
CPC ...... G06F 16/951; G06F 16/14; G06F 16/435; G06F 16/9536; G06F 16/9537; G06Q 50/01
See application file for complete search history.

(56) References Cited

U.S. PATENT DOCUMENTS

| 666,223 A   | 1/1901 | Shed     |
| 4,581,634 A | 4/1986 | Williams |

(Continued)

FOREIGN PATENT DOCUMENTS

| CA | 2887596 A1 | 7/2015 |
| EP | 2051480 A1 | 4/2009 |

(Continued)

OTHER PUBLICATIONS

"A Whole New Story", Snap, Inc., [Online] Retrieved from the Internet: <URL: https://www.snap.com/en-US/news/>, (2017), 13 pgs.

(Continued)

*Primary Examiner* — Albert M Phillips, III
(74) *Attorney, Agent, or Firm* — Schwegman Lundberg & Woessner, P.A.

(57) ABSTRACT

Various embodiments provide for systems, methods, and computer-readable storage media that improve media content search functionality and curation of media content. For instance, various embodiments described in this document provide features that can present media content items in the form of dynamic collection of media content items upon a user typing into a search bar. In another instance, various (Continued)

embodiments described herein improve media content search functionality by ranking user facing search features using input signals.

20 Claims, 53 Drawing Sheets

Related U.S. Application Data

(60) Provisional application No. 62/460,583, filed on Feb. 17, 2017, provisional application No. 62/460,549, filed on Feb. 17, 2017.

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kekkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |

(56) References Cited

U.S. PATENT DOCUMENTS

| | | |
|---|---|---|
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,661,069 B1 | 2/2014 | Cox et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B2 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 10,657,177 B1 | 5/2020 | Guo et al. |
| 10,725,993 B1 | 7/2020 | Sivasubramanian |
| 11,250,075 B1 | 2/2022 | Al Majid et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0093321 A1 | 5/2004 | Roustant et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |

(56) References Cited

U.S. PATENT DOCUMENTS

| | | |
|---|---|---|
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0021421 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0008971 A1 | 4/2009 | Wood et al. |
| 2009/0089678 A1 | 4/2009 | Sacco et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0001651 A1 | 6/2012 | Lalancette et al. |
| 2012/0143760 A1 | 6/2012 | Abulafia et al. |
| 2012/0150978 A1 | 6/2012 | Monaco |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |

(56) References Cited

U.S. PATENT DOCUMENTS

| | | |
|---|---|---|
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0339180 A1 | 12/2013 | Lapierre et al. |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280108 A1 | 9/2014 | Dunn et al. |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0193060 A1 | 7/2017 | Khanzode et al. |

(56) References Cited

U.S. PATENT DOCUMENTS

| | | | |
|---|---|---|---|
| 2017/0287006 | A1 | 10/2017 | Azmoodeh et al. |
| 2017/0359379 | A1 | 12/2017 | Elliot et al. |
| 2018/0034818 | A1 | 2/2018 | Choi et al. |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 15/900,187, 312 Amendment filed Dec. 16, 2021", 3 pgs.

"U.S. Appl. No. 15/900,187, Advisory Action dated Apr. 16, 2021", 3 pgs.

"U.S. Appl. No. 15/900,187, Corrected Notice of Allowability dated Oct. 8, 2021".

"U.S. Appl. No. 15/900,187, Examiner Interview Summary dated Oct. 20, 2020", 3 pgs.

"U.S. Appl. No. 15/900,187, Final Office Action dated Jan. 28, 2021", 21 pgs.

"U.S. Appl. No. 15/900,187, Non Final Office Action dated Jun. 1, 2021", 25 pgs.

"U.S. Appl. No. 15/900,187, Non Final Office Action dated Aug. 5, 2020", 22 pgs.

"U.S. Appl. No. 15/900,187, Notice of Allowance dated Sep. 17, 2021", 7 pgs.

"U.S. Appl. No. 15/900,187, Response filed Mar. 29, 2021 to Final Office Action dated Jan. 28, 2021", 12 pgs.

"U.S. Appl. No. 15/900,187, Response filed Aug. 30, 2021 to Non Final Office Action dated Jun. 1, 2021", 14 pages.

"U.S. Appl. No. 15/900,187, Response filed Oct. 30, 2020 to Non Final Office Action dated Aug. 5, 2020", 15 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (IOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell The Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report dated Sep. 29, 2015", 2 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-fiiters-and-big-fonts?utm_term=.bkQ9qVZWe#.nv58YXpkV>, (Dec. 22, 2013), 13 pgs.

Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.

U.S. Appl. No. 15/900,187, filed Feb. 20, 2018, Searching Social Media Content.

SEARCHING SOCIAL MEDIA CONTENT

RELATED APPLICATIONS

This application is a continuation of U.S. patent application Ser. No. 15/900,187, filed on Feb. 20, 2018, which claims the benefit of priority under 35 USC 119(e) of U.S. Provisional Patent Application Ser. No. 62/460,549, filed on Feb. 17, 2017, and U.S. Provisional Patent Application Ser. No. 62/460,583 filed on Feb. 17, 2017, the contents of each being incorporated herein by reference in their entireties.

BACKGROUND

There are several ways in which social networks can leverage searching for social media content (e.g., picture or video content). In addition to providing users a means for searching and filtering through social media content based on keywords (e.g., content relating to people, events and topics relevant to them), search features can permit a social network to create user views and dashboards, grouping of social media content, curation of media social media content, and extraction of topics from social media content.

BRIEF DESCRIPTION OF THE DRAWINGS

Various ones of the appended drawings merely illustrate some embodiments of the present disclosure and should not be considered as limiting its scope. The drawings are not necessarily drawn to scale. To easily identify the discussion of any particular element or act, the most significant digit or digits in a reference number refer to the figure number in which that element is first introduced, and like numerals may describe similar components in different views.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve media content (e.g., social media content) search functionality and curation of media content (e.g., social media content). For instance, various embodiments described in this document provide features that can present media content items in the form of dynamic collection of media content items (e.g., stories) upon a user clicking and typing into a search bar. In another instance, various embodiments described herein improve media content search functionality by ranking user facing search features using input signals.

Figure 1:
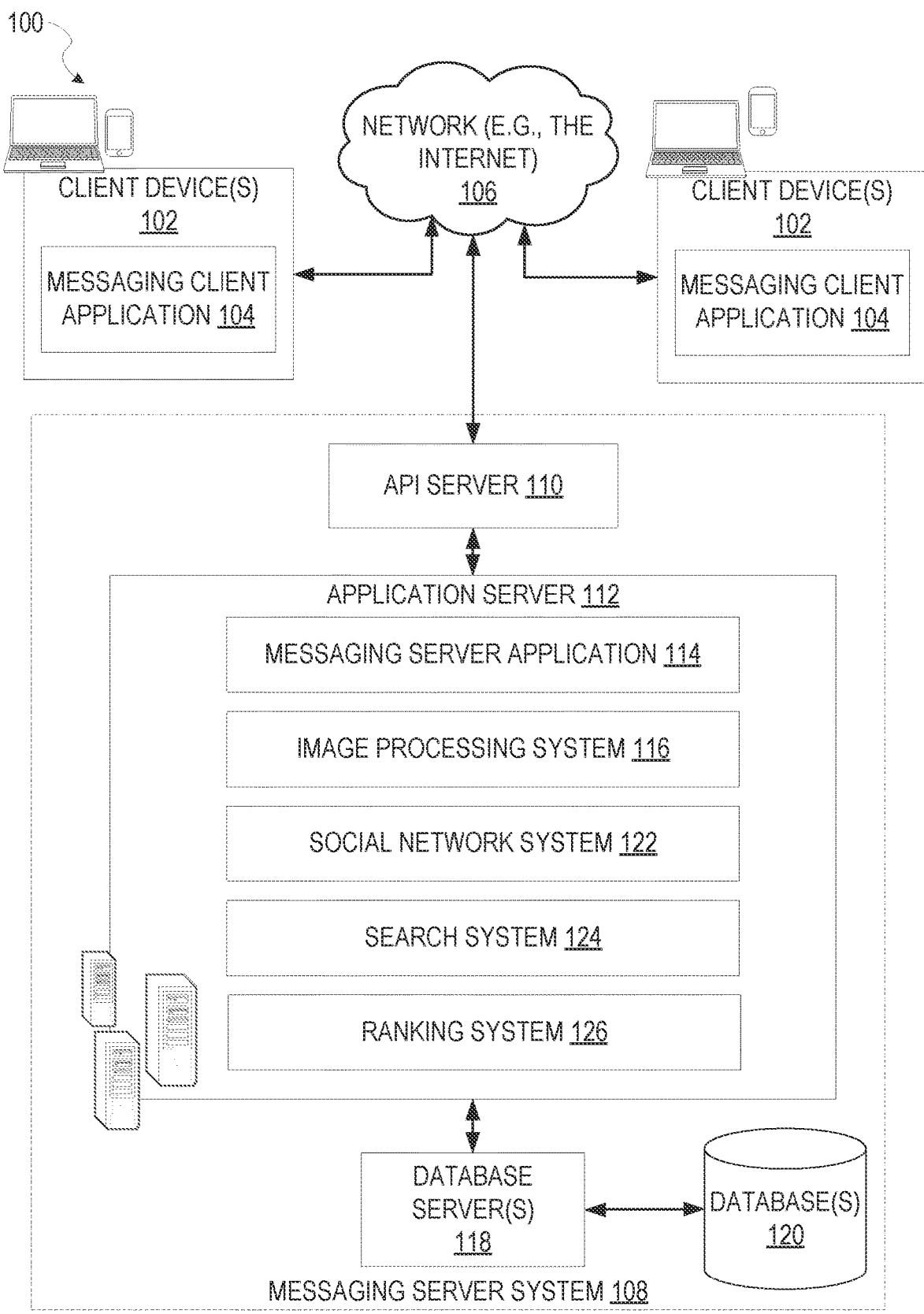
FIG. 1 is block diagram illustrating further details regarding a messaging system in accordance with some embodiments described in this document.

FIG. 1 is a block diagram showing an example of a messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used in this document, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In the example shown in FIG. 1, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 108 provides server-side functionality via the network 106 to a particular messaging client application 104. While certain functions of the messaging system 100 are described in this document as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of electronic media files (e.g., electronic images or video) from a messaging client application 104 to the messaging server application 114, and for possible access by another messaging client application 104, the setting of a collection of media content items (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, a search system 124, and a ranking system 126. The messaging server application 114 implements a number of message processing technologies and functions, particularly related to the aggregation and other processing of content (e.g., textual and multimedia content including images and video clips) included in messages received from multiple instances of the messaging client application 104. As will be described in further detail, the text and media content from multiple sources may be aggregated into collections of media content items (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to electronic images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, or any other wearable devices.

The search system 124 performs search operations on social media content as described and illustrated in this document.

According to various embodiments, a search feature presents the social media search results as cards that appear in a view of a graphical user interface ("user interface"). In particular, the search feature can comprise a pre-typing view, post-typing view, or both. The pre-typing view appears on a user interface in the absence of user parameters for executing a social media search (e.g., a search box displayed on the user interface is left blank), while a post-typing view appears on the user interface in the presence of a user parameter for executing a social media search (e.g., appears as soon as the user begins to enter characters of a search query into the search box). The user interface may be configured such that when the post-typing view appears, the pre-typing view is replaced by the post-typing view, and when the pre-typing view appears, the post-typing view is replaced by the post-typing view. Social media search results presented in the user interface may be consistent across different types of searches (e.g., camera, stories, chat, live stories, events, etc.).

The pre-typing view can comprise such views as: special occasion (birthdays, breaking news, etc.) cards view; an emoji carousel view; an enhanced quick chat carousel view; a topics carousel view; a live stories carousel view; an around me carousel view; media content item (e.g., a digital photo, image, video, etc.) tabs view that can include, for example, highlights, shows, sports, fashion, pets, attractions, and neighborhoods; a discover carousel view; user tabs view; or a combination thereof. The pre-typing goal can, for example, facilitate quick access to best friends on the social network, and access to the best social media relating to (e.g., media content items from) popular topics, events, and places.

As used herein, a snap may comprise a user-captured or user-enhanced (e.g., text, visual effects, etc.) digital photo or video. As also used herein, a story or a gallery is a collection of media content items.

The post-typing view can comprise such views as: a search-as-you-type view; a hero card best matching query view; a view showing the result set based on disambiguation of a query; a view for more stories for hero card; a related searches view; a related people view; or some combination thereof. The pre-typing goal can, for example: bucket the best social media (e.g., media content items) into the Hero card; surface Hero cards as quickly as possible while typing; focus on good experiences within core verticals (specific places, people, topics, broad places, events, and categories); and provide a path to more results/similar searches if available.

The ranking system 126 performs search operations on social media content as described and illustrated in this document.

According to various embodiments, ranking social media content as described in this document can be utilized with: dynamic story generation; emoji carousel generation; topics generation and ranking; live stories ranking; post-type search results; around me carousel generation; media content item tabs table generation; more stories section generation; related search section generation; query suggestion; breaking news section generation; people searching; related people section generation, and spam and abuse moderation.

Inputs that might be utilized by the ranking include, without limitation: bucketed friend count; bucketed follower count; number of media content items (e.g., snaps) sent over a period of time (e.g., last 28 days); number of media content items received over a period of time (e.g., last 28 days); number of stories posted over a period of time (e.g., last 28 days); total number of views for stories posted over a period of time (e.g., last 28 days); total time of views for stories posted over a period of time (e.g., last 28 days); bucketed number of days since account creation; location of the media content item; time of the media content item; caption of the media content item; whether a media content item is a taken using the front-facing camera; and visual labels associated with the media content item; story telling score of the media content item; creative quality score of a media content item; and media quality signals.

The visual labels associated with a media content item comprises a list of labels/annotations describing the objects in the media content item (e.g., both images and videos) using the trained visual annotation model. The story telling score of the media content item comprises a score (e.g., between 0, 1) that is assigned to each media content item. The score may be a function of: number of media content items from other users posted around the time and location of the media content item; number of media content items from the same user posted around the time and location of the media content item; the descriptiveness of the media content item (e.g., whether it is a video and whether it has caption); and the visual representativeness of media content item given the media content items coming from the same location. The creative quality score of a media content item comprises a score (e.g., between 0 and 1) that is a function of the normalized view time per view on a user's "Recent Updates" media content items combined with the total number of views on the user's "Recent Updates" media content items. All "Recent Updates" stats may be computed based on a period of time (e.g., last 28 days of data). The media quality signals may comprise image media content items and video media content items. For image media content item, the media quality signals are the normalized mean of a media content item's gray scaled pixel values, the entropy of a media content item's gray scaled pixels, and the size of the media content item (in bytes). For video media content items, the media quality signals are the percentage of traceable key point features across video frames, the percentage of differences in pixel values in consecutive frames, and the percentage of spikes of differences in pixel values in consecutive frames.

Figure 39:
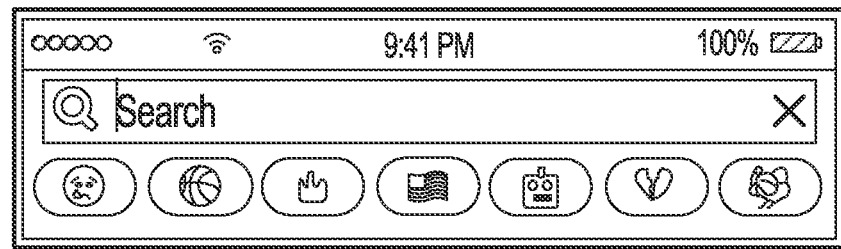
FIGS. 39 through 43 are screenshots illustrating example graphical user interfaces each of which presents a pre-typing view in accordance with some embodiments described in this document.

For some embodiments, dynamic stories are algorithmically-generated stories built from media content items submitted to in real-time. This may be accomplished over multiple stages, as illustrated by FIG. 39.

Figure 2:
FIGS. 2, 3A, and 3B are screenshots of example graphical user interfaces, each of which presents a pre-typing view in accordance with some embodiments described in this document.

FIG. 2 is a screenshot of an example graphical user interface that presents a pre-typing view in accordance with some embodiments described in this document. As shown, the pre-typing view includes sections for quick chat, groups, new friends, quick add, and contacts. One or more of these sections can be populated by way of a search feature described in this document, whereby a given section presents a group of cards that are based on the results of a social media search performed in connection the section. A given section can also comprise logic that determines in what order the cards are ranked and listed.

For instance, the logic for the quick chat section can rank results by: best friends; recent conversations (e.g., media content item or chat interactions, exclude new friends with no interactions); and bi-directional friendships. In the quick chat section, a user can tap on a card to enter a chat, double-tap on a card to media content item, or press and hold a card for a mini profile for the user represented by the card.

The logic for the new friends section can list results by most recent new friends added by the user (e.g., newest friend at top). This section can include my most recent two-way friends that the user has made within the last 30, and if there are fewer than 5 friends made within the last 30 days, include up to 5 of the most recent friends made from beyond 30 days.

The logic for the quick add section can list people that the user may likely want to quickly add as friends, and may list the people according to a rank (e.g., most likely to least likely).

The logic for the contacts section can list other users that are correspond to contacts in a user's address book (e.g., an address book local to the user device but external to the social network client on the user device). Below the other users in the address book, the user may see people in the user's address book who they can invite to the social network platform. If a user does not have any people in his or her address book, he or she may not see the contacts section.

Figure 3A:
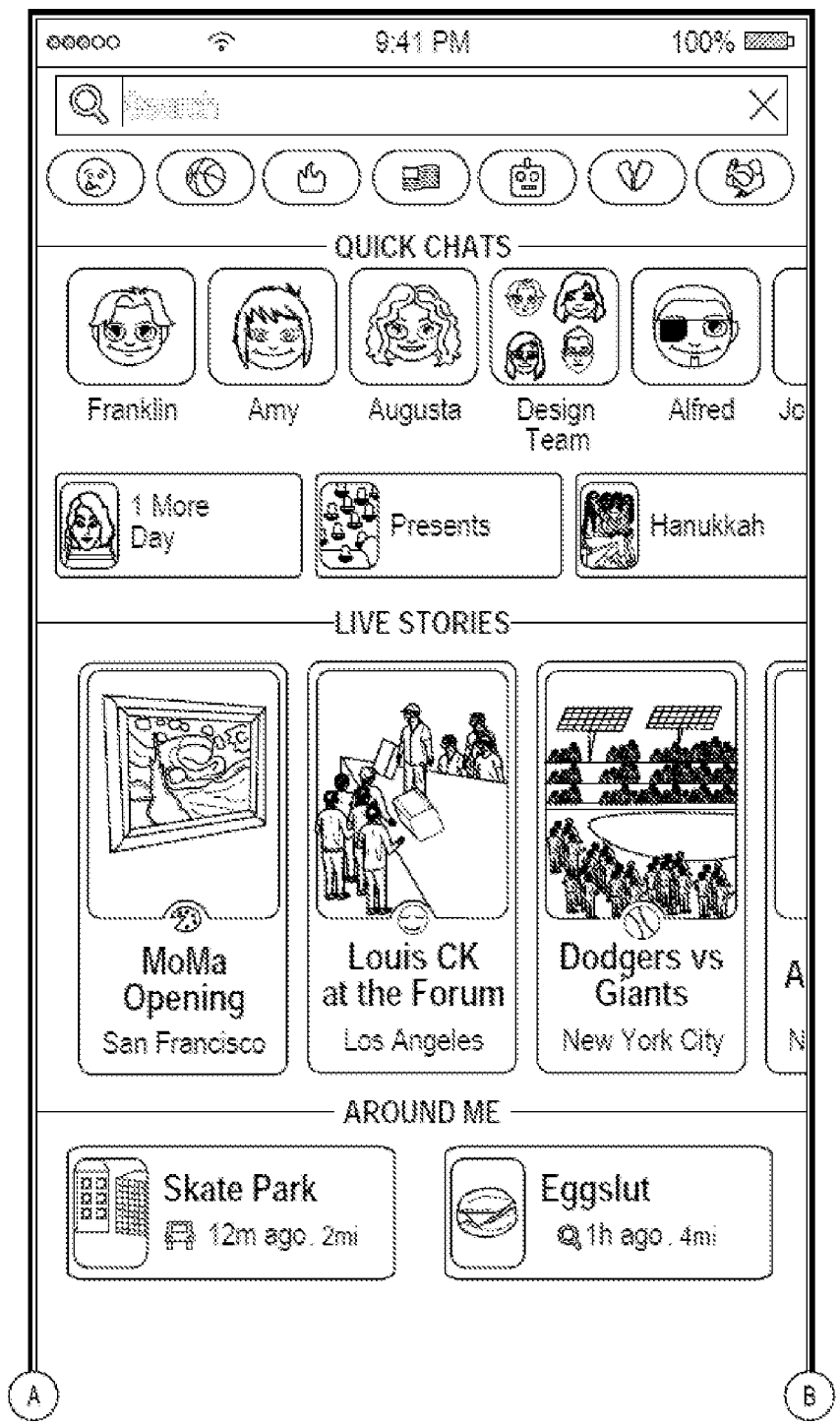
Figure 3B:

FIGS. 3A and 3B is a screenshot of an example graphical user interface that presents a pre-typing view in accordance with some embodiments described in this document. The pre-typing view includes: a special occasion (birthdays, breaking news, etc.) cards section; an emoji carousel section; an enhanced quick chat carousel section; a topics carousel section; a live stories carousel section; an around me carousel section; media content item tabs section includes last night, highlights, sports, and pets; a discover carousel section; and user tabs section.

Figure 4:
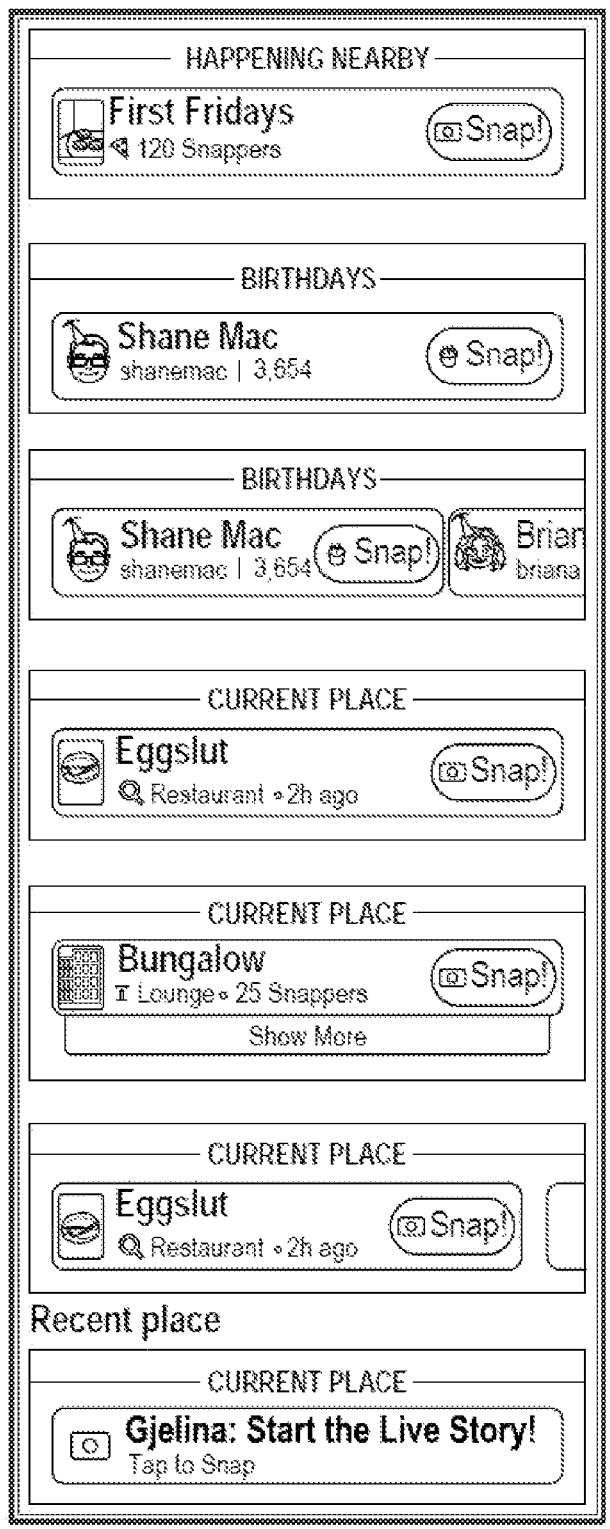
FIGS. 4-12 are screenshots of example graphical user interfaces that each present a section of a pre-typing view in accordance with some embodiments described in this document.

FIGS. 4-12 are screenshots of example graphical user interfaces, each of which presents a section of a pre-typing view in accordance with some embodiments described in this document. In particular, FIG. 4 presents screenshots relating to a special occasions section of a pre-typing view, which includes things happening nearby, birthdays, and things happening at your current place.

Figure 5:
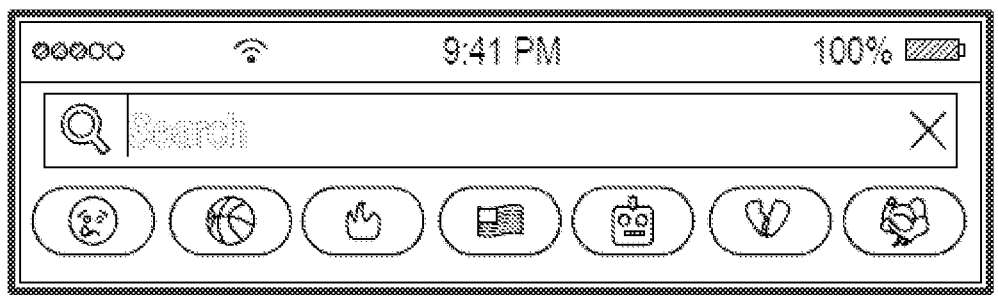

FIG. 5 presents a screenshot relating to an emoji shortcuts section, which comprises of a horizontal scroll of emojis in pills that, after selection (e.g., user finger tap), take a user into a search experience as if they had typed the word that is associated with that emoji. The listing of emoji pills can be presented as a carousel such that a user can swipe in one direction and loop back to the opposite end of the listing. This may be accomplished by an associated word being entered into the search box when an emoji is tapped by the user. Examples of emoji-word association include, without limitation: a tongue with the word "restaurants"; dolphin with the word "dolphin"; a Japanese flag with the word japan"; a basketball with the word "nba"; statue of liberty with the word "new york"; a drink with the word "bars"; and a table tennis paddle with the word "table tennis." Example types of emoji shortcuts include, without limitation, locations (e.g., "Japan", "New York"), categories (e.g., "Bars" and "Restaurants"), topics (e.g., "dolphin" and "table tennis"); and events.

Figure 6:
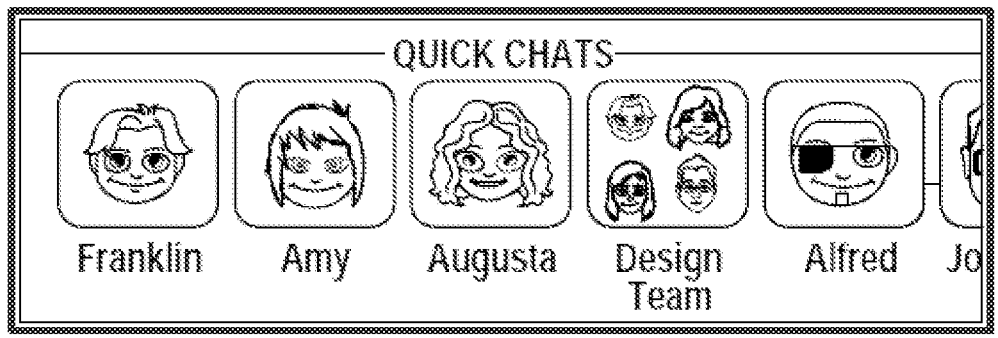

FIG. 6 presents a screenshot relating to a quick chat section, which lists people that the user may likely want to quickly add as friends. The illustrated user interface permits a user to horizontally scroll through the listing of people and permit the user to chat with a listed person by selecting (e.g., tapping) on a graphic representing the listed person. The listing can be presented as a carousel such that a user can swipe in one direction and loop back to the opposite end of the listing.

Figure 7:
Figure 7:
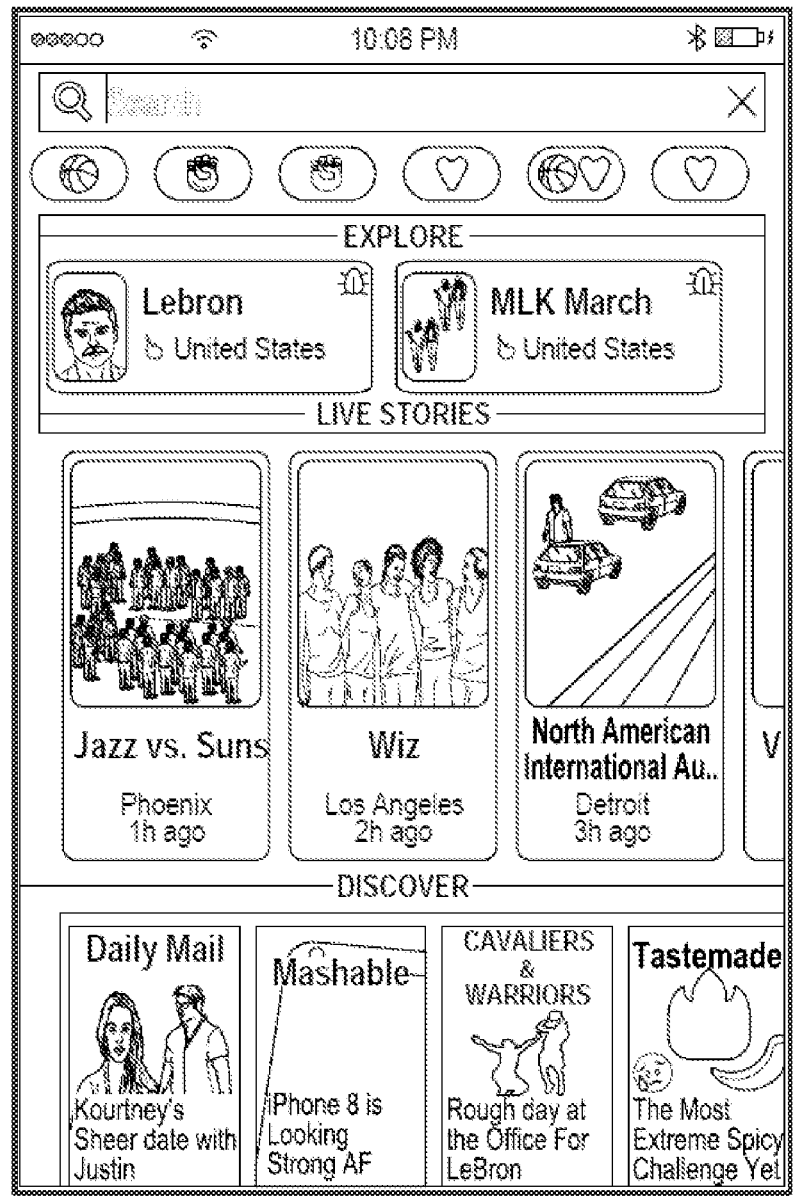

FIG. 7 presents screenshots relating to a topics section, which lists social media content (e.g., stories) based on a rank, such as a user relevance (e.g., user's region or past viewing interests). The illustrated user interface permits a user to horizontally scroll through the listing of social media content and permit the user to view or open specific content by selecting (e.g., tapping) on the graphic (e.g., card) representing the specific content. The listing can be presented as a carousel such that a user can swipe in one direction and loop back to the opposite end of the listing.

Figure 8:

FIG. 8 presents screenshots relating to a live stories section, which presents a personalized list of social media content (e.g., top geo-based clusters from all over the world) that relating to live stories (e.g., concerts, sports, cultural events current occurring). The illustrated user interface permits a user to horizontally scroll through the listing of social media content and permit the user to permit the user to view or open specific content by selecting (e.g., tapping) on the graphic (e.g., card) representing the specific content. The listing can be presented as a carousel such that a user can swipe in one direction and loop back to the opposite end of the listing. The items listed may be order according to a ranking, which may for example be based on freshness (e.g., most recent first), quality, and locality of content relative to the user (e.g., list local content first). As also shown, the graphics representing each social media content item listed includes an emoji to represent a classification for the content (e.g., emoji representing the type of content listed). The emoji presented for a particular listed item may be algorithmically generated or may be curated. If there is no established classifying emoji for the type of content presented by a listed item, a default emoji may be utilized for the listed item.

Figure 9:
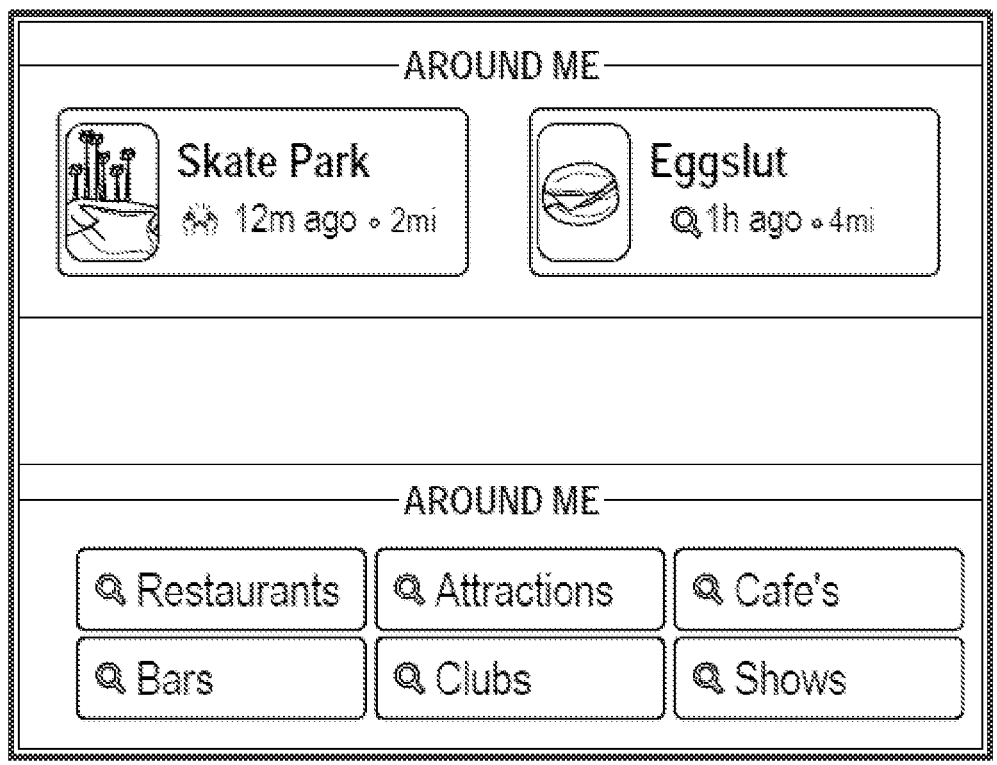

FIG. 9 presents screenshots relating to an around me section, which lists social media content according to its relation to the current location of the user. For instance, the social media content may relate to local fresh events, local popular business establishments, or local online discussions (e.g., local chatter). The illustrated user interface permits a user to horizontally scroll through the listing of social media content and permit the user to permit the user to view or open specific content by selecting (e.g., tapping) on the graphic (e.g., card) representing the specific content. The listing can be presented as a carousel such that a user can swipe in one direction and loop back to the opposite end of the listing. If there are no good listings of social media content (e.g., clusters) relating to the current location of the user (e.g., their neighborhood), then the section may present a listing of social media content based on a wider geographic region (e.g., city) relative to the user's current location. If there are no good listings of social media content relating to the wider geographic region (e.g., city) and an even wider geographic search parameter would surpass a given threshold (e.g., distance or county), the section may be hidden entirely. As shown, at the end of listing of social media content, the section presents a listing of suggestions for search categories, which when selected (e.g., user finger tap) can lead to a full search as if the user had typed the word into the search box.

Figure 10A:
Figure 10B:

FIGS. 10A and 10B presents screenshots relating to a tab section, which lists different listings of social media content as tabbed subsections, with each tabbed subsection representing a different social media content category. The example tabbed subsections shown include: neighborhood tab for social media content relating to a neighborhood associated or local to the user (e.g., neighborhood content that is relatively fresh from the last 2-6 hours); a highlights tab for popular or trending social media content (e.g., top stories in a user's region from the past 24 hours or longer if there isn't much content in the past 24 hours); a sports tab for sports-related social media content (e.g., sports events happening in the user's country or globally, with local content being prioritized first); a pets tab for social media content relating to pets (e.g., dogs or cats); a fashion tab for social media content relating to fashion (e.g., fashion events happening in the user's country or globally, with local content being prioritized first); an attractions tab for social media relating to current or local attractions; a shows tab for social media content relating to concerts (e.g., concerts happening in the user's country or globally, with local content being prioritized first); a breaking now tab for the most recent social media content, and a concert tab for concert-related social media content. The illustrated user interface permits a user to horizontally scroll through the listing of tabbed subsections and permit the user to permit the user to view a specific tabbed subsection by selecting (e.g., tapping) on the label representing the specific tabbed subsection. The listing can be presented as a carousel such that a user can swipe in one direction and loop back to the opposite end of the listing. The listing of social media content for a given tabbed subsection is presented vertically, thereby permitting the user to vertically scroll through the listing and select a listed social media content item.

The set of tabbed subsections presented to the user may be static, dynamic, or a combination of both. For instance, the tabbed subsections may be dynamic such that a user does not always see the same ordering or default tabbed subsections when they horizontally scroll through the tabs. The ordering may change depending on context, so for example if it is the weekend, a "Parties" tabbed subsection may be presented and include social media content relating to upcoming, on-going, or recent parties. The neighborhood tab may be presented if a user is in a metro area that is large enough to have neighborhoods (e.g., Los Angeles or New York). The attractions tab may be presented if a user is in a region that is large enough to have local attractions.

Figure 11:
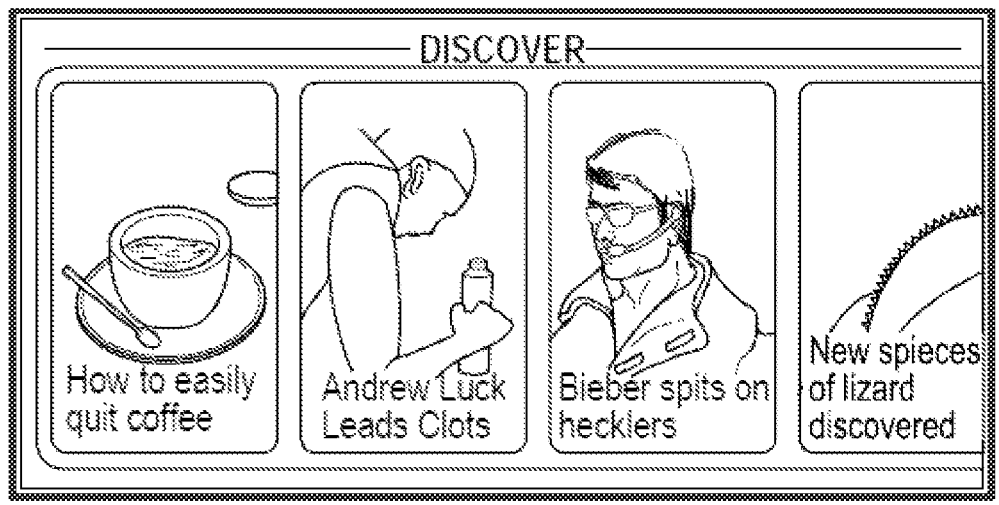

FIG. 11 presents screenshots relating to a discover section, which lists of social media content that is featured, or sponsored/provided by a third-party (e.g., blog, news agency, publisher, company, etc.). The illustrated user interface permits a user to horizontally scroll through the listing of social media content and permit the user to permit the user to view or open specific content by selecting (e.g., tapping) on the graphic (e.g., card) representing the specific content. The listing can be presented as a carousel such that a user can swipe in one direction and loop back to the opposite end of the listing. The items listed may be order according to a ranking, which may for example be based on freshness (e.g., most recent first), quality, and locality of content relative to the user (e.g., list local content first).

Figure 12:
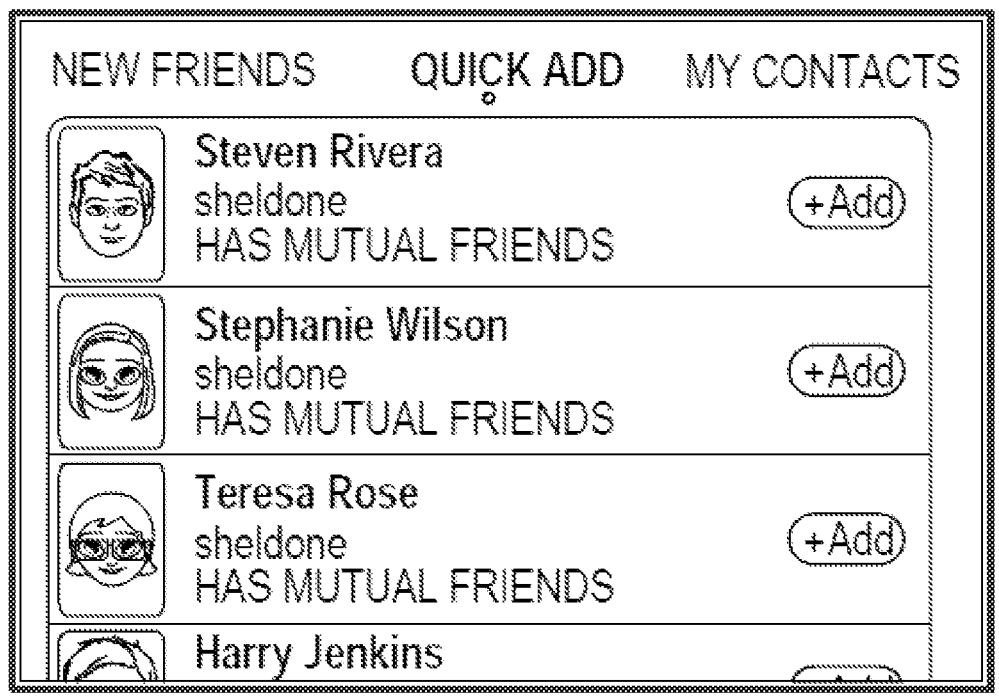

FIG. 12 presents screenshots relating to a friend tab section, which lists different listings of social network users as tabbed subsections. The example tabbed subsections shown include: new friends; quick add; and my contacts. Each of these tabbed subsections can be respectively similar to the new friends, quick add, and contacts sections described above with respect to FIG. 2. The illustrated user interface permits a user to horizontally scroll through the listing of tabbed subsections and permit the user to permit the user to view a specific tabbed subsection by selecting (e.g., tapping) on the label representing the specific tabbed subsection. The listing can be presented as a carousel such that a user can swipe in one direction and loop back to the opposite end of the listing.

Figure 13:
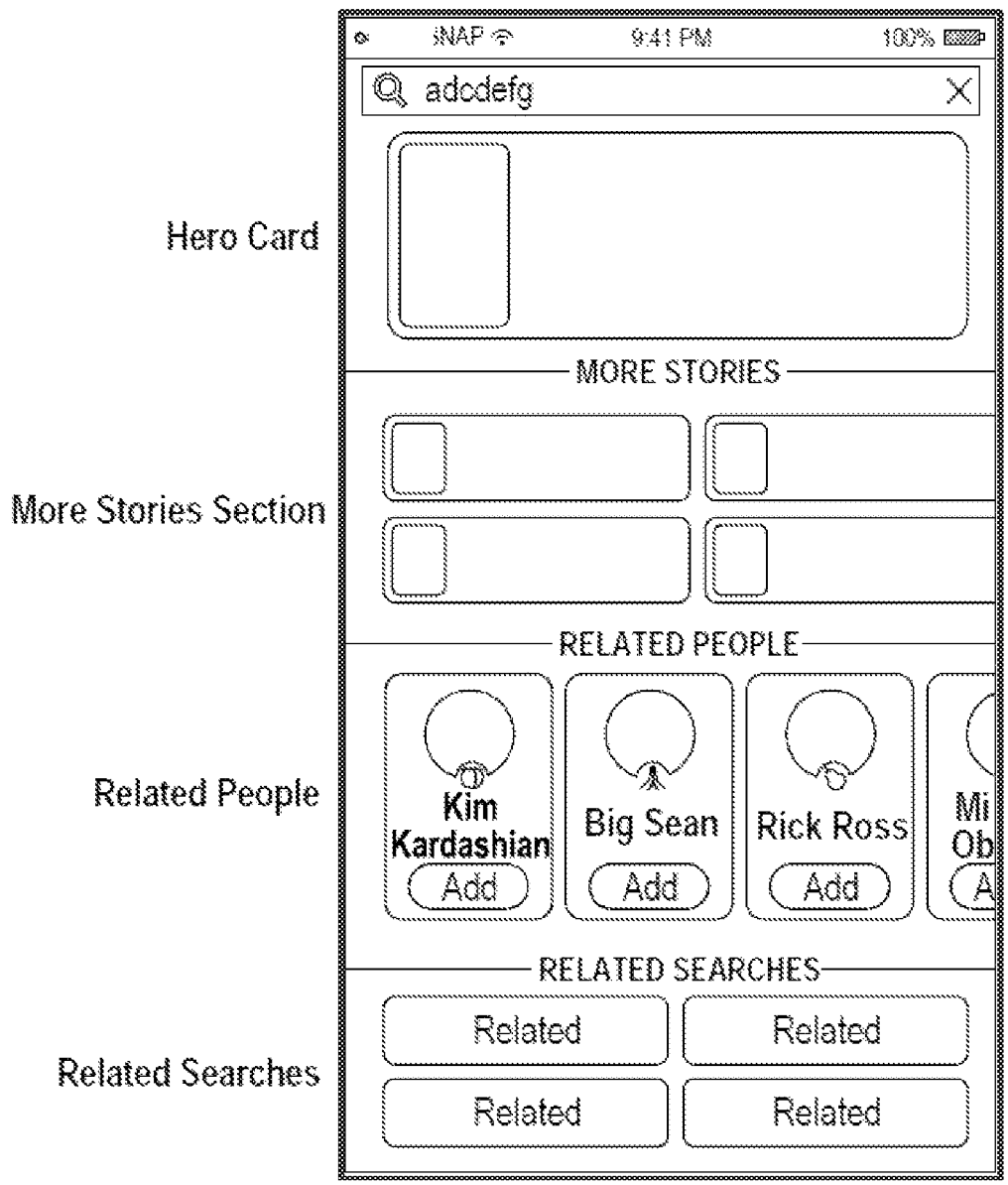
FIGS. 13-15 are screenshots of example graphical user interfaces that each present a section of a post-typing view in accordance with some embodiments described in this document.

FIG. 13 is a screenshot of an example graphical user interface that presents a post-typing view in accordance with some embodiments described in this document. As noted in this document, the post-typing view appears on the user interface in the presence of a user parameter for executing a social media search. For instance, the post-typing view appears as soon as the user begins to enter characters of a search query (e.g., keyword or search string) into the search box. For a given search query provided by the user, the hero card presents the user with the results for the given search query, which includes a listing of social media content that best matches the given search query. Freshness of the social media content can be used to filter social media content included in the listing, and can be used to order the social media content. The more stories section presents the user with a listing of social media content (e.g., stories) that is directly or indirectly related to the results of the search query, which the section can present according to topic, date and time, events, or co-occurrence. For instance, with respect to indirectly related social media content, the more stories section can present the user with best results from at least one related search (e.g., performed by the user or another user). The related people section presents the user with a listing of other users that are similar or related to the results of the search query. The related searches section presents the user with the results of similar searches, and can include rich content and additional more stories sections.

Figure 14:
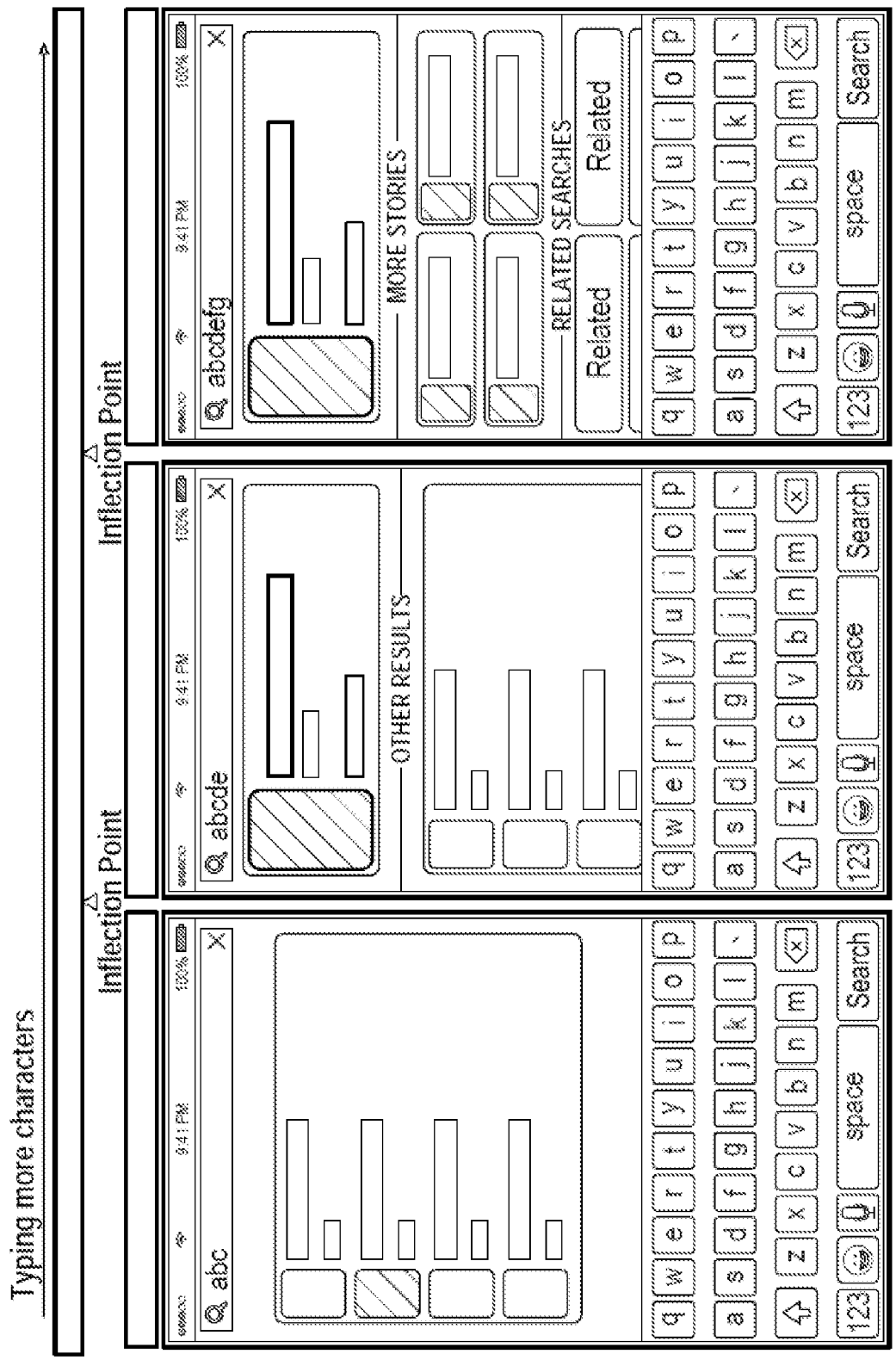

FIG. 14 are screenshots of an example graphical user interface that present a post-typing view in accordance with some embodiments described in this document. In particular, FIG. 14 illustrates an example of how the results of a search query presented to the user are dynamically updated as a user types in more characters into the search box. In FIG. 14, the user interface can breaks/separates out the best results as the user updates the search query and as the updated search query results in a higher confidence level in the search (illustrated in FIG. 14 by the inflection point). In this way, as the user focuses the search query by adding more characters to the search string, the search function can achieve disambiguation.

Starting from the left screenshot in FIG. 14, the user has typed in the search string of "abc" and top results for that search query are presented to the user. As the user adds more characters ("de") to the search string (see middle screenshot), a first subset of top results is broken out/separated from original set of results based on the most recent update to the search string (e.g., more specific search string). As the user further adds more characters ("fg") to the search string (see right screenshot), a second subset of top results is broken out/separated from the first subset of results based on the most recent update to the search string. As shown, when a subset of top results is presented to the user, the remaining subset of the results may also be presented as a separate grouping (e.g., subset of top results presented above and separate from the remaining subset).

Figure 15:
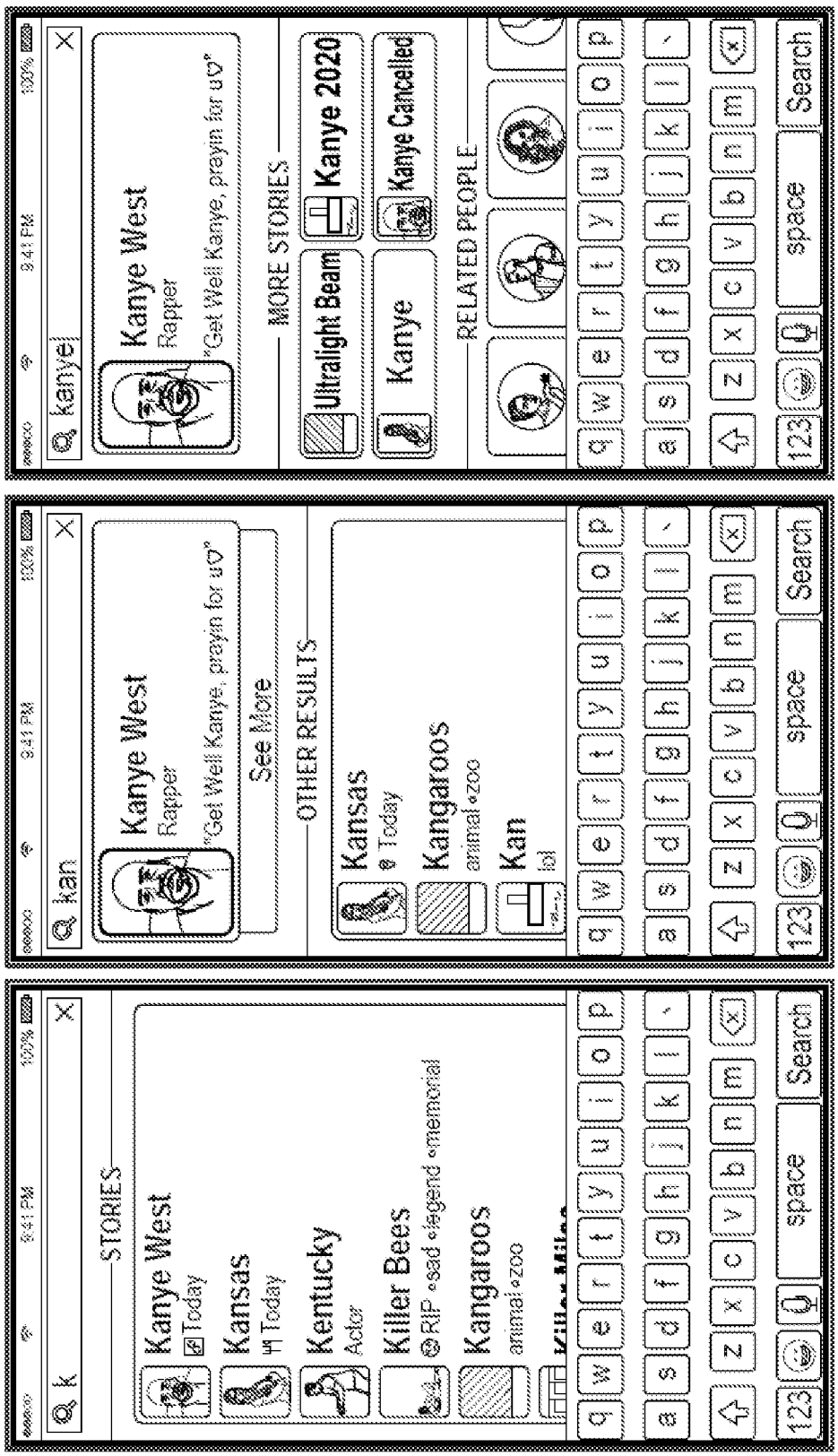

FIG. 15 are screenshots of an example graphical user interface that presents a post-typing view in accordance with some embodiments described in this document. Similar to FIG. 14, 15 illustrates an example of how the results of a search query presented to the user are dynamically updated as a user types in more characters into the search box. Starting from the left screenshot in FIG. 15, if a user types one character ("k"), the user is presented with a set of social media content (e.g., social media stories) best matching the search query ("k"). After typing additional characters ("an") to the search string (see middle screenshot), the user is presented with a first subset of top results that is broken out/separated from original set of results based on the updated search string ("kan"). As the user further adds more characters ("ye") to the search string (see right screenshot), a second subset of top results is broken out/separated from the first subset of results based on the updated search string ("kanye").

Figure 16:
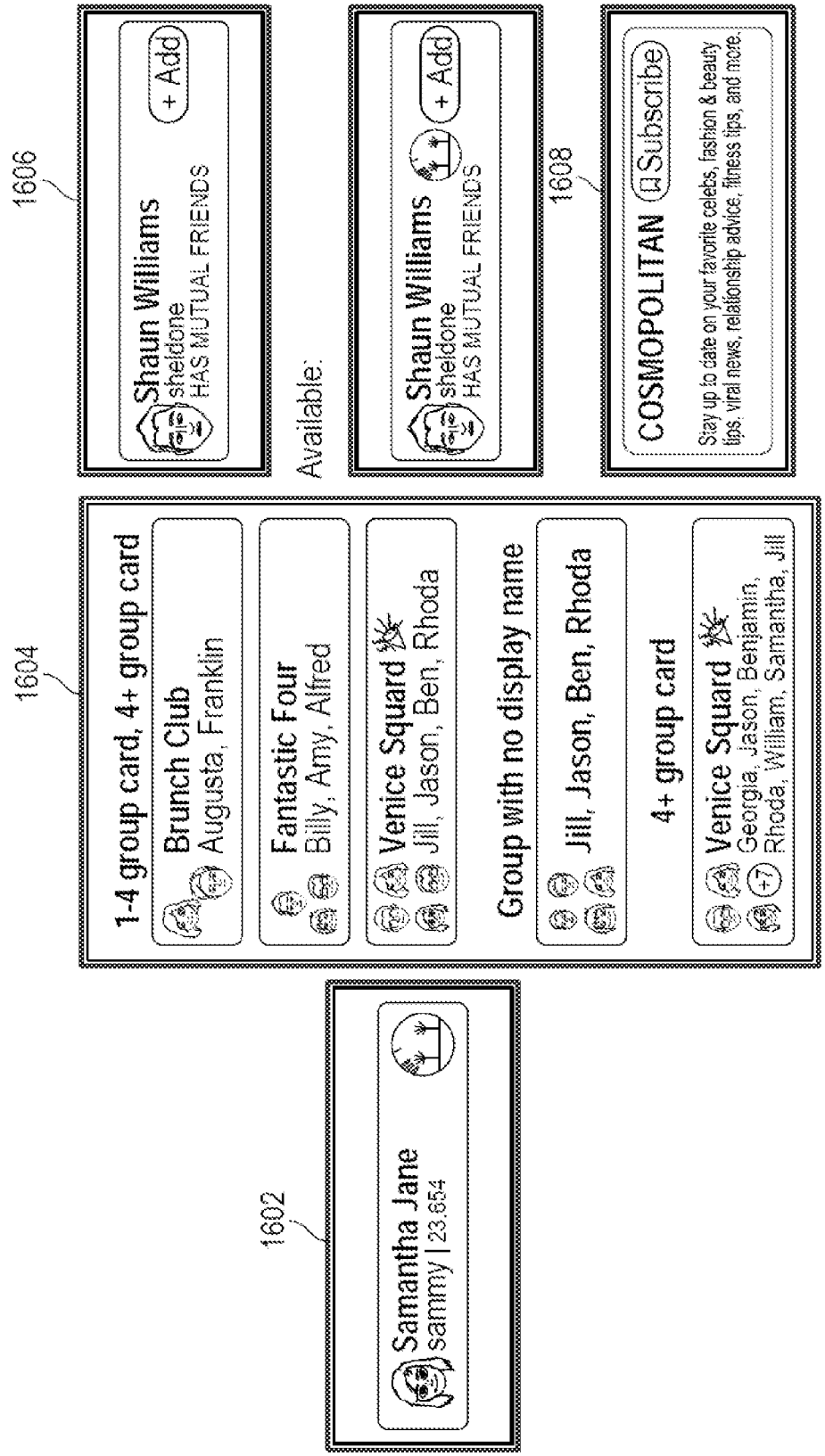
FIG. 16 are screenshots of example graphical user interfaces that each present a view of post-typing view in accordance with some embodiments described in this document.

FIG. 16 are screenshots of example graphical user interfaces that each present a view of post-typing view in accordance with some embodiments described in this document. In particular, screenshot 1602 illustrates a my friends card, screenshot 1604 illustrates group cards, screenshot 1606 illustrates add a friend cards, and screenshot 1608 illustrates a publisher card.

For various embodiments, a successful search refers to a situation where the search results meet a confidence threshold that permits a post-typing view to present a vertical (a vertical section presenting search details) that in addition to just a results section (e.g., hero card section), includes/is fully expanded to show multiple sections that present social media content related to the social media content provided in the results section (e.g., a more stories section and a related search section that directly tie to the results section). Example verticals that can appear in a post-typing view are described in this document with respect to FIGS. 17 through 25.

Figure 17:
FIGS. 17-25 are screenshots of example graphical user interfaces that each present a vertical section of a post-typing view based on a search query in accordance with some embodiments described in this document.
Figure 17:
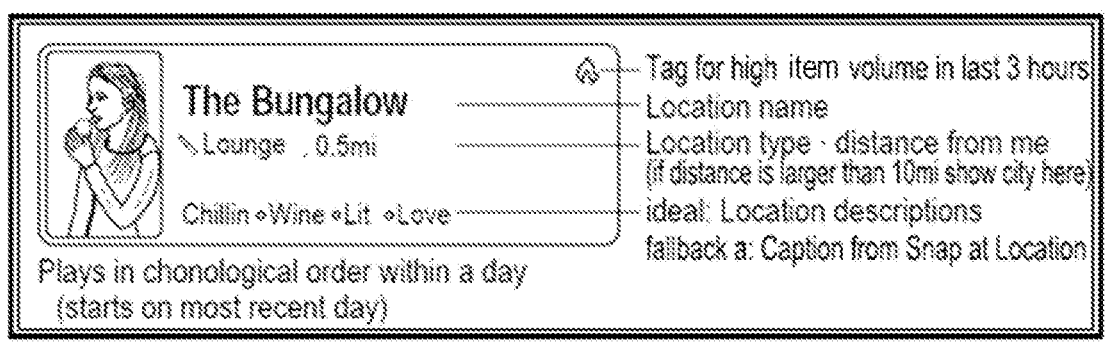

FIG. 17 are screenshots of an example graphical user interface that presents a specific place vertical of a post-typing view based on a search query in accordance with some embodiments described in this document. In particular, the specific place vertical presents the freshest social media content relating to a particular location identified by the search query provided. As shown in FIG. 17, at the top of the post-typing view, social media content relating to a specific location ("The Bungalow") identified by the search query ("bungalow") is listed within a hero card. The hero card indicates whether the social media content has had high volume recently (e.g., within the last 3 hours), and provides the location name, the location type, the location distance relative to the user's current location, and location descriptions. When a user taps on the hero card, the social media content listed in the hero card will play for the user. Each different specific place found based on the search query may be presented in a separate hero card, and the social media content listed within the hero card may play in a chronological order when the hero card is selected by the user. For instance, when a user selects a hero card, all the social media content listed in the hero card that relate to the most recent day (e.g., today) are played first in chronological order and, subsequently, social media content relating to previous days may be played in a chronological order.

For some embodiments, if a user taps on the hero card during a weekend (e.g., night), the content would be fresh and show what it is like at the specific location (e.g., at "The Bungalow") right now. Alternatively, if the user taps on the hero card on a Monday, the hero card will show the user the best social media content relating to the specific location from the weekend. In some instances, the events vertical can list social media content from an entire duration of an event, while if a specific location (e.g., bar or club) has an amount of recent social media content (e.g., social media content from the last few hours) that exceeds a certain threshold, the user may be presented with social media content exclusively from a recent period (e.g., only the last few hours).

As shown in FIG. 17, the specific location vertical includes a more stories section and a related searches section under the hero card that lists the results of the search query. The more stories section presents social media content (e.g., stories) that are directly or indirectly related to the set of specific locations presented by hero cards. For instance, the more stories section presents clusters of social media content that tie directly to the geographic location of the specific location, or social media content relating to concepts that are specifically tied to the specific location (e.g., social media content from over the past week that was created at "The Bungalow" and relates specific to the specific concept of "Pool Table" and "Dance Floor"). The more stories section can also present social media content on more general topics or social media content similar (or nearby) to the specific location (e.g., "The Room"). The related searches section presents social media content identified by a search related to the current search (e.g., one having a similar search query). The related searches can teach users that they can search using broader search queries (e.g., broad locations like neighborhoods, or topics that will be associated with locations like "Cocktails").

Figure 18:
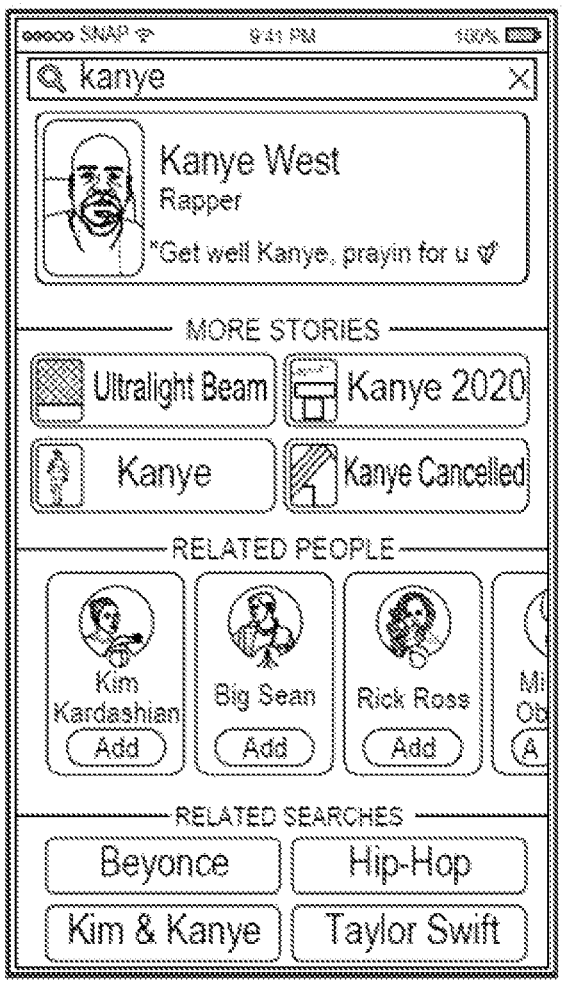
Figure 18:
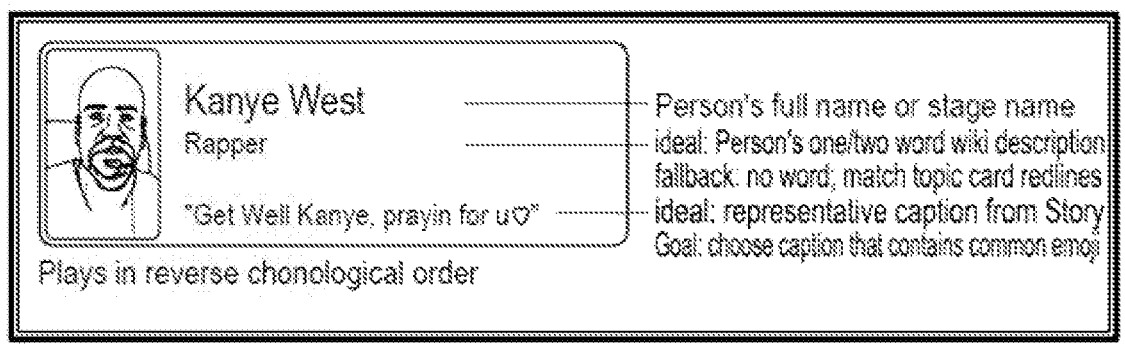

FIG. 18 are screenshots of an example graphical user interface that presents a person vertical of a post-typing view based on a search query in accordance with some embodiments described in this document. In particular, the person vertical presents the freshest social media content relating to a particular person identified by the search query provided. As shown in FIG. 18, at the top of the post-typing view, social media content relating to a person ("Kanye West") identified by the search query ("kanye") is listed within a hero card. The hero card provides the person's full name or stage name, a description of the person (e.g., rapper), and a caption representative of the person (e.g., one sampled from social media content relating to the person and which may include an emoji). When a user taps on the hero card, the social media content listed in the hero card will play for the user. Each different person found based on the search query may be presented in a separate hero card, and the social media content listed within the hero card may play in a chronological order (e.g., reverse chronological order) when the hero card is selected by the user. For instance, when a user selects a hero card, all the social media content listed in the hero card that relate to the most recent day (e.g., today)

are played first in chronological order and, subsequently, social media content relating to previous days may be played in a chronological order.

As shown in FIG. 18, the person vertical includes a more stories section, a related people section, and a related searches section under the hero card that lists the results of the search query. The more stories section presents social media content (e.g., stories) that are directly or indirectly related to the set of persons presented by hero cards. For instance, the more stories section presents clusters of social media content that tie directly to the particular person, or social media content relating to concepts (e.g., events, fashion, music) that are specifically tied to the person. The section may present, for example, social media content relating to events such as "Kanye Cancelled," the prevailing title given to a Kanye West concert in Sacramento where he showed up for 15 minutes and then cancelled. As another example, the section can present social media content relating to a stories that take place over a longer period of time, such as "Kanye 2020" which relates to Kanye running for election in 2020. The related person section presents other people related to the persons presented by the hero cards (e.g., "Kim Kardashian," Kanye's West's wife). The related searches section presents social media content identified by a search related to the current search (e.g., searches for other famous people like "kanye," or search for hip hop music related social media content as a result of "kanye" being a hip hop musician).

Figure 19:
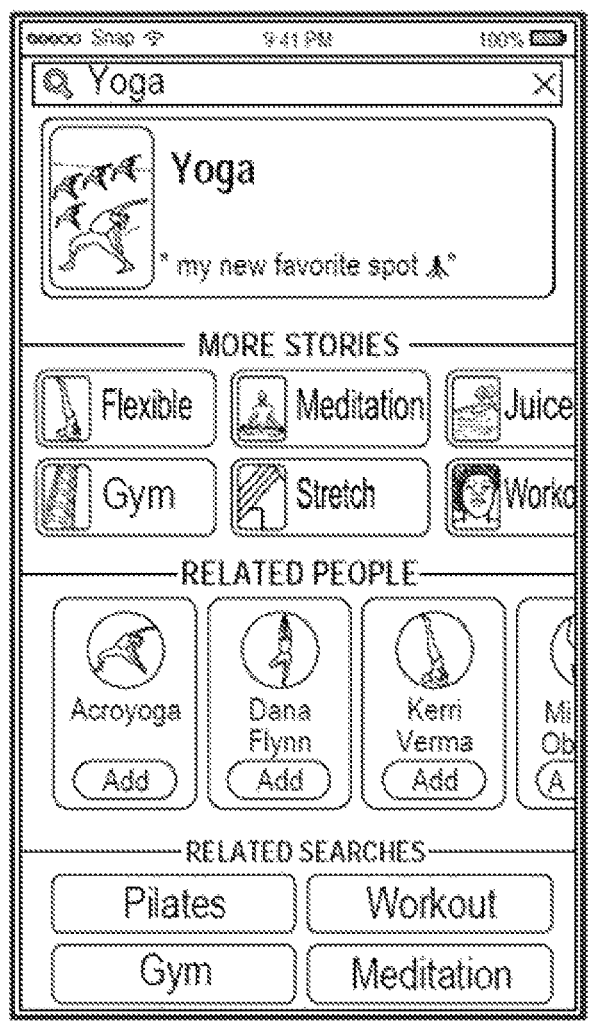
Figure 19:
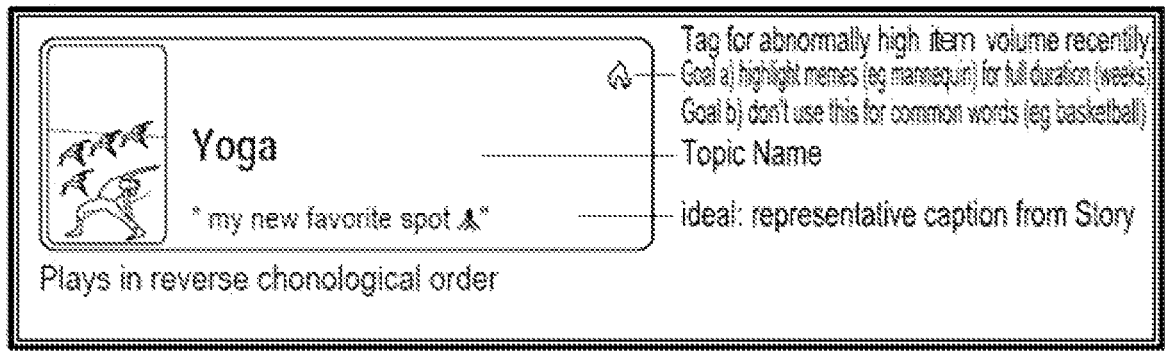

FIG. 19 are screenshots of an example graphical user interface that presents a topic vertical of a post-typing view based on a search query in accordance with some embodiments described in this document. In particular, the topic vertical presents the freshest social media content relating to a particular topic identified by the search query provided. As shown in FIG. 19, at the top of the post-typing view, social media content relating to a topic ("yoga") identified by the search query ("yoga") is listed within a hero card. The hero card indicates whether the social media content has had high volume recently (e.g., within the last 3 hours), and provides the topic name, and a caption representative of the topic (e.g., one sampled from social media content relating to the topic and which may include an emoji). When a user taps on the hero card, the social media content listed in the hero card will play for the user. Each different specific topic found based on the search query may be presented in a separate hero card, and the social media content listed within the hero card may play in a chronological order (e.g., reverse chronological order) when the hero card is selected by the user.

As shown in 19, the topic vertical includes a more stories section, a related people section, and a related searches section under the hero card that lists the results of the search query. The more stories section presents social media content (e.g., stories) that are directly or indirectly related to the set of topics presented by hero cards. For instance, the more stories section presents clusters of social media content that tie directly to concepts (e.g., flexible, meditation, stretch, juice, workout, and gym) that are specifically tied to the topic ("yoga"). The related person section presents other people related to the topics presented by the hero cards. The other people may be presented by rank order according to, for example, their relation to the topic presented by the hero cards or by account activity of those other people (e.g., prioritize accounts that currently have an active story and one that is long). The related searches section presents social media content identified by a search related to the current search (e.g., one having a similar search query).

Figure 20:

FIG. 20 is a screenshot of an example graphical user interface that presents a topic vertical of a post-typing view (based on a search query) that includes a discover section in accordance with some embodiments described in this document. As shown in FIG. 20, at the top of the post-typing view, social media content relating to a topic ("Manniquin Challenge") identified by the search query ("manneq") is listed within a hero card. Based on the results presented in the hero card, the discover section of the vertical presents a social media content relating to the "20 Mannequin Challenge videos you can't miss," which is provided by a third-party.

Figure 21:

FIG. 21 is a screenshot of an example graphical user interface that presents a vertical in a post-typing view based on a search query including an emoji in accordance with some embodiments described in this document. In particular, the vertical presents the freshest social media content identified by the search query that includes an emoji. As shown in FIG. 21, at the top of the post-typing view, social media content identified by the search query ("heart emoji") is listed within a hero card. The vertical includes a more stories section and a related searches section under the hero card that lists the results of the search query. The more stories section presents social media content (e.g., stories) that are directly or indirectly related to the results to the set of specific locations presented by hero cards. For instance, the more stories section presents clusters of social media content that have titles or descriptions that also include the same emoji. The related searches section presents social media content identified by a search related to the current search, which in this case can include emoji similar or related to an emoji included in the search query (e.g., hear-break emoji).

Figure 22:
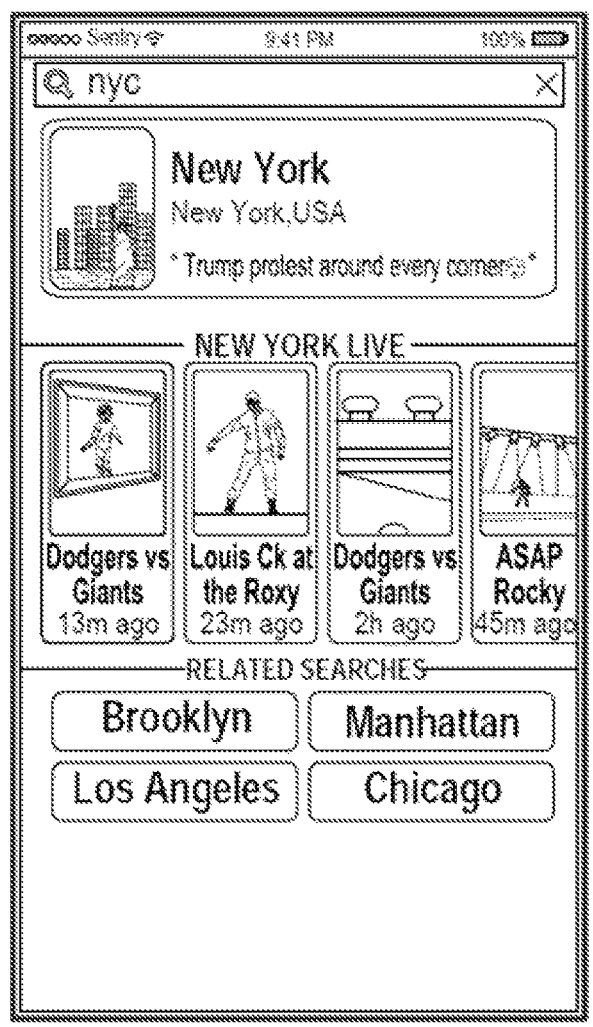
Figure 22:
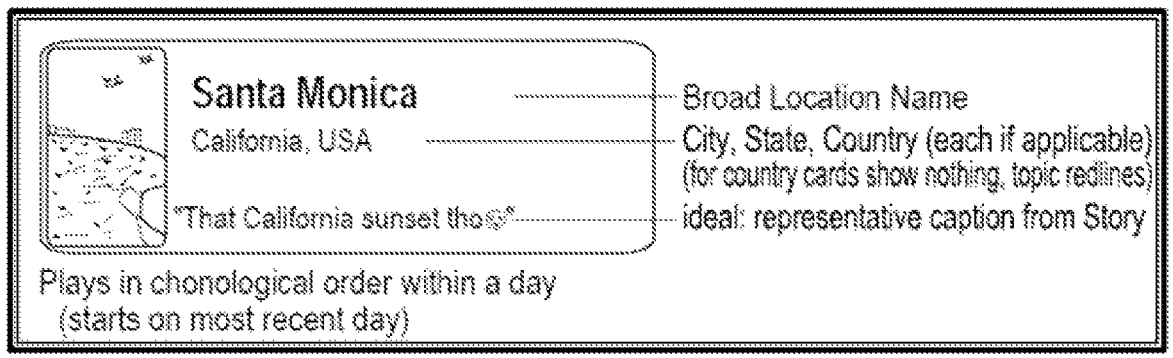

FIG. 22 are screenshots of an example graphical user interface that presents a broad location vertical of a post-typing view based on a search query in accordance with some embodiments described in this document. In particular, the broad place vertical presents the freshest social media content relating to a broach place identified by the search query provided, such as a city (e.g., New York or Santa Monica). As shown in FIG. 22, at the top of the post-typing view, social media content relating to a broad place ("New York") identified by the search query ("nyc") is listed within a hero card. The hero card provides the broad location name, city, state, and county as applicable, and a caption representative of the broad place (e.g., one sampled from social media content relating to the topic and which may include an emoji). When a user taps on the hero card, the social media content listed in the hero card will play for the user. Each different specific broad place found based on the search query may be presented in a separate hero card, and the social media content listed within the hero card may play in a chronological order when the hero card is selected by the user.

As shown in FIG. 22, the topic vertical includes a live section and a related searches section under the hero card that lists the results of the search query. The live section presents social media content (e.g., stories) that currently occurring or recently occurred directly or indirectly in relation to the set of broad places presented by hero cards. The related searches section presents social media content identified by a search related to the current search (e.g., one having a similar search query), such as Brooklyn, Manhattan, Los Angeles, and Chicago.

Figure 23:
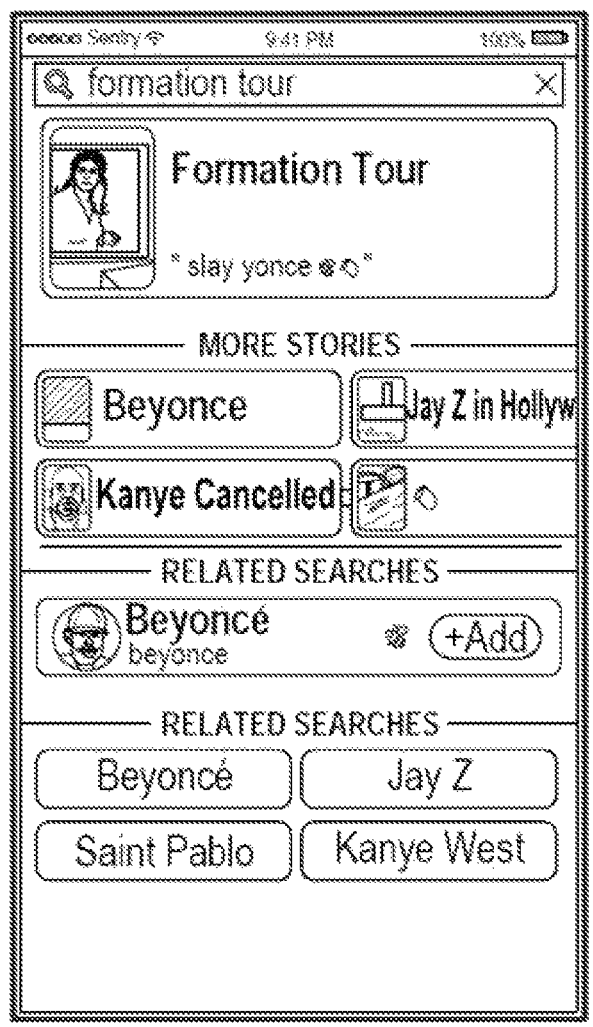
Figure 23:
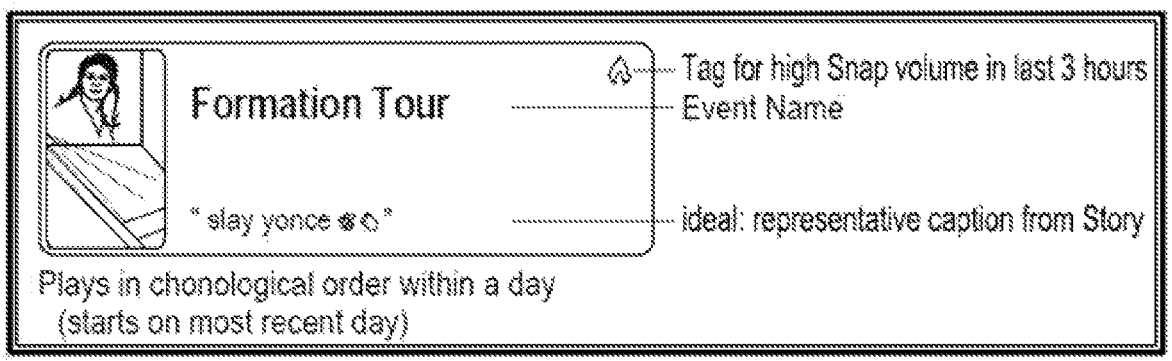

FIG. 23 are screenshots of an example graphical user interface that presents an events vertical of a post-typing view based on a search query in accordance with some embodiments described in this document. In particular, the events vertical presents the freshest social media content relating to a particular event identified by the search query provided. As shown in FIG. 23, at the top of the post-typing view, social media content relating to a topic ("Formation Tour") identified by the search query ("formation tour") is listed within a hero card. The hero card indicates whether the social media content has had high volume recently (e.g., within the last 3 hours), and provides the event name, and a caption representative of the event (e.g., one sampled from social media content relating to the topic and which may include an emoji). When a user taps on the hero card, the social media content listed in the hero card will play for the user. Each different specific topic found based on the search query may be presented in a separate hero card, and the social media content listed within the hero card may play in a chronological order (e.g., reverse chronological order) when the hero card is selected by the user.

As shown in FIG. 23, the topic vertical includes a more stories section, a related people section, and a related searches section under the hero card that lists the results of the search query. The more stories section presents social media content (e.g., stories) that are directly or indirectly related to the set of topics presented by hero cards. For instance, the more stories section presents clusters of social media content that tie directly to individuals or events (e.g., Beyonce, Jay Z, and Kanye Cancelled) that are specifically tied to the topic ("Formation Tour"). Under the related person section, if an event has a set of main related people who also have an account, that account appears as an add friend card under the related person section. The related searches section presents social media content identified by a search related to the current search (e.g., one having a similar search query).

Figure 24:
Figure 24:
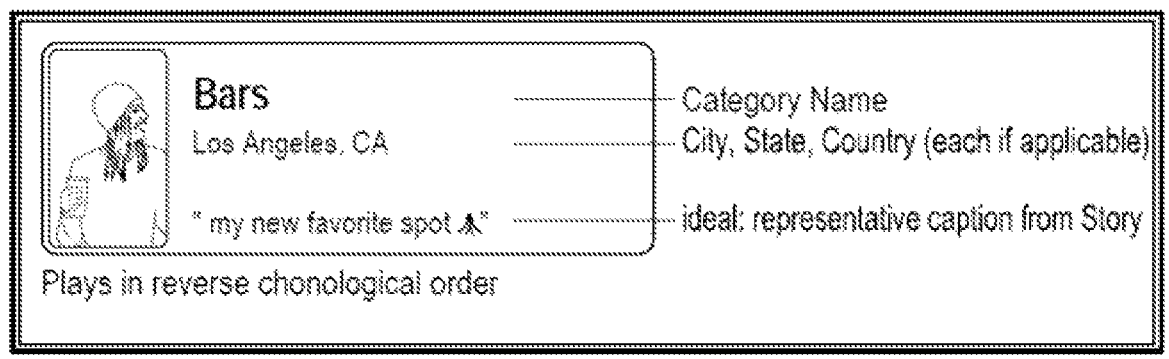
Figure 25:
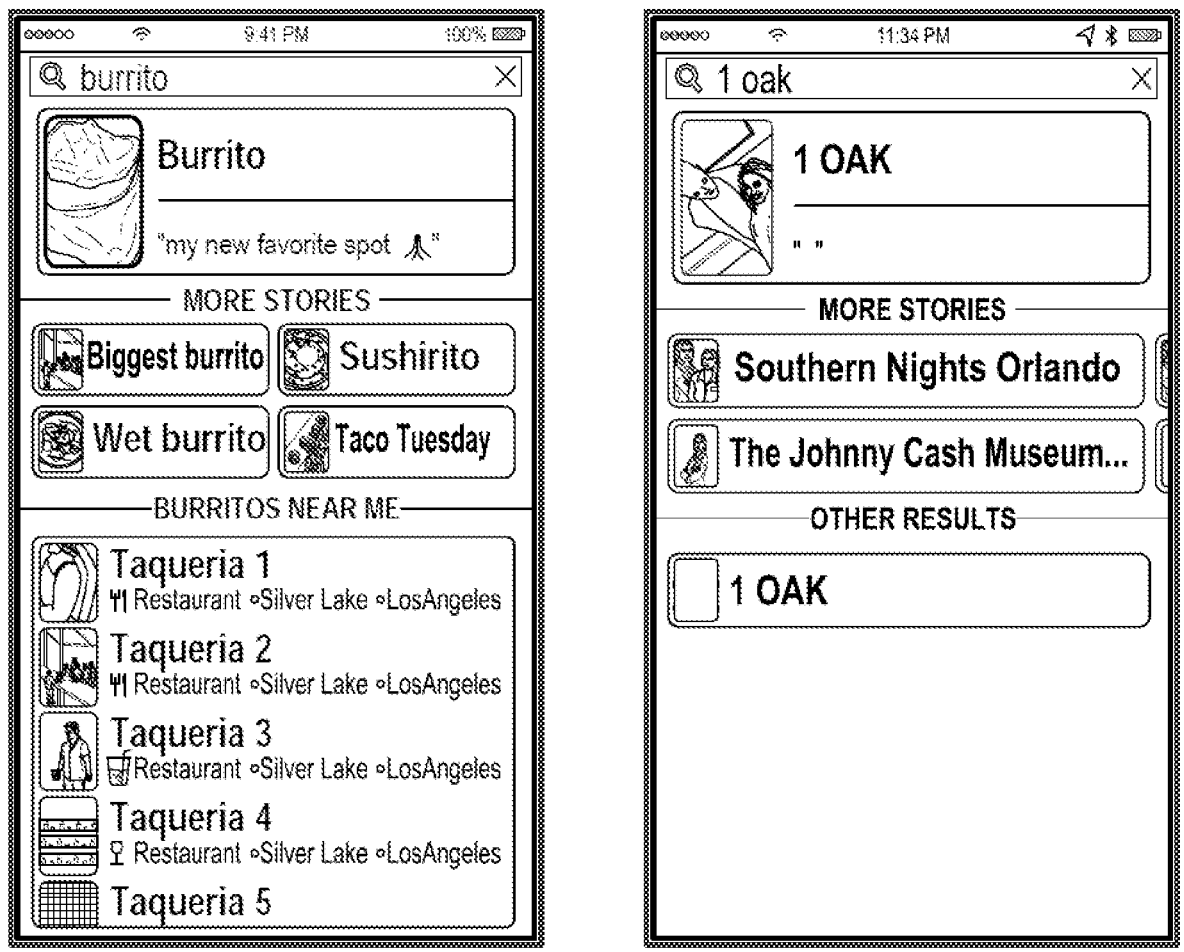

FIGS. 24 and 25 are screenshots of example graphical user interfaces that each present a category vertical of a post-typing view based on a search query in accordance with some embodiments described in this document. In particular, both FIGS. 24 and 25 illustrate categories verticals that present the freshest social media content relating to a particular category identified by the search query provided. FIG. 24 presents a categories vertical without a more stories section, and FIG. 25 presents a categories vertical with a more stories section.

As shown in FIG. 24, at the top of the post-typing view, social media content relating to a category ("Bars") identified by the search query ("bar") is listed within a hero card. The hero card provides a category name, city, state, and county as applicable, and a caption representative of the category (e.g., one sampled from social media content relating to the topic and which may include an emoji). When a user taps on the hero card, the social media content listed in the hero card will play for the user. Each different specific topic found based on the search query may be presented in a separate hero card, and the social media content listed within the hero card may play in a chronological order (e.g., reverse chronological order) when the hero card is selected by the user. As also shown in FIG. 24, the categories vertical includes a special list section, in this case a near me section that provides a listing of bars that are near the user's current location.

For FIG. 25, at the top of the post-typing view, social media content relating to a category ("Burrito") identified by the search query ("burrito") is listed within a hero card. The categories vertical includes a listing of bars under the "near me" section to present bars that are near the user's current location and, additionally includes a more stories section, which presents social media content (e.g., stories) that are directly or indirectly related to the set of categories presented by hero cards.

Figure 26A:
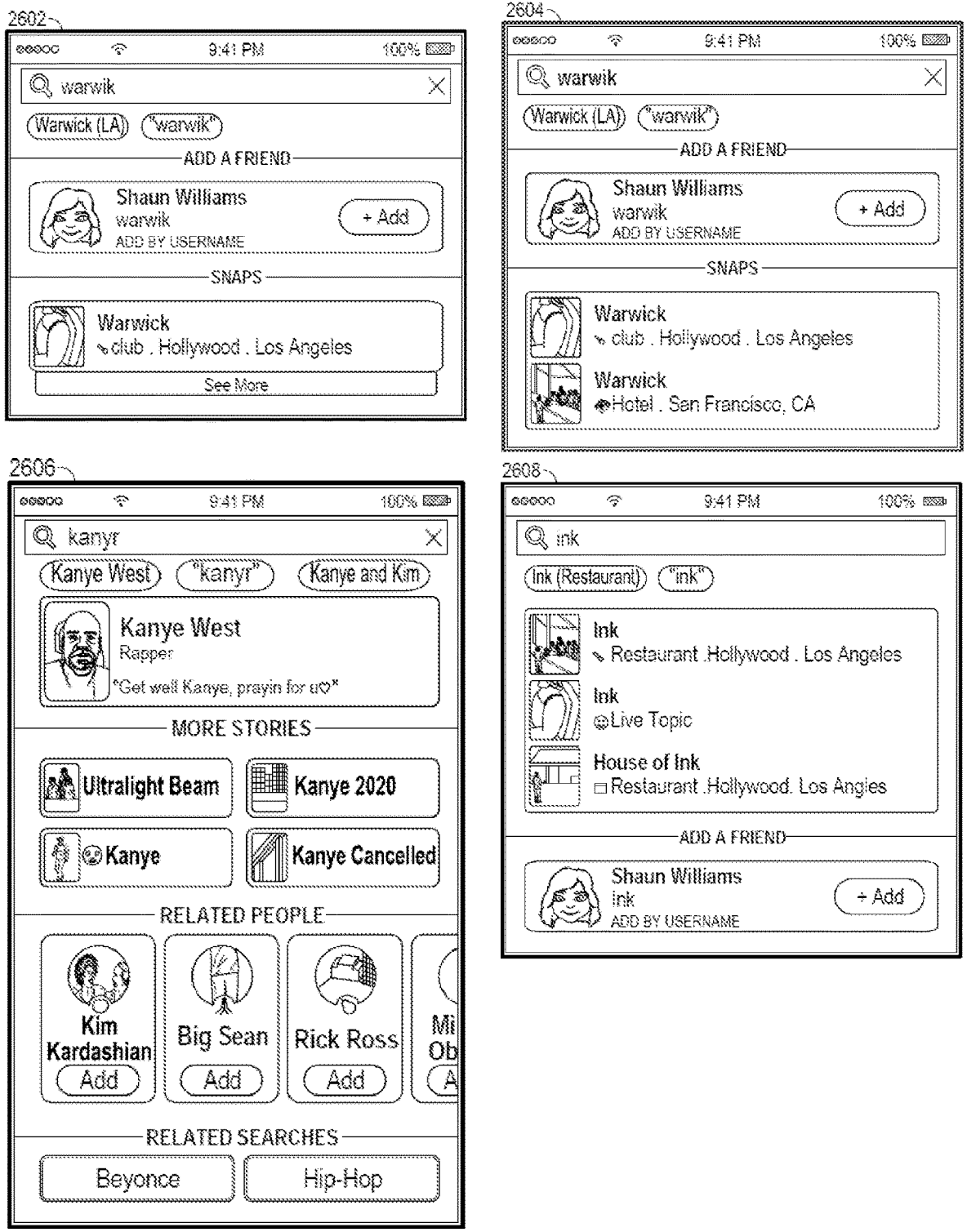
FIGS. 26A and 26B are screenshots of example graphical user interfaces that each present a post-typing view under different search scenarios in accordance with some embodiments described in this document.
Figure 26B:
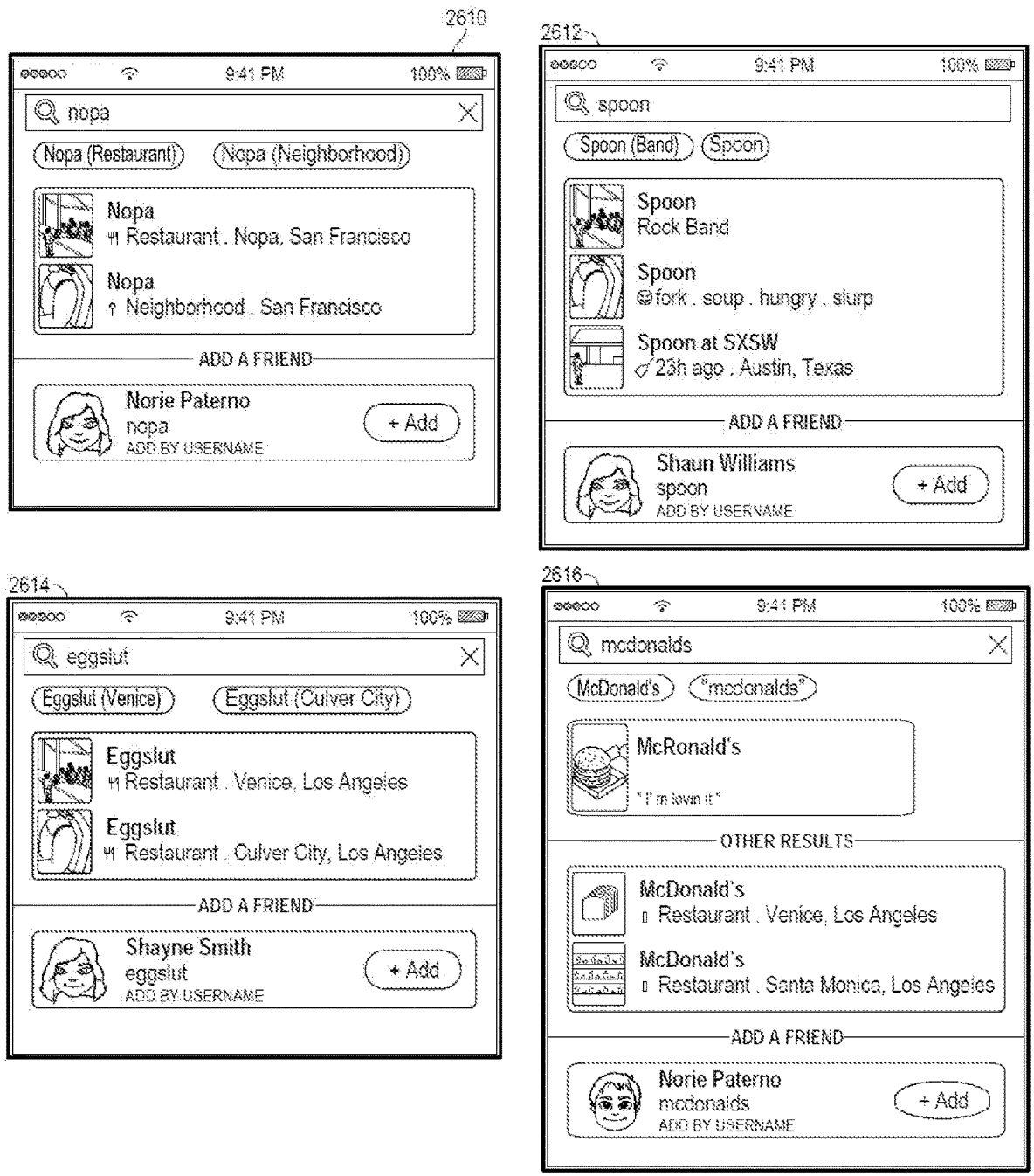
Figure 27A:
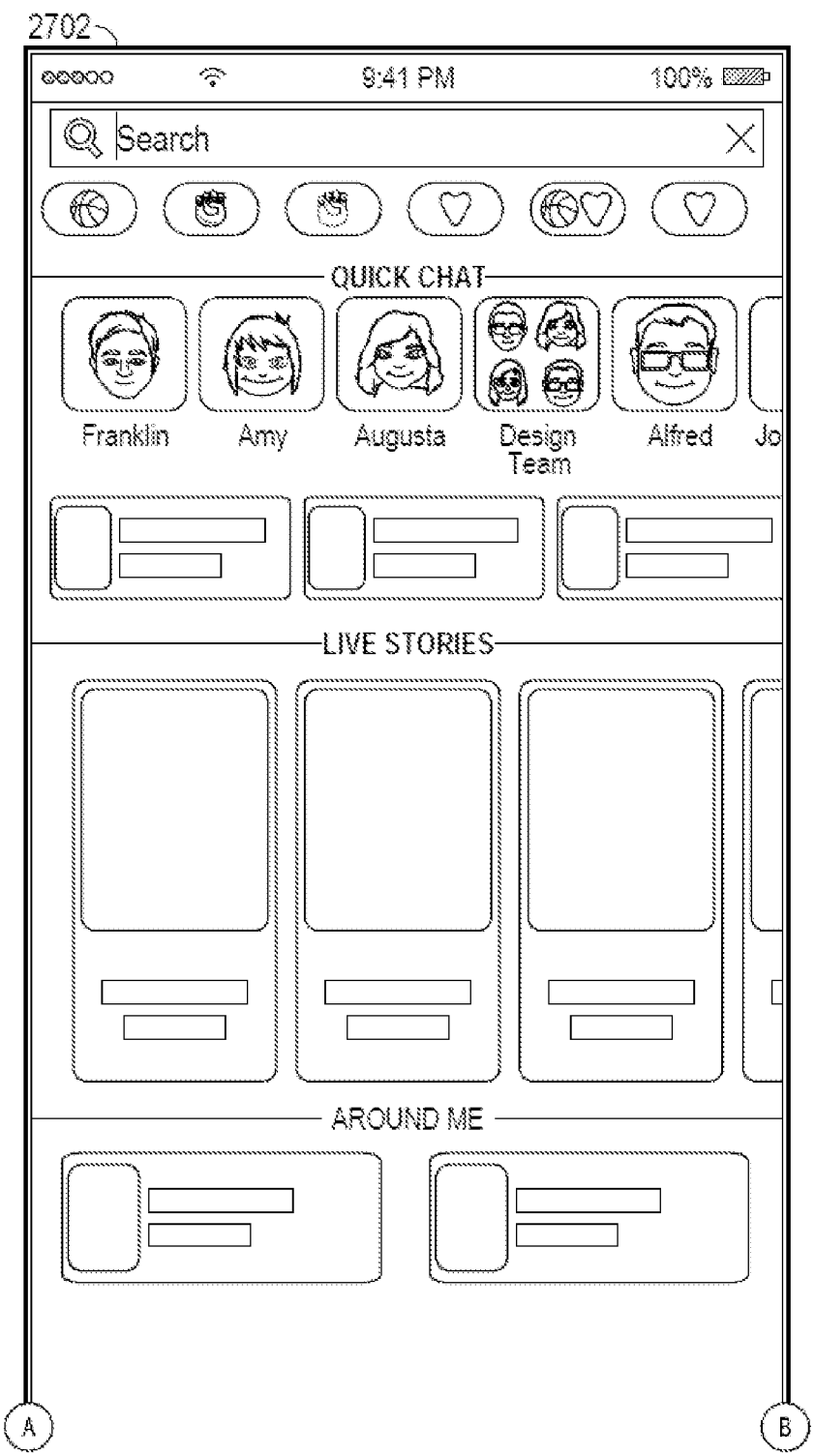
FIGS. 27A-27D are screenshots of example graphical user interfaces that present a post-typing view based on client-side caching in accordance with some embodiments described in this document.
Figure 27B:
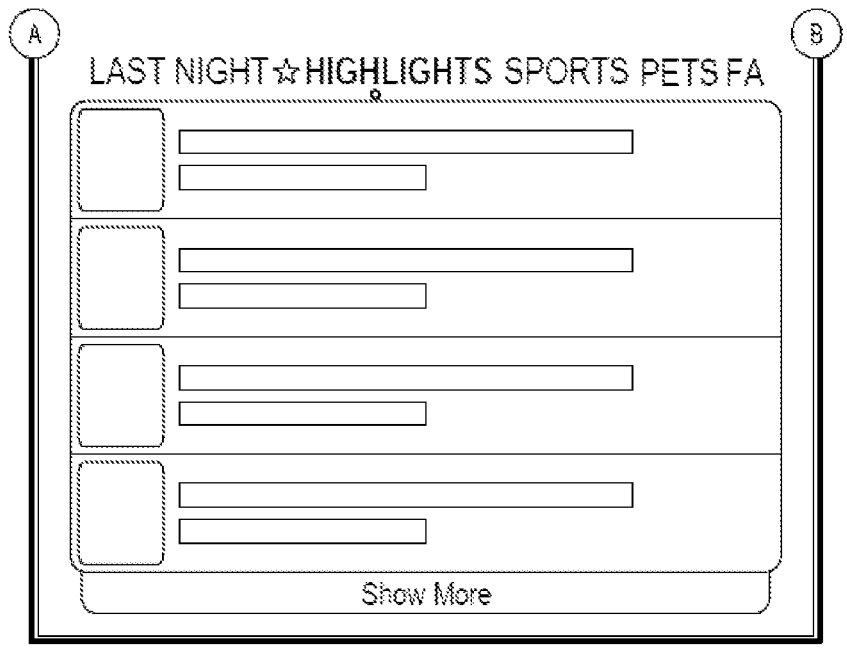
Figure 27C:
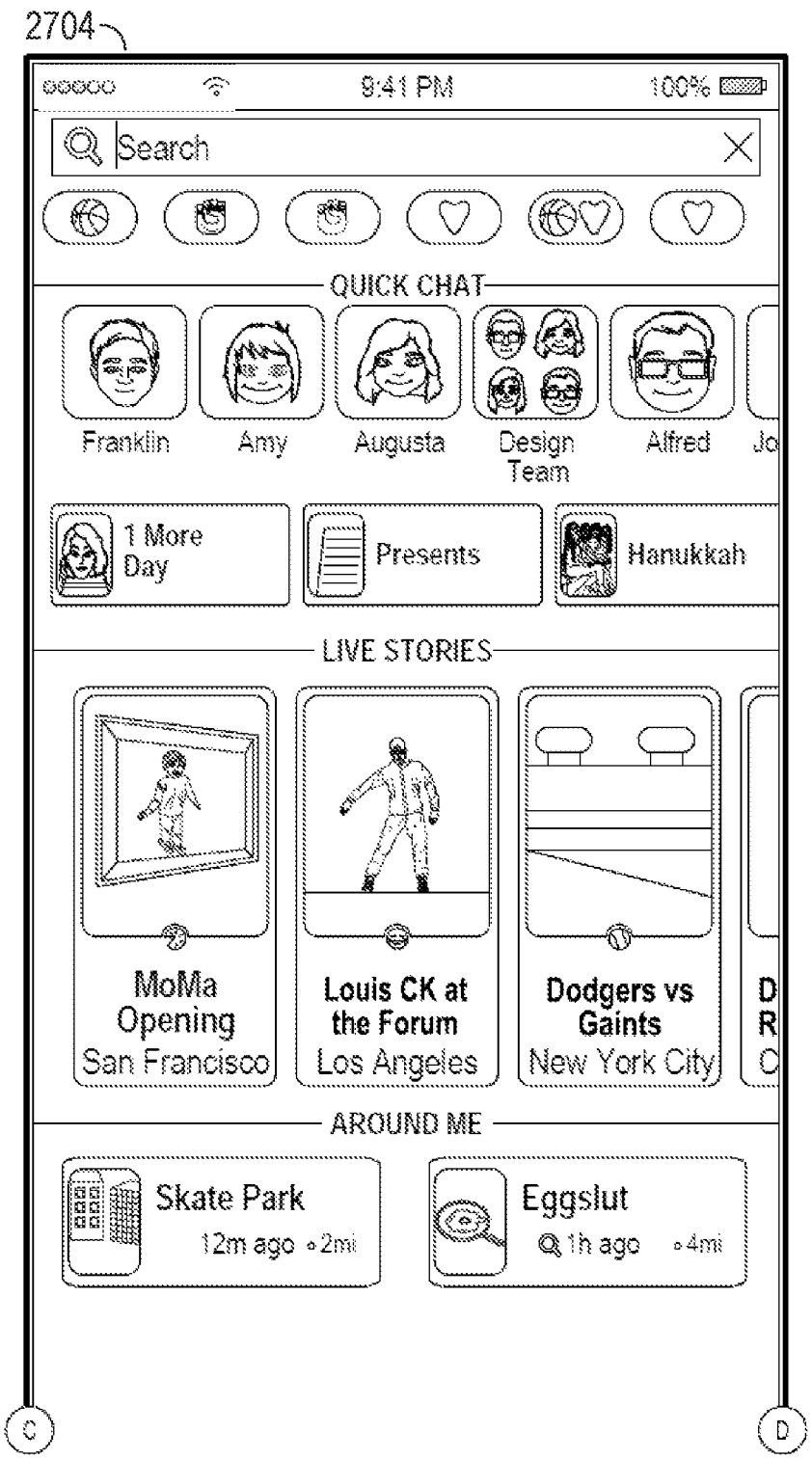
Figure 27D:

FIGS. 26A and 26B are screenshots of example graphical user interfaces that present a post-typing view under different search scenarios in accordance with some embodiments described in this document. Under a no or poor results search scenario, some embodiments broaden results when no results at a specific place are found. When there is no a typo and the search query is not a place, query suggestions can be provided to a user. Poor media content item results may comprise less than 5 media content items for a search.

Screenshot 2602 illustrates where there are no results for exact query and only one result is presented. Screenshot 2604 illustrates where there are no results for exact query and multiple results are presented. Screenshot 2606 illustrates where there are no results for exact query and there is confidence that the search query contains a typo. Screenshot 2608 illustrates where a user is searching for a concept ("ink") and result contain the concept sought and a specific place also having the same name as the concept. Screenshot 2610 illustrates where a user is searching for a specific place or broad location ("nopa") and the result are provided. Screenshot 2612 illustrates where a user is searching for a specific topic, person, band or event ("spoon") and the mix results are provided. Screenshot 2614 illustrates where a user is searching for a specific place ("eggslut") and the result indicate there are multiple locations near the user. Screenshot 2616 illustrates where a user is searching for a topic story ("mcdonalds") and the results provide a topic story and multiple specific locations.

FIGS. 27A-27D are screenshots of example graphical user interfaces that present a post-typing view based on client-side caching in accordance with some embodiments described in this document. Screenshot 2702 illustrates a graphical user interface when no content has been cached at the client and the graphical user interface is initially loading. Screenshot 2704 illustrates a graphical user interface when content has been cached at the client.

Figure 28:
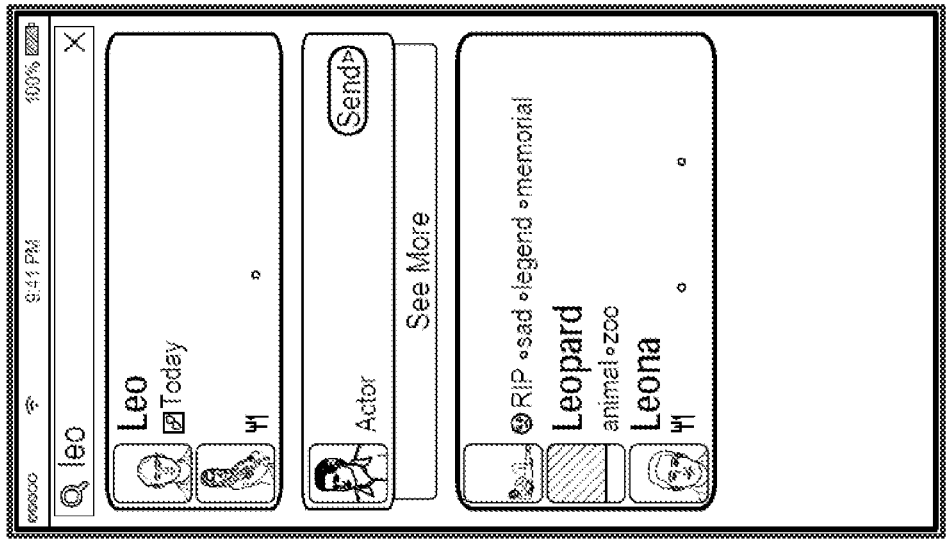
FIG. 28 are screenshots of example graphical user interfaces that present different states of a post-typing view in accordance with some embodiments described in this document.
Figure 28:
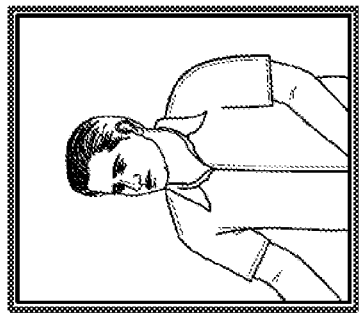
Figure 28:
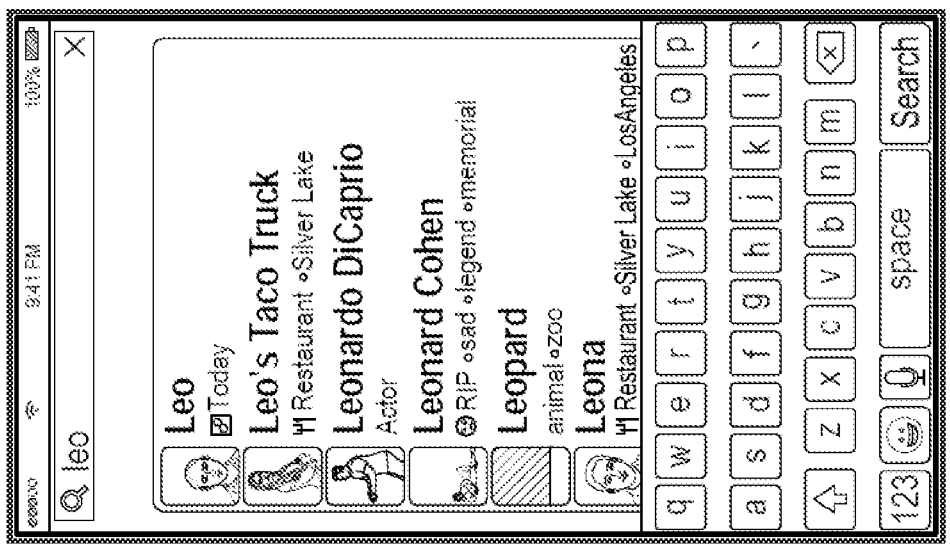

FIG. 28 are screenshots of example graphical user interfaces that present different states of a post-typing view in accordance with some embodiments described in this document. In particular, the leftmost screenshot illustrates the state of the post-typing view when a user has begun to enter a search query. The middle screen illustrates the state of the post-typing view when a user has selected to view an item full screen. The rightmost screenshot illustrates the state of the post-typing view when a user has exited or completed a story.

Figure 29:
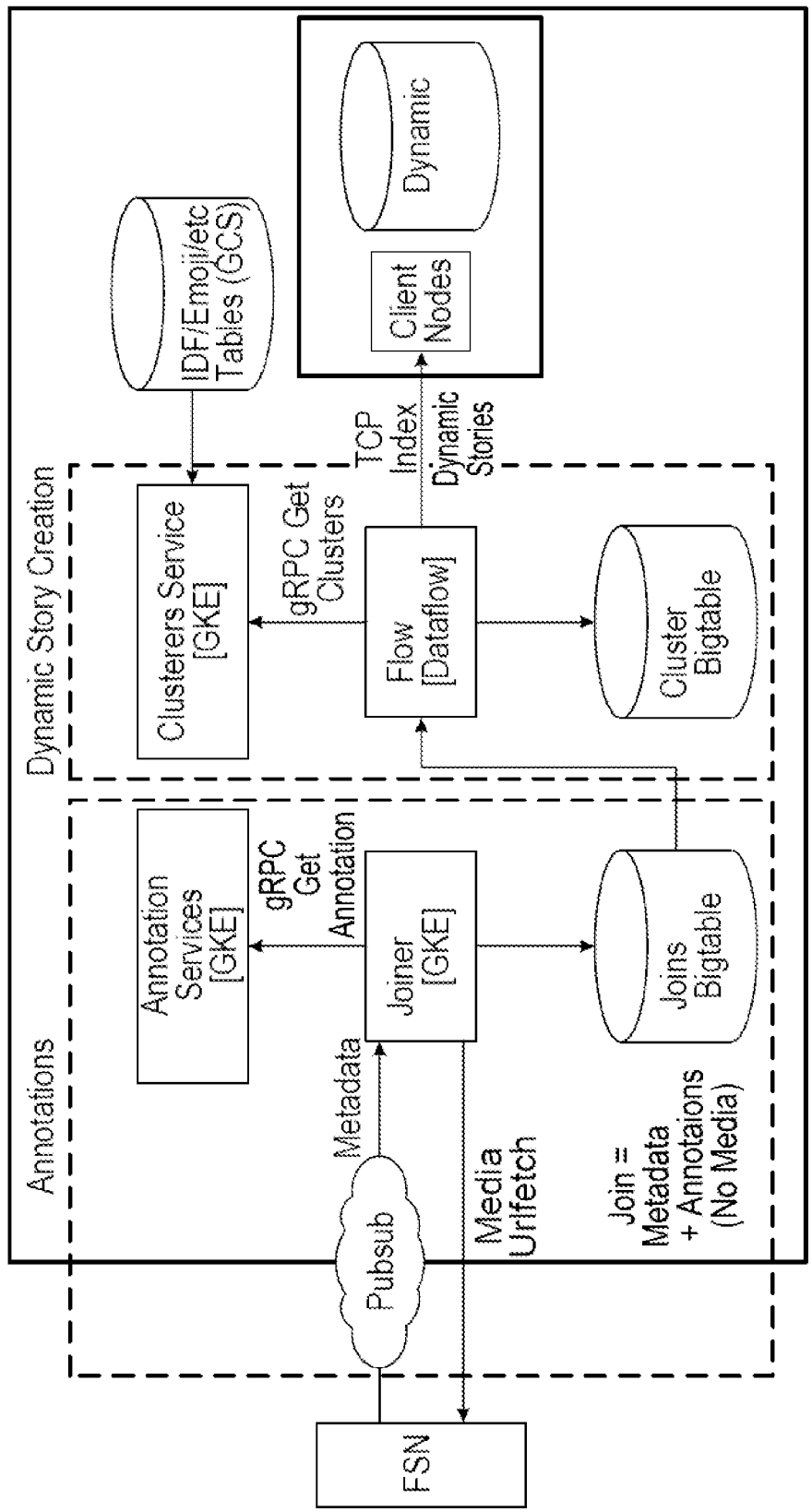
FIGS. 29-33 are diagrams illustrating example indexing infrastructure in accordance with some embodiments described in this document.

FIG. 29 is a diagram illustrating an example indexing infrastructure in accordance with some embodiments described in this document. In particular, the illustrated indexing infrastructure comprises (1) an indexing pipeline that creates dynamic stories from social media content (e.g., submit-to-live media content item content), and (2) a serving infrastructure that surfaces these dynamic stories to users through the search bar. Though FIG. 29 is described with respect to media content items, it will be understood that some embodiments can be utilized with other types of social media content.

In FIG. 29, the indexing pipeline comprises of two stages: Annotations; and Dynamic Story Creation. Joiner of the Annotations stage receives Metadata updates from FSN when a new media content item (e.g., snap) is posted to a live submission feed (e.g., "Our Story"). The new media content item is passed through a set of annotators (Annotation Services) that add knowledge ("annotations") about the new media content item and store the annotations and metadata of the new media content item in a data structure, represented in FIG. 29 as a protocol buffer (proto) called a Join. As used in this document, a proto can comprise a language-neutral, platform-neutral mechanism for serializing data. The Join is written to a database, which represented in FIG. 29 by Joins Bigtable. For some embodiments, Joins Bigtable is implemented by a GOOGLE NoSQL Big Data database service. Additionally, for some embodiments, each of the Annotation Services and the Joiner is implemented by a GOOGLE Container Engine based on KUBERNETES (GKE).

Flow of the Dynamic Story Creation stage obtains a set of Joins from Joins Bigtable. Flow comprises a set of data flow pipelines each of which takes in Joins from over a period of time (e.g., past 24 hours). Based on the Joins and side data models, Flow generates dynamic stories. For some embodiments, Flow runs clustering algorithms (Clusterers Service) over different dimensions, such as geolocation, time, similar caption terms, and the like. The clustering results from Clusterers Service are stored in a database, which is represented in FIG. 29 by Cluster Bigtable. For some embodiments, Cluster Bigtable (BT) is implemented by a GOOGLE NoSQL Big Data database service. Clustering results are also stored to an index of a search service (ElasticSearch) for serving clustering results to users as search results. ElasticSearch may be implemented by an open-source search technology, such as APACHE LuceneT™.

For some embodiments, Clusterers Service comprises a service that exposes multiple remote procedure calls (e.g., gRPC) for different clustering tasks. As shown, Clusterers Service is implemented as a service running in GKE. Clusterers Service may be implemented as a Python service. Additionally, Clusterers Service may operate based on stored models (e.g., GCS), utilize API calls to Place Server to compute place names for generated stories, and datastore calls for curation data related to clusters and stories.

For some embodiments, ElasticSearch comprises an index for serving stories, and may store one index per a Flow type (e.g., Topic, Event, and Places Flow as described in this document). For a given Flow, the index may be swapped at each run, resulting in all dynamic stories generated on previous runs of the given Flow being removed and replaced with dynamic stories generated from the latest run of the given Flow. For some streaming and incremental Flows (such as Places Flow), the index may not be swapped and a single long-running index is maintained where dynamic stories are added and removed over time.

Various embodiments may maintain a separate ElasticSearch cluster for indexing where the separate ElasticSearch cluster stores Cluster outputs (e.g., rather than dynamic stories) produced by Flows. Such a separate ElasticSearch cluster may be utilized to store a period of Joins (e.g., past 24 hours) to provide search and analysis functionality for indexing pipelines, curation workflows, debug tasks, or some combination thereof.

For some examples, the architecture of ElasticSearch comprises a cluster deployed as a GKE cluster with dedicated node pools for data nodes, client nodes, and master nodes. Client nodes may expose a NodePort Service for the HTTP endpoint and the ElasticSearch Transport endpoint. To dynamically discover the virtual machines that participate in the NodePort Service, GOOGLE Internal LoadBalancer may be utilized, which provides an internal frontend IP address and port forwards to the IP addresses of the cluster.

Figure 30:
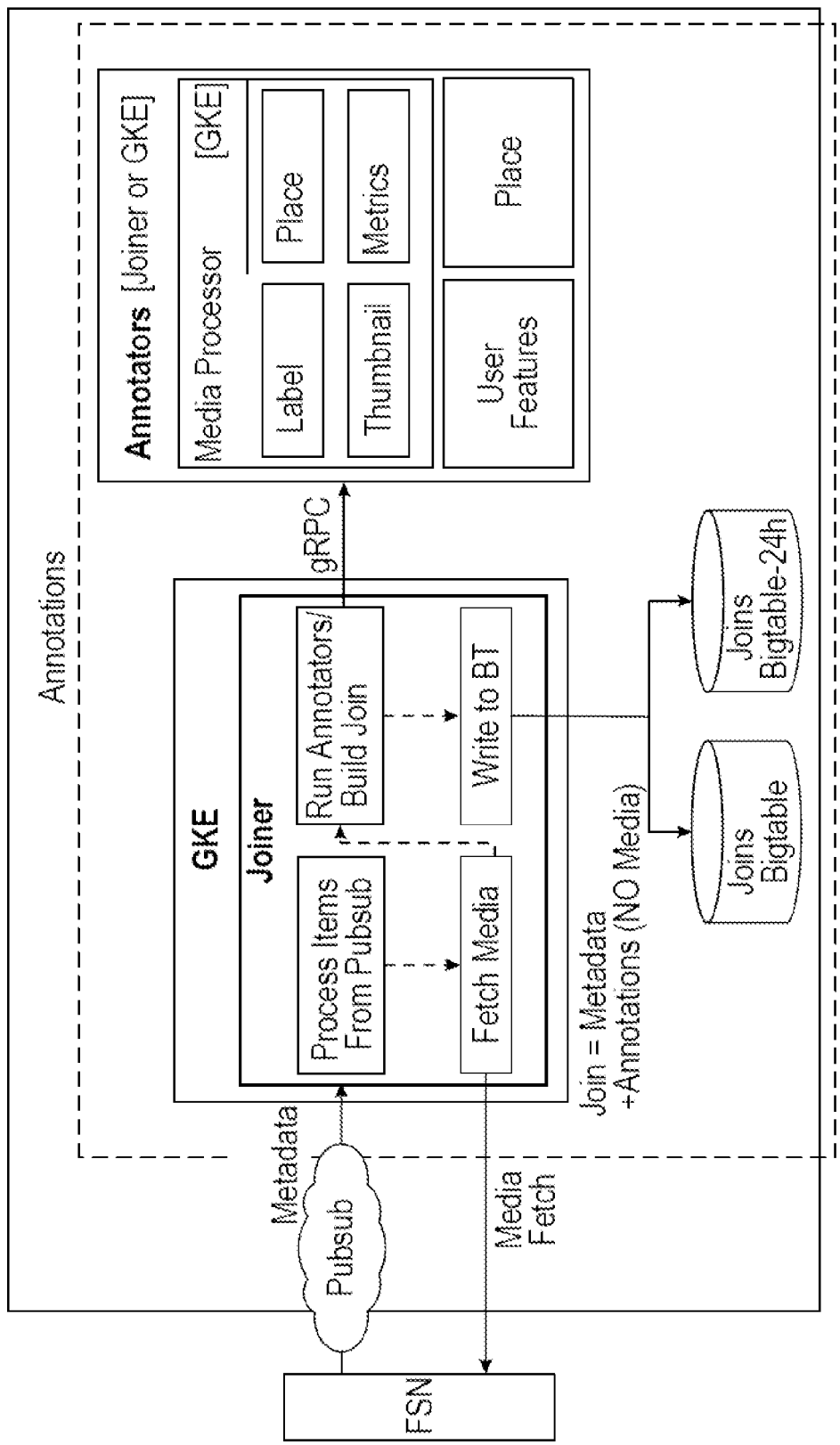

FIG. 30 is a diagram illustrating an example indexing infrastructure in accordance with some embodiments described in this document. In particular, FIG. 30 illustrates the Annotations stage in detail. As shown, Joiner comprises Joiner, which is the entry point to the indexing pipeline. Joiner may comprise a GO server running on GKE. Joiner listens to media content item metadata updates (e.g., from FSN via GOOGLE Cloud PubSub). A media content item metadata update may be sent whenever a media content item is posted to live submission feed or when there is a media content item deletion notification. To perform media content item annotations based on the media content item content, Joiner fetches the media content item's media via an HTTP call (media fetch) to the FSN endpoint. This fetch call may be authenticated using a shared secret that is stored in encrypted form in a datastore. Joiner then runs multiple annotator plugins that derive extra knowledge about the media content item and puts it all together in a Join proto. For some embodiments, the Join is written to two databases: Join Bigtable which can store all Joins created in the past 3 months; and a secondary index Join Bigtable—24 h, which can store all Joins created in the last 24 hours.

As also shown, Annotator comprises Media Processor (MP), which runs multiple machine intelligence data flow graph models (e.g., TensorFlow™ models) on media content item content to compute labels (e.g. stadium, concert, basketball) and metrics (e.g. media quality, shakiness score). The data flow models may be trained offline and loaded at startup time. SMP may also compute the best thumbnail frame for a media content item including video media. SMP may be implemented as a C++ service operating on GKE. SMP exposes a remote procedure call (RPC) interface, which may only be available to internal services of the indexing infrastructure.

A user features of Annotator can run as a plugin inside of Joiner. This user features annotator reads user statistics from a datastore and denormalizes them into a Join. The statistics are computed by a separate pipeline by reading data from FSN and SC-Analytics and storing them on a datastore in the indexing infrastructure.

Figure 31:
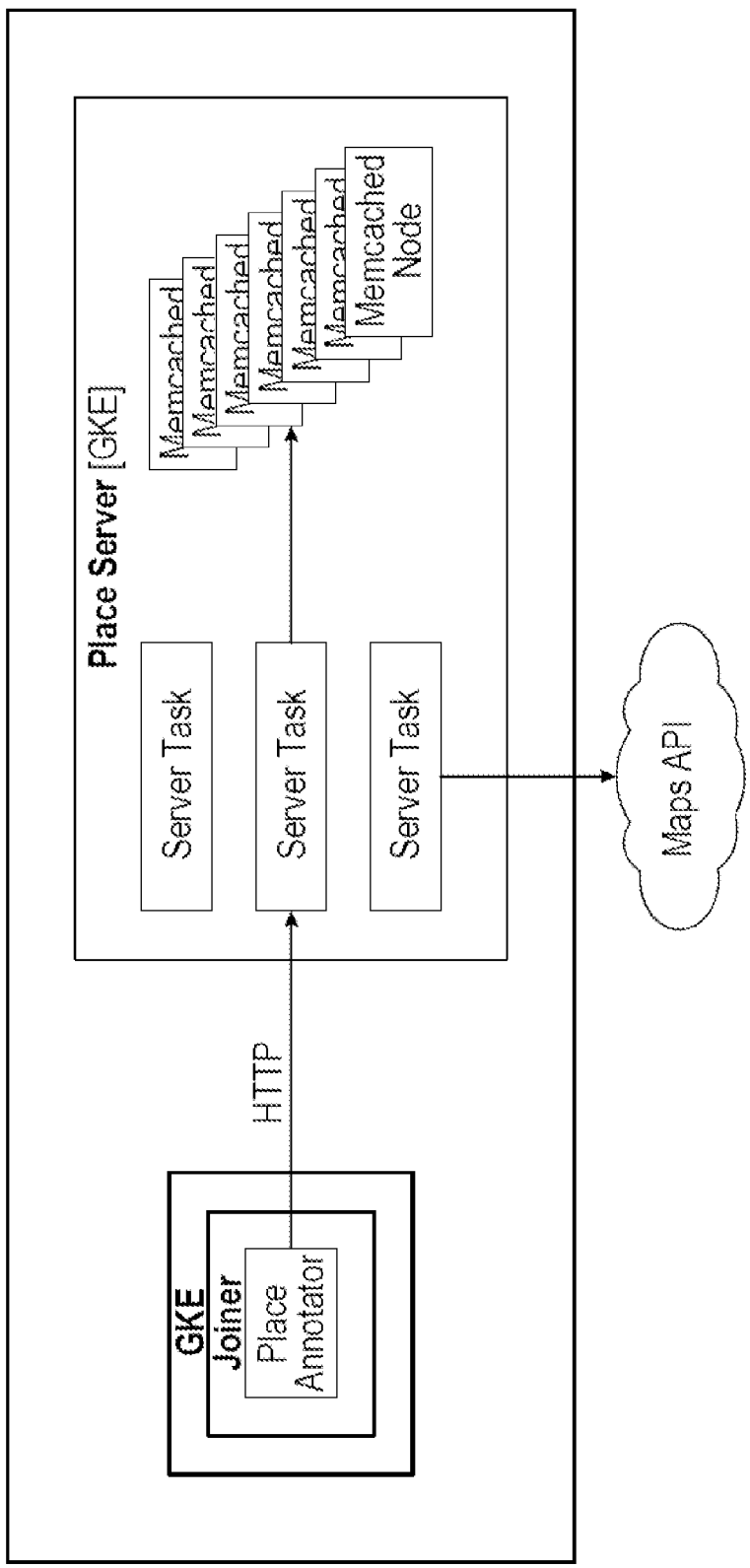

FIG. 31 is a diagram illustrating an example indexing infrastructure in accordance with some embodiments described in this document. In particular, FIG. 31 illustrates the Place portion of Annotator in detail. Place Annotator represents the Place portion of Annotator is running inside of Joiner (e.g., as a plugin). Place Annotator performs a reverse geocoding call to Place Server to find the most likely location (e.g., place name, city, etc.) of the user based on the latitude/longitude of the media content item. Place Server may be implemented as a simple GKE service that uses GO and works as a cache layer on top of a Maps Geocoding API. Place Server may expose itself as an internal only HTTP API.

Figure 32:
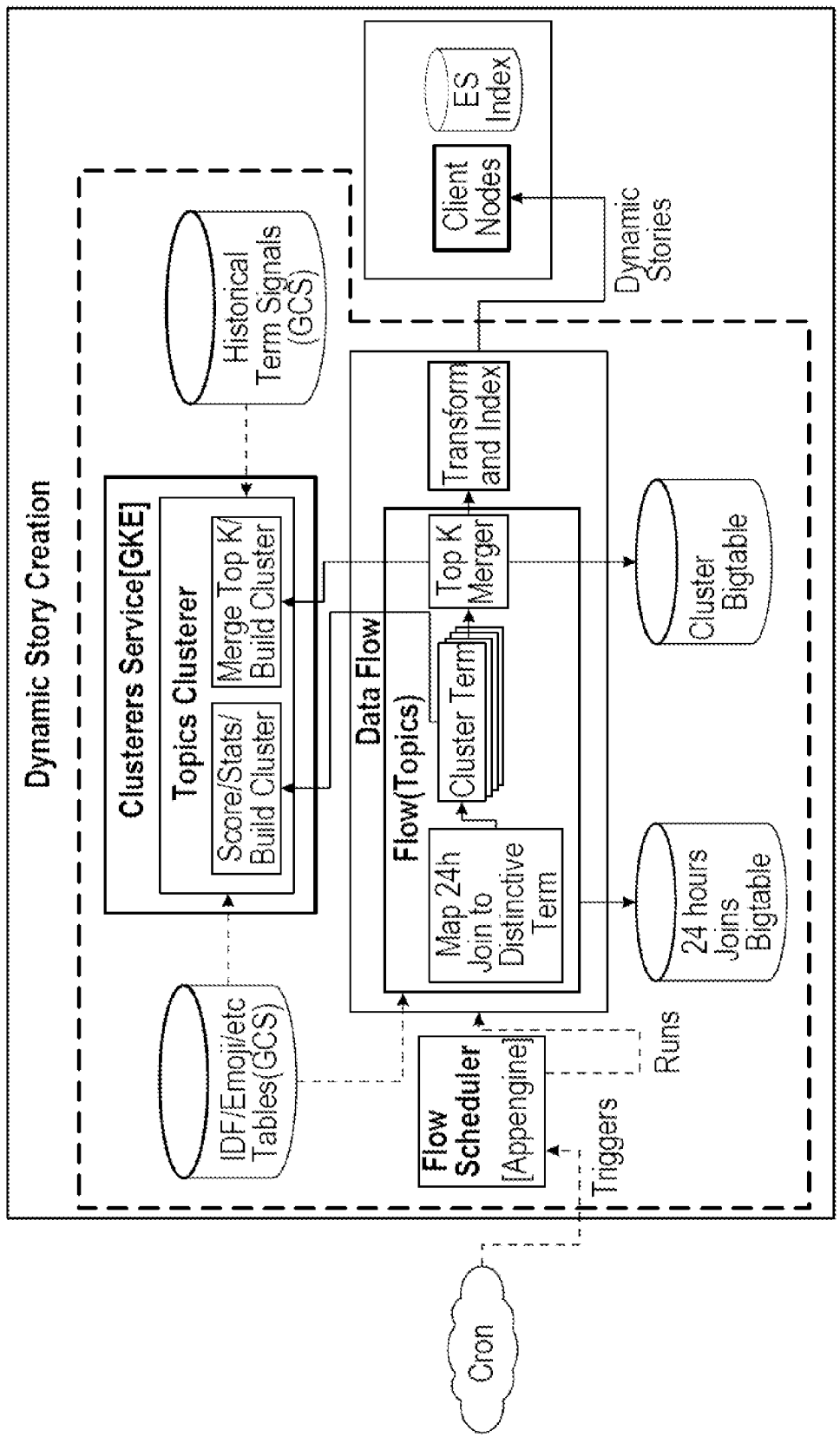

FIG. 32 is a diagram illustrating an example indexing infrastructure in accordance with some embodiments described in this document. In particular, FIG. 32 illustrates the Dynamic Story Creation stage in detail for Topics Flows.

As noted in this document, Flow supports creation of dynamic stories from a set of Joins and implemented as a dataflow pipeline. For some embodiments, Flow scans a given time window of Join updates (e.g., 1 day, 30 minutes, etc.). Flow bins the Joins based on a set of selection criteria (e.g., media content items for the same geo region). Flow performs an external remote procedure call (RPC) request Clusterer service, which returns clusters computed (by the clustering algorithm) from binned. Joins. Flow then writes the output (clustering results) to Cluster Bigtable and to an index of a search service, ElasticSearch.

FIG. 32 illustrates a Flow particularly implemented for topics and creates dynamic stories based on distinctive terms (e.g., either captions or labels). According to some embodiments, cron services is configured to send a request to an internal endpoint serviced by Flow Scheduler. The endpoint may be authenticated by a standard authentication (e.g., GOOGLE authentication) and may require both a valid admin account. Flow Scheduler invokes a Topics Flow to run on Dataflow (e.g., GOOGLE Dataflow). The pipeline of the Topics Flow receives as input: Joins over specific time period (e.g., 24 hours of Joins); a set of side models from GCS; and Clusters generated by a previous run. The Topics Flow then performs two separate remote procedures (RPCs) that are made to clusterers of Topics Clusterer, which is part of Clusterers Service. The first RPCs are performed per a topic clustering (e.g., all media content items with the term 'love', 'MLK', etc.), which creates "singleton" clusters. This topic clustering may score, state, and then build the "singleton" clusters. After the "singleton" clusters are created, the second RPCs are called with a set of top trending clusterers (e.g., top 400) to create stories about the trending topics. This second clusterer call may involve merging the top trending clusters.

The output of the Clusterers Service is a set of Cluster protos, which can contain all information about the clusters that were created by Topics Clusterer. The set of Cluster protos are stored on Cluster Bigtable. For serving Topic dynamic stories to search clients in ElasticSearch, the set of Cluster may be transformed into a set of dynamic story (DynamicStory) protos, which contain the necessary fields for serving stories of the set of Cluster. This set of DynamicStory protos may be written to the index of the ElasticSearch.

Flows to create other types of stories (other than topic stories) may be implemented similar to Topics Flow. For example, Events Flow creates event stories based on geographical and time proximity. Events Flow may have a flow similar to Topics Flow with the modification of binning Joins into regions and performing single clustering calls per a region.

In another example, MetaStories Flow creates stories from other stories. MetaStories Flow may have a flow similar to Topics Flow with the modification of that the input is no longer Joins, but rather Clusters, and Clusterer Service is called for metastories.

Figure 33:
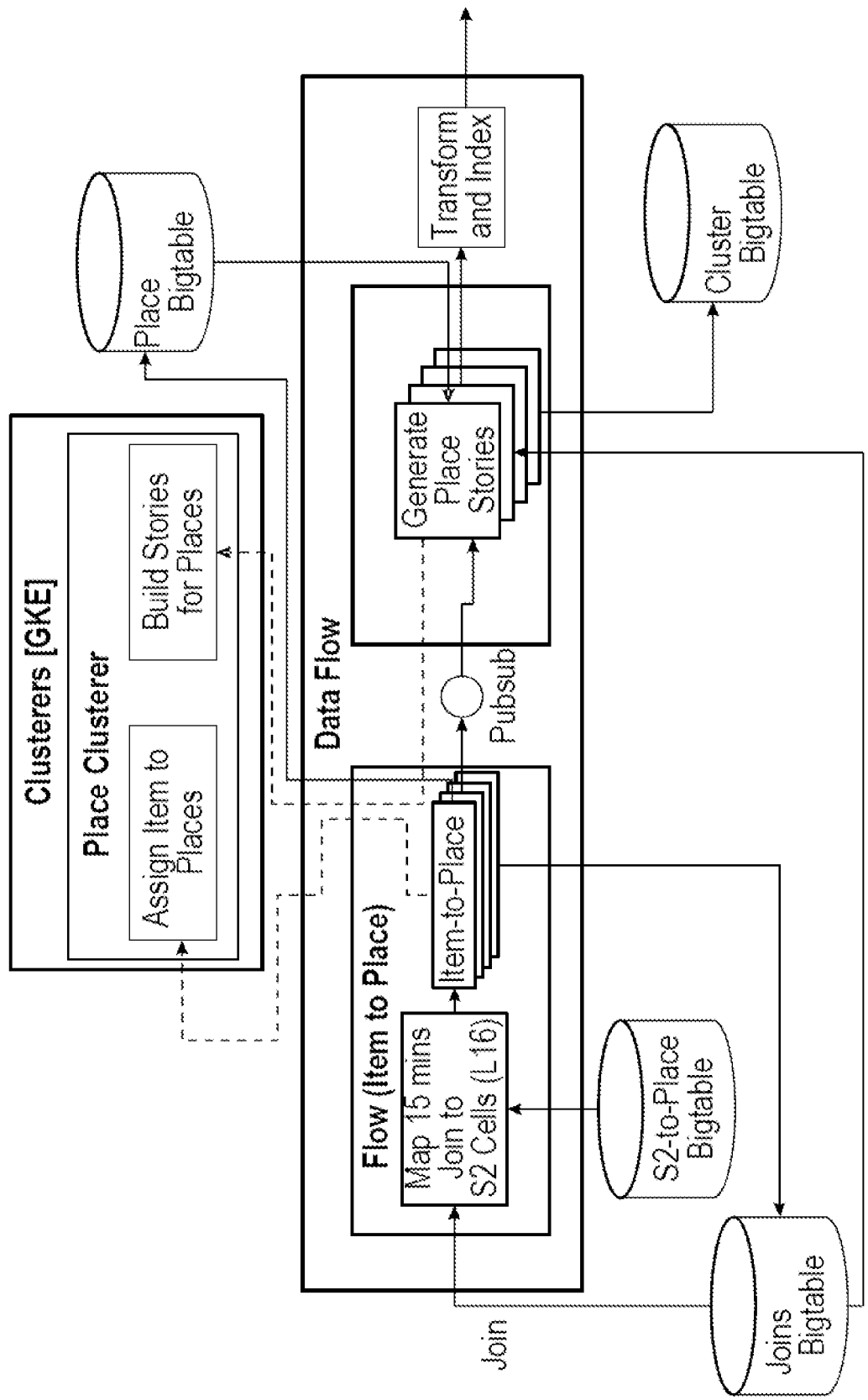

FIG. 33 is a diagram illustrating an example indexing infrastructure in accordance with some embodiments described in this document. In particular, FIG. 33 illustrates the Dynamic Story Creation stage in detail for Places Flows. For some embodiments, a selection stage works as an annotator for Joins, and story generation happens in a streaming dataflow as media content items are updated. In FIG. 33, Places Flow comprises two separate Flows: ItemToPlace Flow and PlaceStories Flow. ItemToPlace Flow bins Joins for a period of time (e.g., past 15 minutes). The Joins may be binned by S2 cells at level 16, which uses an index S2-to-Place Bigtable to bin the Joins. The Joins are joined with all the known Places (e.g., provided to S2 Cell). Subsequently, a call to Clusterer Service is performed (by Item-To-Place) to assign media content items to known Places. The known Places about may be stored in Place Bigtable. After media content items have been assigned known Places, the Place Ids with newly assigned Joins are sent (via GOOGLE Cloud Pub Sub) to PlaceStories Flow, a streaming Dataflow job performs story creation. ItemToPlace Flow writes back the Place assignment to the Join Bigtable as an annotation. This Place assignment may be more precise than the original Place annotation done by Joiner. ItemToPlace Flow also writes the Join ids that were matched to a place to the Place Bigtable, which creates a Place Id→Join Ids index.

PlaceStories Flow receives (via GOOGLE Cloud Pub-Sub) a message which triggers the dynamic story creation for a given Place. First the Place Bigtable is queried to retrieve all Join Ids that have been assigned to that Place, and then the actual Joins are retrieved from the Joins Bigtable. Clusterer Service is called to form Clusters for the Place and results are stored as described with respect to Topic Flow.

Figure 34:
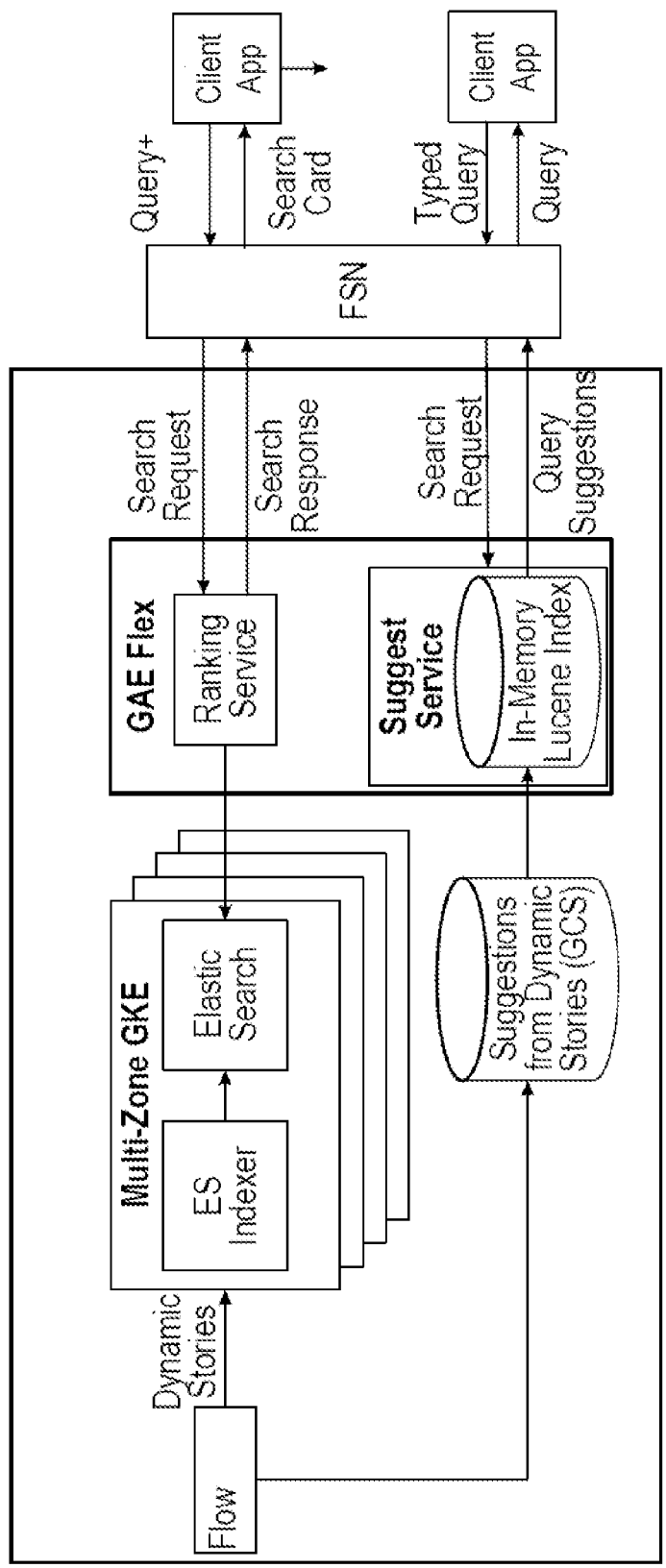
FIG. 34 is a diagram illustrating an example serving infrastructure in accordance with some embodiments described in this document.

FIG. 34 is a diagram illustrating an example serving infrastructure in accordance with some embodiments described in this document. The serving infrastructure of FIG. 34 comprises a search stack and an auxiliary suggest stack. The search stack is the main endpoint that takes in a user query and the user's location and generates search results with all dynamic stories that best match the user's interest. The suggest stack (represented in part by Suggest Service) takes in a partial user query and, as the user is typing, returns a list of suggestions for completion of the user query. For some embodiments, Suggest Service runs an in memory prefix search (e.g., in-memory APACHE Lucenem index) over dynamic stories generated to suggest the completions for a user query. Suggest Service may be a Java-based service running on Flex Appengine.

For some embodiments, a Suggest Request is triggered every X characters or second, and a client (e.g., mobile client) makes a request to the Query Suggest endpoint in the FSN. The FSN may perform client authentication and passes the request through to Suggest Service by issuing a URL fetch request. Suggest Service does an in-memory search using the user query against an APACHE Lucene™ index created from suggestions generated by a Flow pipeline (e.g., Topics Flow). The top set of query suggestions are returned to the FSN and passed through to the client to show the user. Suggest Service may operate as a separate service with its own in-memory APACHE Lucene™ index to avoid latency sensitive issues. Also, the Lucene™ index may be regenerated periodically by reading the latest output from a Flow pipelines.

With respect to the search stack, a user queries from a client (e.g., mobile device client) are sent to the search stack (via the FSN as a Search Request). The Search Request is passed through to Ranking Service, which may be a Python HTTP server running on GAE Flex. Ranking Service may run multiple producers based on the user's query and location to create the different sections for the user. Each product (e.g., EmojiCarrousel) issues queries against the indices of ElasticSearch for the dynamic stories that were generated by the indexing pipeline (e.g., Flow). Dynamic stories returned by the ElasticSearch are ranked, deduped across producers, and then combined into a final Search Response and sent back to the client (via the FSN). The FSN takes the Search Response from Ranking Service and passes it through to the client.

For various embodiments, search features described in this document utilize session logging. For instance, for a given query event, the following fields could be logged: language preference, which provides a comma-separated list of a user's device-level language preferences; query is suggestion, which indicates whether a query comes from a search suggestion; and source, which identifies the page source of a search session. In another instance, for result sections that return dynamic stories, events are be logged by a search backend. In yet another instance, a fields keep track user actions with respect to dynamic stories (e.g., skip to next, go to previous, exit story view, etc.), and track physical gestures of user action (e.g., swipe, tap, tap & hold, etc.) when viewing a dynamic story.

Figure 35:
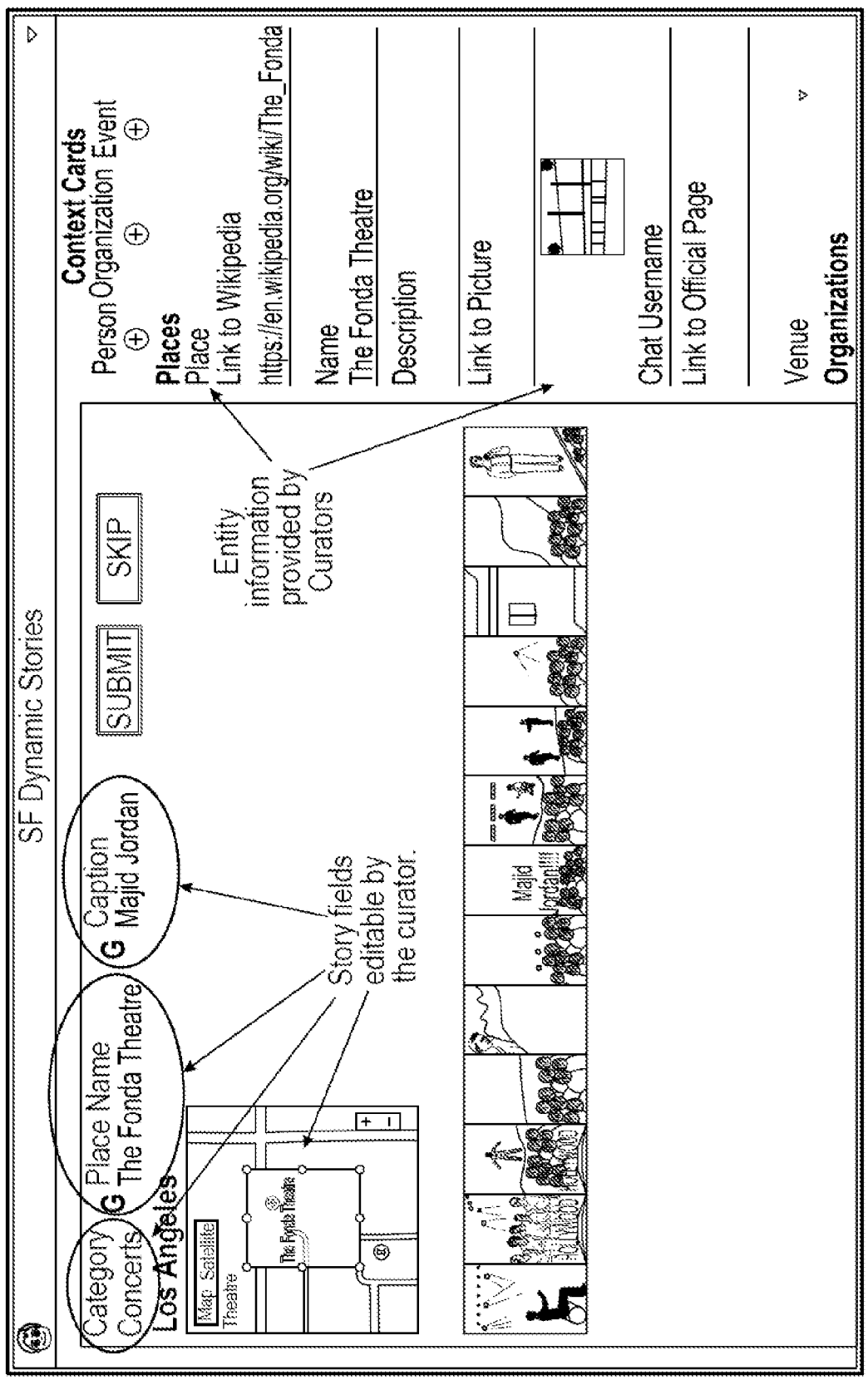
FIGS. 35 and 36 are screenshots of example graphical user interfaces for a social media content curation tool in accordance with some embodiments described in this document.
Figure 36:
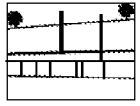
Figure 36:

FIGS. 35 and 36 are screenshots of example graphical user interfaces for a social media content curation tool in accordance with some embodiments described in this document. In particular, FIGS. 35 and 36 illustrate graphical user interfaces for a curation tool that is used to collect, gather, and create metadata and associate it to dynamic stories built from media content items submitted. The graphical user interface presents dynamic stories to curators, and curators can add, remove or correct elements of the dynamic stories (e.g., title, place, event name, etc.). These changes may be regarded as story metadata which is stored and fed back into a ranking service to improve algorithms and to ensure that similar dynamic stories apply the changes. Access to the curation tool and accompanying system may be restricted to an explicit whitelist to control access.

As used in this document, dynamic story can comprise a grouping of story media content items based on a topic (e.g., shares an event or a place or other theme). A curator can review a dynamic story (e.g., fetched from Ranking Service) and decide whether to add/remove/make a change to the story. Curated. Data comprises corrections and other changes produced by a curator after she/he reviews a dynamic story within the curation tool. A context card comprises a small card user interface that shows a name, an image, and a description.

For some embodiments, the curation tool comprises a web frontend component, a data storage system, a media access component, and a data enrichment system. The web frontend provides a curator (e.g., via a web browser) with a graphical user interfaces (e.g., FIGS. 35 and 36) that presents a dynamic story and its associated elements (e.g., caption, location, event name, event type, etc.) for review. The data storage system stores corrections from curators and, as such, each element of stored curated data may include a curator's id, time, and dynamic story id along with the corrected elements. The media access component enables access to social media content via the FSN described in this document. The data enrichment system uses data from external sources (e.g., Wikipedia) to augment what is known about a dynamic story. For instance, after it known that a specific dynamic story a presidential rally, a curator should be able to associate the dynamic story with the presidential candidate and all information associated with the presidential candidate (e.g., full name, age, political affiliation, etc.).

Components of curation data can include, without limitation: caption or title of a dynamic story; place name associated with the story; entities associated with the story (e.g., performer for a concert story, or the politician for a rally story); information about the associated entities (e.g., name, user identifier, official website link, associated Wikipedia page link; link to a picture of the entity (e.g., posted on Wikipedia page). Components of curated data can also include, without limitation: Boolean indicating whether a story contains media content items from multiple locations/events (e.g., a mixed story); Boolean indicating whether a story has captions predominantly from a non-English language; Boolean indicating whether a story being offensive; story rating for how interesting the story is (e.g., discrete values such as {awful, bad, ok, good, love it}); emoji character(s) associated with the story (e.g., curator choose which emoji is best associated with a story); cover media content item id (e.g., curators can change the cover media content item if they feel the cover media content item could be better); removed media content item ids (for media content items removed from the story because, for instance, they are low quality {filled with unappealing media content items that do not form a clear story}, offensive or blurry etc.); highlight media content item ids (e.g., up to 10 media content item ids that represent the highlights of the story); and keywords associated with a story (e.g., curator provide a few keywords that are relevant to the story—based on media content items and not restricted to captions); Boolean indicating relevance of sub stories to main story; newsworthiness (e.g., {not news, local, city, state, country, global}); and related news URLs.

To facilitate certain features, the curation tool utilizes APIs (e.g., GOOGLE APIs), for obtaining location information, knowledge graphs, and performing web searches. Such APIs can enable curation tool to present, for example, locations, related entities, and news related to entities in a dynamic story. The curation tool can also utilize data extracted from public sources to find attributes of an entity (e.g., like stadium capacity), which might be useful to present in a context card.

For various embodiments, curated data generated by the curation tool is maintained separate from user data, no media is stored with the curated data, and no curated is copied or stored by the curation tool. Through the curation tool, curated data can be used to generate context cards, apply changes provided by curators to other similar dynamic stories, and collect store changes to dynamic stores from curators. In this way, curators can implement corrections and add enrichment (e.g., add title, place name, selection of representative media content items, links to news, etc.) to a dynamic story. Curation may be scheduled to take place after media content items are selected algorithmically to create stories.

With respect to a dynamic story, information of interest for curation may include, without limitation, an associated place, associated people, associated organizations, associated events, and the like. Dynamic story metadata can include, without limitation: caption or title correction, where captions may be indirectly derived from user captions on media content items; dynamic story category (e.g., concerts/games/fashion/food/politics); place name correction, where place name may be derived from GPS info on user media content items and Google Places API; place bounding box correction (e.g., outline the boundary of the place on the map); entity metadata, which is information about a specific entity (e.g., Kendrick Lamar) and may be from public sources (e.g., like Wikipedia); place metadata, which is information about a specific entity (e.g., Staples Center) and may be from public sources public sources; entity-story association, which can tie an entity (e.g., Kendrick Lamar) to a specific dynamic story (e.g., he/she is performing there, or is in the audience, or is a producer of the show etc.); curator information (e.g., name); and time curation was submitted.

With respect to some embodiments, curating dynamic stories by the curation tool involves: the title of the story; place name; bounding box for the place; whether it is a mixed story; whether the story is in non-English; whether the story contains offensive material; whether the story is low quality; emoji characters associated with the story; ratings for how interesting the story is; or context cards for places/people/organizations/events related to the story.

For various embodiments, the curation tool is utilized to curate concept stories ("chatter" stories) around a concept or topic rather than an event that happens at a specific time or place. For instance, a concept story for "Snow" could show media content items from all over the United States on dramatic/interesting, snow maps. Curation with the tool may involve: the title of the story; whether the story is in non-English; whether the story contains offensive material; emoji characters associated with the story; ratings for how interesting the story is; remove low quality media content items; pick cover media content item; pick highlight media content items; keywords for the story; or context cards for places/people/organizations/events related to the story.

For some embodiments, the curation tool is utilized to curate concept topicality, whereby a curator is shown media content items for "sub stories" of a main story and asked media content items are relevant to the topic of the main story.

Additionally, for some embodiments, the curation tool is utilized to curate breaking news, whereby curation involves: the headline of the story; place name; bounding box for the place; whether it is a mixed story; whether the story is in non-English; whether the story contains offensive material; whether the story is low quality; newsworthiness; keywords for the story; context cards for places/people/organizations/events related to the story; or related news URLs.

In FIG. 35, the graphical user interface illustrates an example of what actual data that gets stored for a dynamic story looks like. Specifically, this is a dynamic story of a band called Majid Jordan playing at the Fonda Theatre, In FIG. 36, entity information for the place is provided on the left, and entity information for the band is provided on the right.

Figure 37:
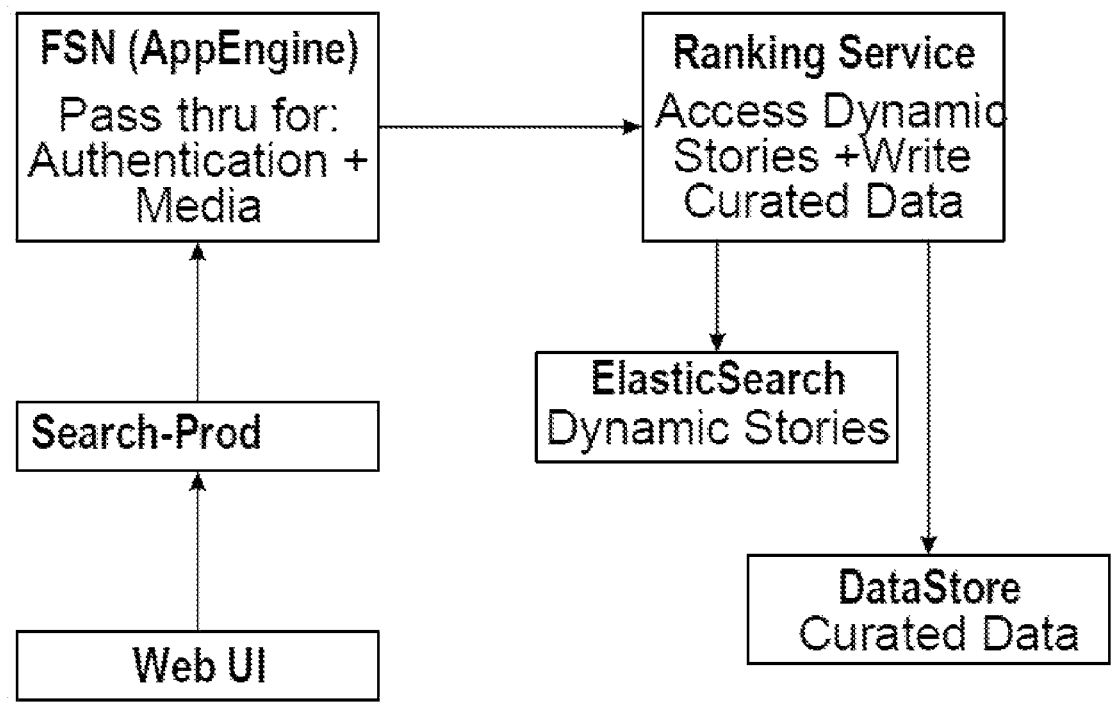
FIG. 37 is a flow diagram illustrating an example request flow in a social media content curation tool in accordance with some embodiments described in this document.

FIG. 37 is a flow diagram illustrating an example request flow in a social media content curation tool in accordance with some embodiments described in this document.

Figure 38:
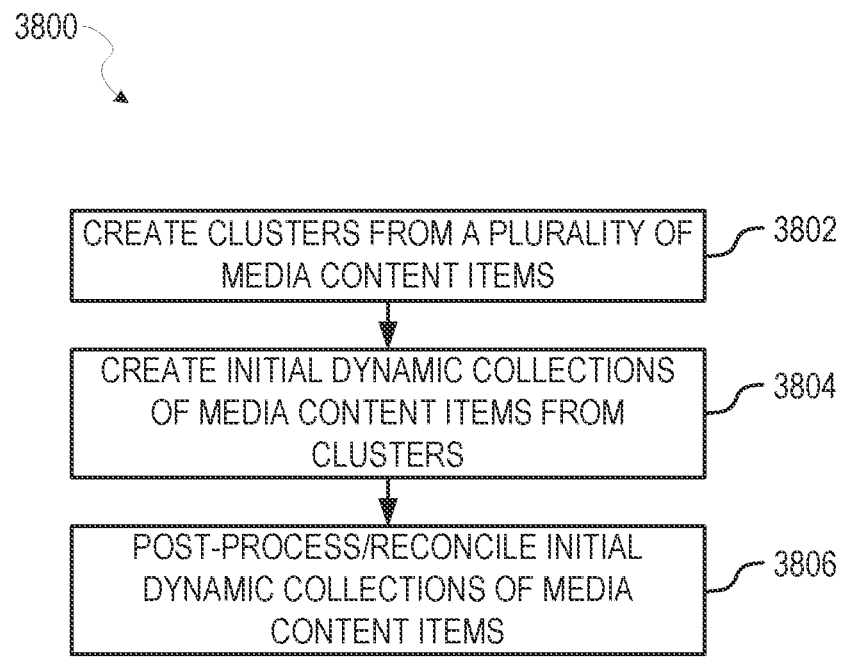
FIG. 38 is a flow diagram illustrating an example method for generating dynamic collections of media content items in accordance with some embodiments described in this document.

FIG. 38 is a flow diagram illustrating an example method 3800 for generating dynamic collections of media content items (e.g., stories) in accordance with some embodiments described in this document. The method 3800 begins at block 3802, with clusters being created from a plurality of media content items, thereby grouping media content items into cohesive clusters, where cohesiveness can be in time, space, visual features, topics, and the like. For some embodiments, various types of clusters are created for different types of collections of media content items.

For example, geo-time clusters are created. Geo-time clusters can capture collections of media content items (e.g., stories) that are mostly around an event and are cohesive in time and location. A range of similarity signals on top of time/location may be taken into account to assure media content items that are clustered tell the same collection of media content items (e.g., story). These similarity signals include, but are not limited to: visual similarity; caption (salient term) similarity; topic similarity (e.g., two (sets of) media content items that are fashion media content items and are close by are more likely to be clustered together); place similarity (e.g., similarity of place entity assigned to two (sets of) media content items is considered a strong signal for considering clustering them together); and On Demand GeoFilter (ODG) similarity.

In another example, topic ("chatter") clusters are created, Topic clusters can be cohesive around a theme or topic but are not necessarily tied to a specific time and location. In some instances, topic clustering is accomplished in two steps. In the first step, single topic clustering is performed by clustering all media content items (e.g., in the past 24 hours) containing a topic for each distinct topic (e.g., currently identified as a distinct significant caption term or visual label but expandable to any rule expressed in terms of features of the media content items). A score profile is created during the first step. Components of the score profile can include, without limitation, the independence of topic (reflecting how sufficient the topic is to describe the majority of media content items); the popularity of the topic in terms of the number of posted media content items that are relevant to the topic; the freshness of the topic measured using the age distribution of media content items about the topic; the novelty of the topic measured by comparing the volume of fresh media content items about this topic compared to the historical volume for this topic; the globalness of the topic that reflects how geographically spread the media content items relevant to the topic are; and the quality and descriptiveness of the collection of media content items (e.g., story) for the topic that reflects the quality (e.g., including media quality, user/creator quality, etc.) of media content items shown for that topic and how well they tell the collection of media content items (e.g., story) for that topic (for e.g. video media content items are generally considered more descriptive than image media content items). Based on all the score components, an overall score is generated to represent how interesting the topic cluster is. The score components along with the overall score are used in merging similar topics during the second step and also for ranking topic collections of media content items (e.g., stories) in user interface presented to users (e.g., the topics carousel).

In the second step, similar topics are merged. Depending on what topics are trending, the trending topic collections of media content items (e.g., stories) can be correlated and in some cases redundant. Hence, in the second stage of topic cluster generation we merge similar topics together. Given the cost of topic clustering/merging, for some embodiments, full merging is only performed for the top topic clusters (based on the score computed in the first step) and join the other topic clusters to the merged top clusters. The merging of two topic collections of media content items (e.g., stories) can be done based on a variety of similarity criteria including, without limitation: synonym match between two topics; ngram similarity between terms associated with two topics; context similarity between based on the aggregate salient terms of media content items associated with two topics; context similarity based on similarity between users posting media content items about the two topics; and language mismatch is used as a negative similarity signal.

At block 3804, initial dynamic collections of media content items (e.g., stories) are created from the clusters. This may be accomplished by finding collections of media content items (e.g., stories) within the cluster and inferring attributes of the collections including place name, caption, topic, highlight, repeated-ness, and the like. Given clusters of media content items (from block 3802), during block 3804 the method 3800 finds the collections of media content items in each cluster and determines what each collection of media content items (e.g., story) is about. For various embodiments, block 3804 involves: identifying sub-collections (e.g., sub-stories) within the cluster (e.g., based on time, geo, visual, and cohesiveness); breaking the over-clustered events into multiple collections of media content item (e.g., stories); finding a caption for each collection (e.g., story); find a place name for each collection; finding a category of the collection (e.g., concert, game, and fashion); creating a highlight for each dynamic collection; and determining whether a collection is a repeated happening. Creating highlight for each dynamic collection involves: finding the highlight at the order viewable by the user; and finding a hero (e.g., cover media content item) for the highlight. The highlight is selected based on scoring, which may have the following factors/criteria considered: cohesive and representative of the collection; has high collection telling score; has high creative quality score; generally preferred to be a video media content item rather than an image (e.g., with the exception of the collection being image seeking); and does not contain low quality media quality relative to all the candidates for highlight selection. Media quality can be calculated from the input signals described in this document and may be generally aimed to remove black/dark, very bright with no visual content and shaky media content items. Find a hero for the highlight may consider the following factors/criteria: has a high score in highlight scoring; representative in visual features relative to what the collection is about; not a selfie media content item; and does not have a caption on the media content item.

At block 3806, initial dynamic collections are post-processed and reconciled, which generated final dynamic collections. For some embodiments, post-processing comprises: merging collections with similar caption or place; de-duping collections that are too similar (e.g., shared media content item volume, or caption/place similarity); filtering bad clusters (e.g., based on no place name, no collections, and topic based filtering); detecting ancestors (e.g., by generating stable ids to establish continuity between runs [deduping with the past] and keeping a running history of the cluster); and aggregating stats, such as generated cluster sources and sizes (to track pipeline health) and top salient terms and concepts.

FIG. 39 is a screenshot illustrating an example graphical user interface including an emoji shortcuts section for a pre-typing view in accordance with some embodiments described in this document. As shown, the emoji shortcuts section comprises of a horizontal scroll of emojis in pills that, after selection (e.g., user finger tap), take a user into a search experience as if they had typed the word that's associated with that emoji. This may be accomplished by an associated word being entered into the search box when an emoji is tapped by the user. Examples of emoji-word association include, without limitation: a tongue with the word "restaurants"; dolphin with the word "dolphin"; a Japanese flag with the word japan"; a basketball with the word "nba"; statue of liberty with the word "new york"; a drink with the word "bars"; and a table tennis paddle with the word "table tennis." Example types of emoji shortcuts include, without limitation, locations (e.g., "Japan", "New York"), categories (e.g., "Bars" and "Restaurants"), topics (e.g., "dolphin" and "table tennis"); and events. The listing of emoji pills can be presented as a carousel such that a user can swipe in one direction and loop back to the opposite end of the listing.

With respect to some embodiments, ranking emojis in the listing of emoji pills is accomplished by two components: an offline (e.g., at story building time) computation of a list of relevant emojis for each story; and an online (e.g., when producing the pre-type search page), generation of an emoji listing (e.g., carousel) based on the most recent set stories (e.g., K stories). The offline computing of the list of relevant emojis may comprising using a set of signal including, without limitation: story captions (e.g., text captions from the media content items in the story) and the emojis the users typed in their captions; top salient story terms; story category; and derived aggregate data, such as term IDF tables, an emoji to terms model, and a term to emoji model. With respect to the online generation of an emoji listing, for each story in the most recent set of stories, the following can be retrieved: story id; display caption; top story salient terms; geographic location (e.g., lat/long); raw media content item count; emoji annotation; and story timestamp (e.g., 95-percentile story timestamp). Emojis are extracted from all the stories retrieved, de-duped (for the similar ones), and ranked based on freshness and volume of the underlying stories. For each emoji extracted, the caption of the best ranked story (e.g., by volume and freshness) that has that emoji is assigned as a search query associated with the emoji. In some instances, the top set of emojis (e.g., top 15) are presented to a user in an emoji carousel.

Figure 40:
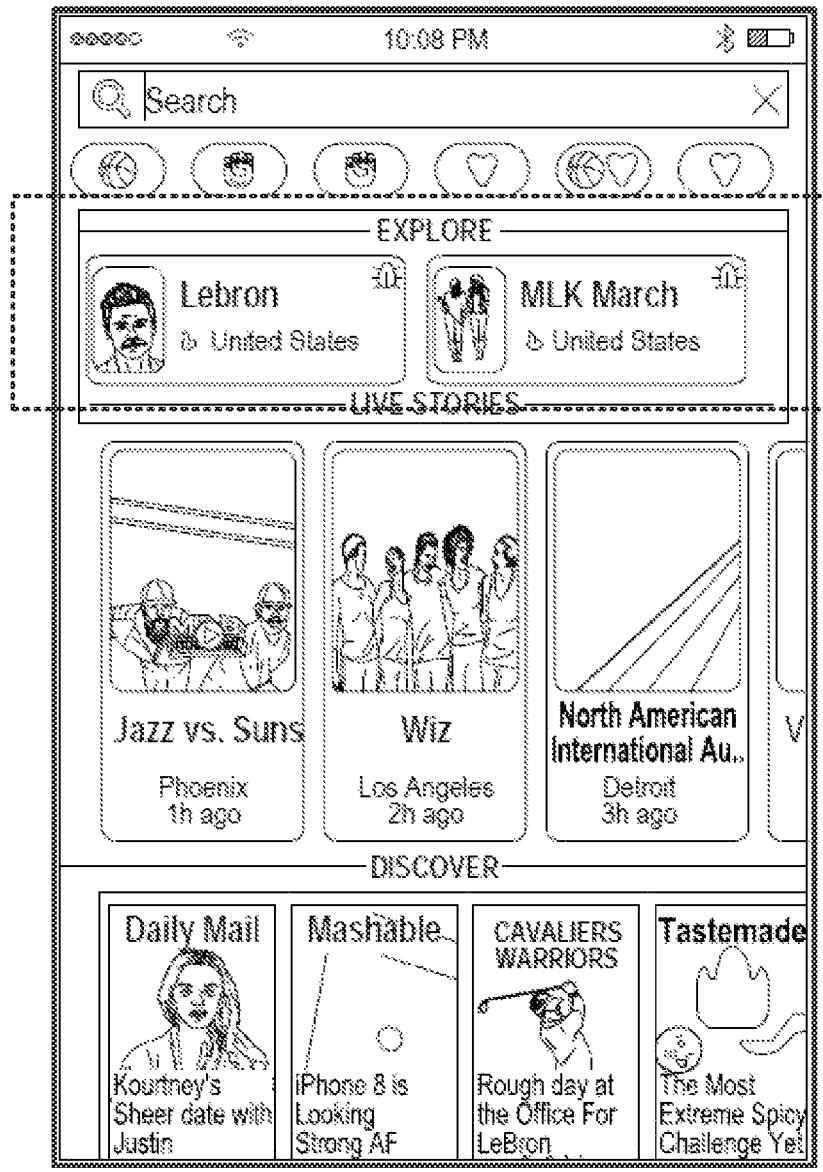

FIG. 40 is a screenshot illustrating an example graphical user interface including a topics section for a pre-typing view in accordance with some embodiments described in this document. As shown, the topics section comprises a carousel of stories each titled by a topic and each consisting of a set of media content items relevant to that topic. For some embodiments, topic stories are detected and ranked based on a set of signals including; without limitation: independence; popularity; freshness; novelty; globalness; proximity; quality; and descriptiveness. The independence of the topic may reflect how sufficient the topic is to describe the majority of media content items associated to that topic. For instance, topic A is not independent if, among the media content items containing the attributes (e.g., terms, labels, etc.) of A, majority of them are dominated by attributes (e.g., terms, labels, etc.) from topics other than A. The popularity of the topic may be in terms of the number of posted media content items that are relevant to the topic. The freshness of the topic may be measured using the age distribution of media content items about the topic. The novelty of the topic may be measured by comparing the volume of fresh media content items about this topic compared to the historical volume for this topic. The globalness of the topic may reflect how geographically spread the media content items relevant to the topic are. The proximity of the topic may reflect how relevant the topic is to where user is. The quality and descriptiveness of the story for the topic may reflect the quality (e.g., including media quality, user/creator quality, etc.) of media content items shown for that topic and how well they tell the story for that topic (e.g. video media content items are generally considered more descriptive than image media content items). For some embodiments, diversity of the topics carousel is secured by making sure that redundant topics are merged together in the online story generation pipeline.

Figure 41:
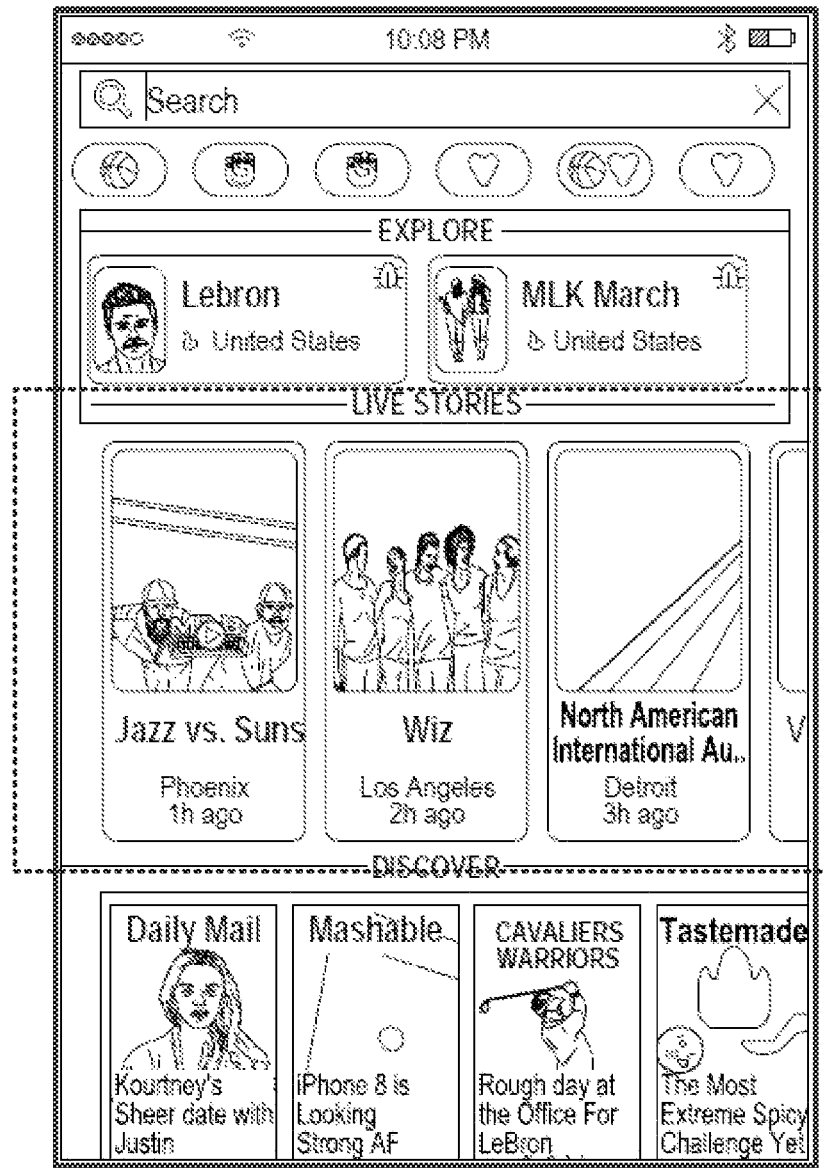

FIG. 41 is a screenshot illustrating an example graphical user interface including a live stories section for a pre-typing view in accordance with some embodiments described in this document. As shown, the live stories section comprises a carousel of stories each corresponding to an event each titled by a caption and location (e.g., city) for the event and each containing a set of media content items showing the highlights of the event. For some embodiments, live stories are selected and ranked based on a set of signals including, without limitation: freshness; proximity; diversity; and quality and descriptiveness. Freshness reflects how recently the story was posted or updated. For the live stories section, there is a preference that events are identified to be live as compared to the stories for events that have already ended, and if the events are finished, there may be a preference to list stories from the same day compared to older events, Proximity reflects proximity of the event to the user. For the live stories section, there is a preference for stories that are within the same city as the user and apply a demotion to the stories based on their distance to the user. Diversity is secured by making sure that stories shown in the carousel cover a variety of categories of events including, without limitation, sports, concerts, fashion, and politics. The quality and descriptiveness of the story reflects the quality of media content items shown for the event and how well they tell the story for the event.

Figure 42:

FIG. 42 is a screenshot illustrating an example graphical user interface including a media content item tabs section for a pre-typing view in accordance with some embodiments described in this document. As shown, the media content item tabs comprise a table of multiple tabs each containing a list of stories within a certain category. Examples of those categories include, without limitation, breaking now; attractions; concerts; games(sports); fashion; politics; parties; filters; feels; highlights; and pets. Breaking now provides a list of live stories going on right now, can include news stories, and can be sorted based on newsyness, proximity to the user, or media content item/user volume of the stories. Attractions provides a list of stories about attractions close to the user. Attraction stories can be ones that are identified to be repeating almost daily with similar content (e.g., in terms of media content item captions and salient terms) and similar volume in the same place (e.g., stories like DISNEYLAND, UNIVERSAL STUDIO, and Griffith Observatory). Concerts provides a list of concerts sorted by freshness, proximity, volume, or quality of the stories. The aggregate salient caption terms and visual labels of story media content items may be used to identify whether a story is a concert or not. Games provides a list of sports stories sorted by freshness, proximity, volume, or quality of the stories. Similar to concerts, aggregated salient caption terms and visual labels of story media content items may be utilized to identify the category/topic of the event and further a set of third party sports events are used to canonicalize the caption of the sports games (e.g., from Go <team-name> which is a media content item based caption of the story to team A vs. team B which is the canonicalized name of the event). Fashion events provide a list of fashion stories that are categorized and ranked, possibly similar to concerts and games. Politics events provides a list of political stories that are categorized and ranked, possibly similar to concerts, games and fashion events. Parties provides a list of party-related stories that are categorized and ranked, possibly similar to concerts, games, fashion events and politics events. Filters provides a list of stories each representing media content items from a certain close by geo filter, and may be sorted by freshness, proximity, quality, or density of the story. Feels provides a list of stories from nearby media content items each around a certain sentiment (e.g., happy, sad, shocking, etc.). A set of keywords and emojis per feeling may be used to identify the association of a media content item to a feeling. Highlights provides an overview of major nearby events in the past week. Pets provides a list of stories each around media content items about a certain pet, and the association of a media content item to a certain pet category may be accomplished based on the visual labels of the media content item.

According to various embodiments, dynamic stories are generated for specific places and large locations, merged from multiple data sources in real time for media content item submitted live, and indexed to support place and location various sections described in this document: pre-typing views, such as current place, around me carousel; and post-typing cards, such as for queries of specific places or larger areas like neighborhood, city, universities, and the like. A backend of building dynamic stories for places may be shared across all the views, and a ranking module (e.g., light weighted) may be applied to each view individually. Core components of the backend comprises, for example: media content item-to-place assignment; place story generation; location story generation; and online ranking. Media content item-to-place assignment assigns each media content item (e.g., that is summited to live) to the best matched place using a probabilistic model of a mixed of signals in a real-time data pipeline. Place story generation regenerates a dynamic story using latest media content items for each place assigned to the media content items. Location story generation mixes dynamic stories from local places, current events and trending topics, and may do so for larger areas where media content items are refreshed frequently. For both pre-typing/post-typing views, a ranking module is applied to all the relevant stories in the context (e.g., plus additional place data, from Google API, etc.) to select the best card to show in real-time.

With respect to media content item-to-place assignment, each media content item submitted to live may be taken together with other media content items within a fixed time window, and may be assigned to the best matched place using a probabilistic model. The candidate places can be from multiple data sources, including: GOOGLE Place Response passed by mobile clients using GOOGLE's Place Detection API; GOOGLE Place Response from querying GOOGLE Geocoding/Reverse Geocoding APIs and GOOGLE Place API, in the backend; a geo-indexed Open Street Map data; existing geo-filter data; and geo-fences data through third party partnerships. For some embodiments, the assignment is accomplished through a probabilistic approach, which utilizes a mixed of cues or signals. Example signals can include, without limitation; geo signals; temporal signals, text signals, visual signals, and quality signals.

Geo signals can comprise associated GPS data with each media content item, and the known lat/long of each place candidate. The accuracy and quality of GPS data may be similar to the error range to many small places in interest. The distances of a list of candidates within a relative larger range may need to be taken into consideration in a statistical fashion. Temporal signals can comprise the opening hour, and historical temporal activity pattern, of a place, which can be used to match against the media content item based on its location timestamp. Text signals can comprise place name and other text properties (like description, salient term profile, etc.) which can be used to match the text properties of the media content item, including caption, media content item labels learned by deep learning models from image content. Visual signals can comprise simplified visual models, such as indoor/outdoor/vehicle, which can help to match certain place types which has obvious indoor property. An alternative approach can use all previous annotated media content items to learn visual features of the place, and use it to compute the distance from the visual features of the specific place. Quality signals can comprise the quality of the place like ratings, previous activity, daily volume, and the like, which can indicate the media content item has a higher chance of being taken there. A prior of probability on each place may be pre-computed offline using foot traffic data (e.g., user activity geo-temporal map).

With respect to place story generation, a dynamic story of the place is generated using the media content items that have been assigned to it. For some embodiments, dynamic stories are constantly regenerated for places when fresh media content items are submitted and assigned to them. The ranking algorithm that selects media content items for the place dynamic story may consider: freshness of the media content items (e.g., for specific places like bars, the story will give users a sense what is happening right now at the place); events at the place (e.g., latest events (with lots of media content items at similar time) will be included in the dynamic story); quality of the media content items (e.g., a flexible quality measure, that combines user score, media score and other factors, may be used to filter low-quality media content items); and cohesiveness of the story (e.g., the algorithm tries to balance between the vibe and theme of the place). Additionally, a place profile (e.g., including salient terms, visual features, etc.) can be used to select representative media content items based on historical media content items.

With respect to location story generation, a dynamic story for a larger location, like city, neighborhood, university, etc. is generated by combining sub-stories from local specific places, live events, and topical events. For each dynamic story, a place is annotated using its geo bounding box. The location story data pipeline may constantly aggregate all the place stories and latest live events and topical stories according to the neighborhood and city info of the place. Sub-stories may be selected to show the vibe and live atmosphere in the location, by a ranking module that takes into account various metrics of each story: volume, freshness, story quality, etc.

With respect to online ranking, for each view supported by place stories, a ranking module is applied online based on retrieved candidate stories. For instance, for current place, the nearest place story (a list of nearest place stories) is be retrieved using the user's current location; which will be compared to GOOGLE Current Place API to determine which card type to show. For around me carousel, a batch of candidate nearby place stories, and event stories are ranked based on their scores, including freshness, quality, volume, and the like. For post-typing queries, the place/location stories are queried when a user types the keyword. The candidate stories can be scored to determine if the location/place card, which contains the place/location story, should show up.

Figure 43:
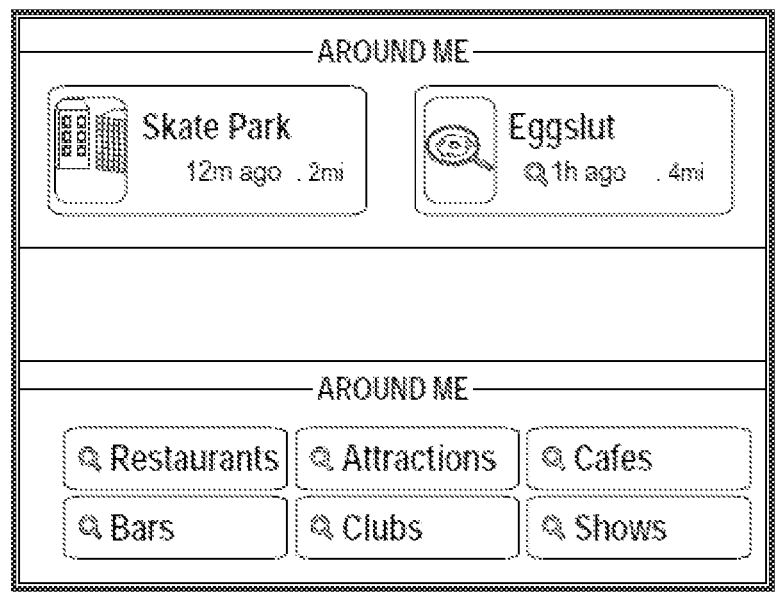

FIG. 43 is a screenshot of an example graphical user interface that presents an around me section of a pre-typing view in accordance with some embodiments described in this document. As shown, the around me section includes stories for specific places and large locations in close proximity to the user.

As noted in this document, a post-type result is generated while the user is typing in the search box. When the user starts typing, a list of stories that are topical for queries starting or very similar to what the user has typed begin to show up. The results may be rendered in different forms including, for example: a story list; a hero card with see more button; or a stand-out hero card. What queries are shown can depend both on the similarity of query to user input and also significance/quality of the story topical for the query. In some instances, a hero card appears when there is no ambiguity about the intent of the user, and the shown result is a single story that includes the highlights of the most relevant stories around the query in a ranked order. The ranking of story highlights within the hero card is accomplished based on a variety of signals including, without limitation: centrality and topicality of the query for the story; proximity; freshness; popularity (e.g., reflected by the number of media content items in the corresponding story); and quality including the media quality, diversity of media content items and descriptiveness of media content items.

Figure 44:
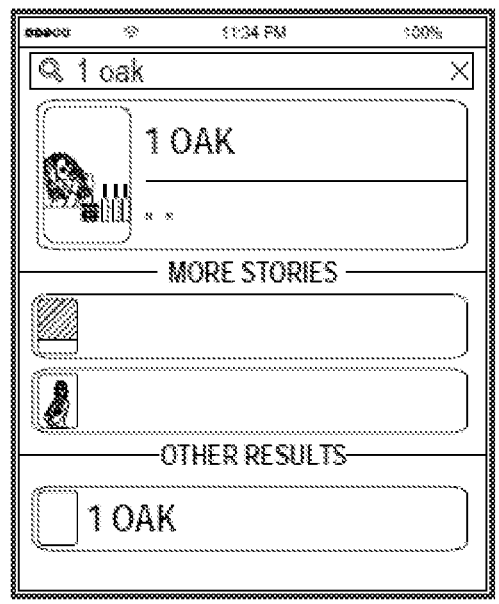
FIG. 44 is a screenshot of an example graphical user interface that presents a section of a post-typing view in accordance with sonic embodiments described in this document.

FIG. 44 is a screenshot of an example graphical user interface that presents a more stories section of a post-typing view in accordance with some embodiments described in this document. The more stories section provides a set of dynamic stories related to the current story typed. These stories may not be exactly what user searched for but may be peripheral stories around the main story. The more stories section involves a trigger condition where the section is only triggered when there is already a selected hero card (i.e., search result provided). One there is a selected hero card, it is analyzed to generate more stories for the given story provided by the hero card. Input signals utilized to populate the more stories section includes, without limitation: captions and visual labels of media content items which are the results for the user query (e.g., in the hero card) and expand search queries using historical concurrence; location of the user when he/she issues the query or location within the query; and type of the results for the user query. Examples of types can include a live event (e.g., concert or games), concept (e.g., ski or Christmas), place (e.g., 1 Oak or Staple Center), or location (e.g., London or North Beach).

The types of queries and types of more stories presented in the section may be based on the hero type used to present the results. For example, more stories presents live events query stories for the neighborhood/city, other nearby live events, earlier events in the same venue. More stories section presents concept query stories with similar feel like. So, for instance, a hero card presenting ski would have a more stories section presenting snowboarding, a hero card presenting winter would have a more stories section presenting snow fall, and a hero card presenting Christmas would have a more stories section presenting gift unwrapping. If the concept has local significance, other locally significant stories may be presented by more stories, such as a hero card presenting Santa Con would have a more stories section presenting Santa Con SF. More stories section presents place query stories to show stories from same place type (e.g., bars/restaurants/clubs), which can include stories about the neighborhood and city as well as story about nearby attractions. More stories section presents location query stories about popular places and attractions in the location as well as stories about sister locations (e.g., Venice presents Santa Monica Pier).

A related search section involves queries which can be viewed as pivots for exploration around a different dimension from the current search query. The related search section queries may be complementary to the queries being performed for the more stories section. While a more stories section provides peripheral information related to the user query in the same context in the form of a story, the related search section queries can provide user a way to pivot into a new context in the form of new query. According to some embodiments, the signals and inputs used for creating the related searches section are similar to that of more stories.

Query suggest provides suggestion as user type in queries, based on both user context and our index of stories. Through autocomplete, user efforts to type a whole search query can be reduced, and the user can also be guided to search the best content. The index for the query suggest is based on, for example: information from stories generated from other pipelines that have high probability to become a query, such as location, captions etc.; and top queries from logs. On the serving side, the context of client is used to provide the best guess of a user intended search query. The context includes, for example: the partial query user is currently typing; the Location, and the language.

Breaking news section provides a set of dynamic stories intended to capture newsworthy events as they happen and, as such, it may not appear in every pre-type search. Breaking news may only display when there is a sufficiently important story currently ongoing or in the recent past. Breaking news section is created through a pipeline similar to the one that creates dynamic stories for the live story carousel. Like for live story, the pipeline runs the exact same logic on a smaller set of input media content items, Unlike live story, the pipeline for breaking news may run on smaller window of time (e.g., last 30 minutes of media content items).

For breaking news section, media content items from submit-to-live come as input to the story generation pipeline, and these media content items have captions, location, etc. From these media content items, stories are generated, which are groupings of media content items associated with a location, a descriptive caption, a cover media content item, or a selection of media content items to show to the user. For ranking, the stories are assigned a 'newsiness score,' which captures both the relevance and significance of the story. By the newsiness score, stories can be distinguished between where users appear to be discussing a newsworthy topic, as well as those that have sufficient media content item volume and diversity of contributing users. According to some embodiments, in order to show a story in the breaking news section, its newsiness score must exceed a threshold. Among those stories whose scores exceed the threshold, the ordering is decided based on the newsiness score, the story freshness, and the proximity of the story to the user. From the client perspective, the breaking news sections presents stories in similar many as other dynamic stories in the client. As such, stories in the breaking news section can have a caption algorithmically generated from the user captions, a cover media content item, and a list of media content items to display when the story is selected.

People search and related people sections provide stories from popular users. A popular user may be defined as an account with public story privacy and at least five thousand followers. Popular users may have names, categories, and associated locations curated. According to some embodiments, a search index is created for each popular user/account that contains the following: username; display name; any names for popular users curated; categories the popular user is associated with (e.g., NBA, hip hop, fashion, yoga) and which may be curated; associated locations curated; and official story indicator (e.g., emoji) if applicable. A popular user may appear in the search results for a match on: any of the above names with no minimum prefix length; any of the above categories; or on any other popular user that is contained in their same category.

Figure 45:
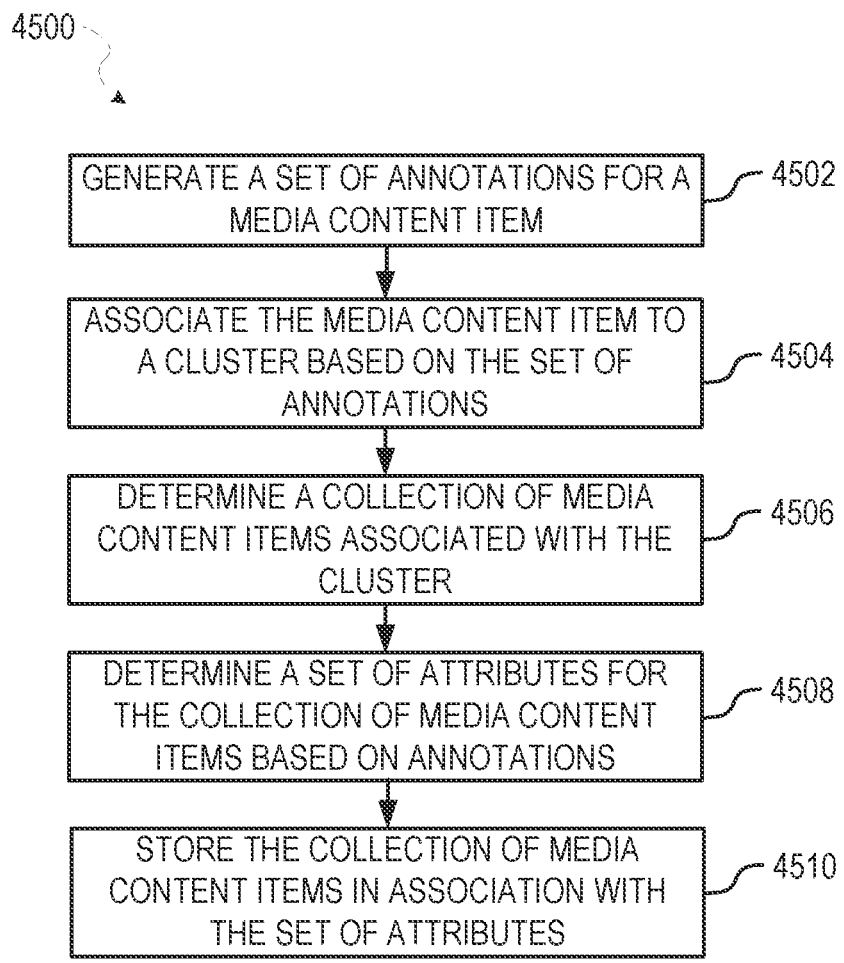
FIG. 45 is a flow diagram illustrating an example method for generating collections of media content items in accordance with some embodiments described in this document.

FIG. 45 is a flow diagram illustrating an example method 4500 for generating collections of media content items in accordance with some embodiments described in this document. The method 4500 begins at block 4502, with a set of annotations being generated for a particular media content item, in a plurality of media content items, based on metadata of the particular media content item. For some embodiments, the set of annotations including information inferred or derived from the metadata.

At block 4504, the particular media content item is associated with a cluster based on the set of annotations generated for the particular media content item at block 4502. For some embodiments, the cluster groups together certain media content items, within the plurality of media content items, based on a relationship between at least one annotation of each of the certain media content items. The relationship may relate to, for example, geographical proximity, time proximity, similarity of caption terms, similarity of a place, similarity of a visual feature, similarity of an event, similarity of a metric, or similarity of a user statistic. For some embodiments, the relationship between the annotations of two or more media content items reflects the cohesiveness of those media content items with respect to one or more dimensions (e.g., time, space, visual features, topics, etc.). At block 4506, a collection of media content items (e.g., story), associated with the cluster, is determined (e.g., identified) from the plurality of media content items. At block 4508, a set of attributes is determined, for the collection of media content items, based on at least one annotation of a media content item included in the collection of media content items (determined at block 4506). At block 4510, the collection of media content items is stored with the set of attributes determined at block 4508.

Determining the collection of media content items from the plurality of media content items may comprise determining a plurality of collections of media content items. According to some embodiments, the plurality of collections is reconciled by merging at least two collections of media content items, in the plurality of collections, based on a similarity between at least one attribute of each of the at least two collections of media content items, some embodiments, the plurality of collections is reconciled by removing a particular collection of media content items, from the plurality of collections, based on a similarity between at least one attribute of the particular collection of media content items and another collection of media content items in the plurality of collections. For sonic embodiments, the plurality of collections is filtered to produce a filtered plurality of collections of media content items that includes media content items having at least a minimum set of attributes.

For various embodiments, determining the collection of media content items from the plurality of media content items comprises selecting a highlight media content item, from the collection of media content items, to represent the collection of media content items based on a set of scores associated with the highlight media content item.

With respect to searching, the method may further comprise: indexing the plurality of collections of media content items; searching the plurality of collections of media content items based on a search request from a client device to identify a set of collections (e.g., collections of media content items) of interest; and providing search response to the client device based on the searching, the search response identifying the stored collection of media content items as part of the set of collections of interest. The search response may provide access to the stored collection of media content items through at the client device.

The set of attributes may include at least one of a caption associated with the collection of media content items, a place name associated with the collection of media content items, and a category associated with the collection of media content items. The set of annotations may comprise at least one annotation relating to a time, a geographic location, a place, a topic, a visual feature, a caption, an event, a media quality of the particular media content item, or a user statistic relating to the particular media content item.

Figure 46:
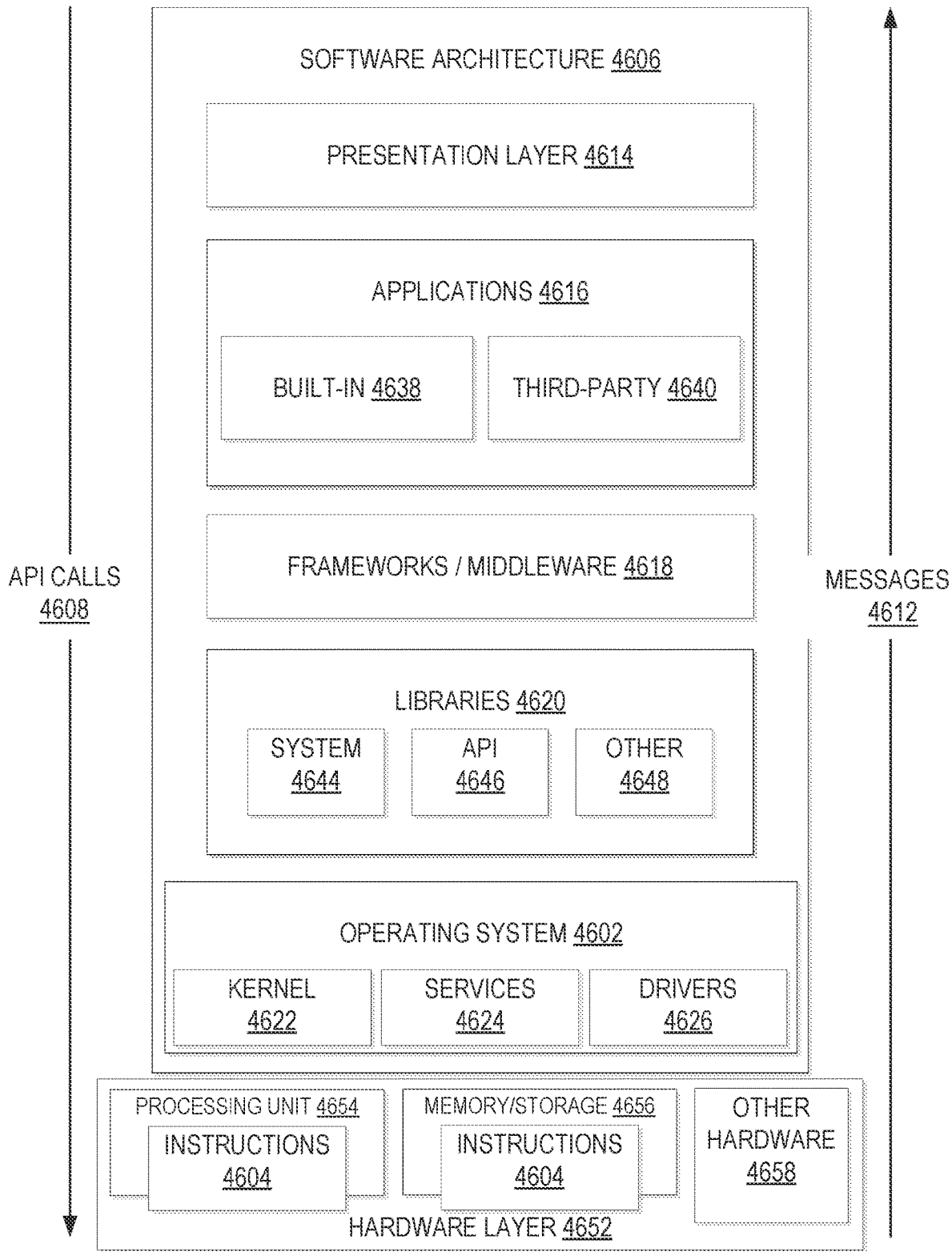
FIG. 46 is a block diagram illustrating a representative software architecture in accordance with some embodiments described in this document.

FIG. 46 is a block diagram illustrating an example software architecture 4606, which may be used in conjunction with various hardware architectures in this document described. FIG. 46 is a non-limiting example of a software architecture and it will be appreciated that many other architectures may be implemented to facilitate the functionality described in this document. The software architecture 4606 may execute on hardware such as machine 4700 of FIG. 47 that includes, among other things, processors 4704, memory 4714, and I/O components 4718. A representative hardware layer 4652 is illustrated and can represent, for example, the machine 4700 of FIG. 47. The representative hardware layer 4652 includes a processing unit 4654 having associated executable instructions 4604. Executable instructions 4604 represent the executable instructions of the software architecture 4606, including implementation of the methods, components and so forth described in this document. The hardware layer 4652 also includes memory and/or memory/storage modules 4656, which also have executable instructions 4604. The hardware layer 4652 may also comprise other hardware 4658.

In the example architecture of FIG. 46, the software architecture 4606 may be conceptualized as a stack of layers where each layer provides particular functionality. For example, the software architecture 4606 may include layers such as an operating system 4602, libraries 4620, applications 4616 and a presentation layer 4614. Operationally, the applications 4616 and/or other components within the layers may invoke application programming interface (API) calls 4608 through the software stack and receive messages 4612 in response to the API calls 4608. The layers illustrated are representative in nature and not all software architectures have all layers. For example, some mobile or special purpose operating systems 4602 may not provide frameworks/middleware 4618, while others may provide such a layer. Other software architectures may include additional or different layers.

The operating system 4602 may manage hardware resources and provide common services. The operating system 4602 may include, for example, a kernel 4622, services 4624 and drivers 4626. The kernel 4622 may act as an abstraction layer between the hardware and the other software layers. For example, the kernel 4622 may be responsible for memory management, processor management (e.g., scheduling), component management, networking, security settings, and so on. The services 4624 may provide other common services for the other software layers. The drivers 4626 are responsible for controlling or interfacing with the underlying hardware. For instance, the drivers 4626 include display drivers, camera drivers, Bluetooth® drivers, flash memory drivers, serial communication drivers (e.g., Universal Serial Bus (USB) drivers), Wi-Fi®, drivers, audio drivers, power management drivers, and so forth depending on the hardware configuration.

The libraries 4620 provide a common infrastructure that is used by the applications 4616 and/or other components and/or layers. The libraries 4620 provide functionality that allows other software components to perform tasks in an easier fashion than to interface directly with the underlying operating system 4602 functionality (e.g., kernel 4622, services 4624 and/or drivers 4626). The libraries 4620 may include system libraries 4644 (e.g., C standard library) that may provide functions such as memory allocation functions, string manipulation functions, mathematical functions, and the like. In addition, the libraries 4620 may include API libraries 4646 such as media libraries (e.g., libraries to support presentation and manipulation of various media format such as MPREG4, 11264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 4620 may also include a wide variety of other libraries 4648 to provide many other APIs to the applications 4616 and other software components/modules.

The frameworks/middleware 4618 (also sometimes referred to as middleware) provide a higher-level common infrastructure that may be used by the applications 4616 and/or other software components/modules. For example, the frameworks/middleware 4618 may provide various graphic user interface (GUI) functions, high-level resource management, high-level location services, and so forth. The frameworks/middleware 4618 may provide a broad spectrum of other APIs that may be utilized by the applications 4616 and/or other software components/modules, some of which may be specific to a particular operating system 4602 or platform.

The applications 4616 include built-in applications 4638 and/or third-party applications 4640. Examples of representative built-in applications 4638 may include, but are not limited to, a contacts application, a browser application, a book reader application, a location application, a media application, a messaging application, and/or a game application. Third-party applications 4640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 4640 may invoke the API calls 4608 provided by the mobile operating system (such as operating system 4602) to facilitate functionality described in this document.

The applications 4616 may use built-in operating system functions (e.g., kernel 4622, services 4624 and/or drivers 4626), libraries 4620, and frameworks/middleware 4618 to create user interfaces to interact with users of the system. Alternatively, or additionally, in some systems, interactions with a user may occur through a presentation layer, such as presentation layer 4614. In these systems, the application/component "logic" can be separated from the aspects of the application/component that interact with a user.

Figure 47:
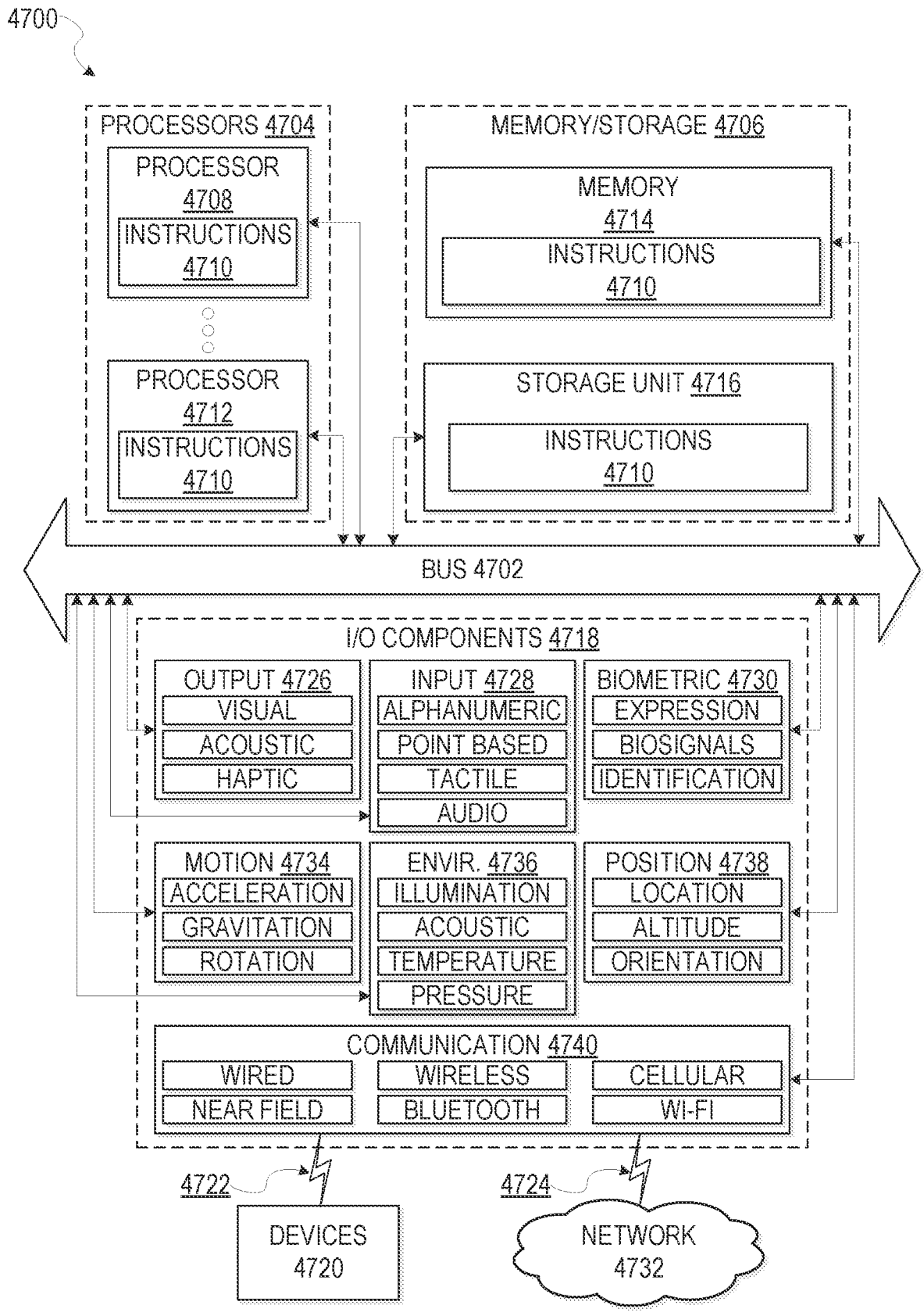
FIG. 47 is a block diagram illustrating components of a machine, in accordance with some embodiments described in this document, able to read instructions from a machine-readable medium (e.g., a machine-readable storage medium) and perform any one or more of the methodologies discussed in this document.

FIG. 47 is a block diagram illustrating components of a machine 4700, according to some example embodiments, able to read instructions 4604 from a machine-readable medium (e.g., a machine-readable storage medium) and perform any one or more of the methodologies discussed in this document. Specifically, FIG. 47 shows a diagrammatic representation of the machine 4700 in the example form of a computer system, within which instructions 4710 (e.g., software, a program, an application, an applet, an app, or other executable code) for causing the machine 4700 to perform any one or more of the methodologies discussed in this document may be executed. As such, the instructions 4710 may be used to implement modules or components described in this document. The instructions 4710 transform the general, non-programmed machine 4700 into a particular machine 4700 programmed to carry out the described and illustrated functions in the manner described. In alternative embodiments, the machine 4700 operates as a standalone device or may be coupled (e.g., networked) to other machines. In a networked deployment, the machine 4700 may operate in the capacity of a server machine or a client machine in a server-client network environment, or as a peer machine in a peer-to-peer (or distributed) network environment. The machine 4700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 4700 capable of executing the instructions 4710, sequentially or otherwise, that specify actions to be taken by machine 4700. Further, while only a single machine 4700 is illustrated, the term "machine" shall also be taken to include a collection of machines 4700 that individually or jointly execute the instructions 4710 to perform any one or more of the methodologies discussed in this document.

The machine 4700 may include processors 4704, memory/storage 4706, and I/O components 4718, which may be configured to communicate with each other such as via a bus 4702. Processors 4704 may comprise of a single processor or, as shown, comprise of multiple processors (e.g., processors 4708 to 4712). The memory/storage 4706 may include a memory 4714, such as a main memory, or other memory storage, and a storage unit 4716, both accessible to the processors 4704 such as via the bus 4702. The storage unit 4716 and memory 4714 store the instructions 4710 embodying any one or more of the methodologies or functions described in this document. The instructions 4710 may also reside, completely or partially, within the memory 4714, within the storage unit 4716, within at least one of the processors 4704 (e.g., within the processor 4708's cache memory), or any suitable combination thereof, during execution thereof by the machine 4700. Accordingly, the memory 4714, the storage unit 4716, and the memory of processors 4704 are examples of machine-readable media.

The I/O components 4718 may include a wide variety of components to receive input, provide output, produce output, transmit information, exchange information, capture measurements, and so on. The specific I/O components 4718 that are included in a particular machine 4700 will depend on the type of machine. For example, portable machines such as mobile phones will likely include a touch input device or other such input mechanisms, while a headless server machine will likely not include such a touch input device. It will be appreciated that the I/O components 4718 may include many other components that are not shown in FIG. 47. The I/O components 4718 are grouped according to functionality merely for simplifying the following discussion and the grouping is in no way limiting. In various example embodiments, the I/O components 4718 may include output components 4726 and input components 4728. The output components 4726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 4728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 4718 may include biometric components 4730, motion components 4734, environment components 4736, or position components 4738 among a wide array of other components. For example, the biometric components 4730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 4734 may include acceleration sensor components (e.g., accelerometer), gravitation sensor components, rotation sensor components (e.g., gyroscope), and so forth. The environment components 4736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 4738 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 4718 may include communication components 4740 operable to couple the machine 4700 to a network 4732 or devices 4720 via coupling 4722 and coupling 4724 respectively. For example, the communication components 4740 may include a network interface component or other suitable device to interface with the network 4732. In further examples, communication components 4740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 4720 may be another machine or any of a wide variety of peripheral devices (e.g., a peripheral device coupled via a Universal Serial Bus (USB)).

Moreover, the communication components 4740 may detect identifiers or include components operable to detect identifiers. For example, the communication components 4740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 4740, such as, location via Internet Protocol (IP) geo-location, location via Wi-Fi® signal triangulation, location via detecting a NFC beacon signal that may indicate a particular location, and so forth.

It will be understood that various components used in this context (e system components) refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A hardware component is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 4708 or a group of processors 4704) may be configured by software (e.g., an application 4616 or application portion) as a hardware component that operates to perform certain operations as described in this document. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 4708 or other programmable processor 4708. Once configured by such software, hardware components become specific machines (or specific components of a machine 4700) uniquely tailored to perform the configured functions and are no longer general-purpose processors 4704. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described in this document. Considering embodiments in which hardware components are temporarily configured (e.g., programmed), each of the hardware components need not be configured or instantiated at any one instance in time. For example, where a hardware component comprises a general-purpose processor 4708 configured by software to become a special-purpose processor, the general-purpose processor 4708 may be configured as respectively different special-purpose processors (e.g., comprising different hardware components) at different times. Software accordingly configures a particular processor 4708 or processors 4704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described in this document may be performed, at least partially, by one or more processors 4704 that are temporarily configured (e.g., by software) or permanently configured to perform the relevant operations. Whether temporarily or permanently configured, such processors 4704 may constitute processor-implemented components that operate to perform one or more operations or functions described in this document. As used in this document, "processor-implemented component" refers to a hardware component implemented using one or more processors 4704. Similarly, the methods described in this document may be at least partially processor-implemented, with a particular processor 4708 or processors 4704 being an example of hardware. For example, at least some of the operations of a method may be performed by one or more processors 4704 or processor-implemented components. Moreover, the one or more processors 4704 may also operate to support performance of the relevant operations in a "cloud computing" environment or as a "software as a service" (SaaS). For example, at least some of the operations may be performed by a group of computers (as examples of machines 4700 including processors 4704), with these operations being accessible via a network 4732 (e.g., the Internet) and via one or more appropriate interfaces (e.g., an application program interface (API)). The performance of certain of the operations may be distributed among the processors 4704, not only residing within a single machine 4700, but deployed across a number of machines 4700. In some example embodiments, the processors 4704 or processor-implemented components may be located in a single geographic location (e.g., within a home environment, an office environment, or a server farm). In other example embodiments, the processors 4704 or processor-implemented components may be distributed across a number of geographic locations.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described in this document. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described in this document. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described in this document. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described in this document may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described in this document. As used in this document, "processor-implemented component" refers to a hardware component implemented using one or more processors. Similarly, the methods described in this document may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm), in other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used in this document, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:
    determining, by one or more processors, a set of attributes for a collection of media content items based on at least one annotation of a media content item included in the collection of media content items;
    storing, on a new index of a search service index and by the one or more processors, the collection of media content items in association with the set of attributes, the storing comprising swapping a current index of the search service index with the new index such that a previous version of the collection stored on the current index is replaced by the collection stored on the new index;
    searching, on the new index of the search service index and by the one or more processors, a plurality of collections of media content items based on a search request from a client device to identify a set of collections of interest, the plurality of collections of media content items including the stored collection of media content items; and
    providing, by the one or more processors, search response to the client device based on the searching, the search response identifying the stored collection of media content items as part of the set of collections of interest.

2. The method of claim 1, wherein the determining the collection of media content items from the plurality of media content items comprises determining the plurality of collections of media content items, the method further comprising:
    reconciling, by the one or more processors, the plurality of collections by merging at least two collections of media content items, in the plurality of collections, based on a similarity between at least one attribute of each of the at least two collections of media content items.

3. The method of claim 1, wherein the determining the collection of media content items from the plurality of media content items comprises determining the plurality of collections of media content items, the method further comprising:
    reconciling, by the one or more processors, the plurality of collections by removing a particular collection of media content items, from the plurality of collections, based on a similarity between at least one attribute of the particular collection of media content items and another collection of media content items in the plurality of collections.

4. The method of claim 1, wherein the determining the collection of media content items from the plurality of media content items comprises determining the plurality of collections of media content items, the method further comprising:

filtering, by the one or more processors, the plurality of collections of media content items to produce a filtered plurality of collections of media content items that includes media content items having at least a minimum set of attributes.

5. The method of claim 1, wherein the determining the collection of media content items from the plurality of media content items comprises:
selecting a highlight media content item, from the collection of media content items, to represent the collection of media content items based on a set of scores associated with the highlight media content item.

6. The method of claim 1, further comprising:
prior to searching the plurality of collections of media content items, indexing, by the one or more processors, the plurality of collections of media content items.

7. The method of claim 1, wherein the set of attributes include at least one of a caption associated with the collection of media content items, a place name associated with the collection of media content items, and a category associated with the collection of media content items.

8. The method of claim 1, further comprising:
associating, by the one or more processors, a particular media content item with a cluster based on a set of annotations generated for the particular media content item, the cluster grouping together certain media content items within the plurality of media content items based on a cohesiveness of geographic location and time.

9. The method of claim 8, wherein the cluster groups together the certain media content items further based on a relationship between at least one annotation of each of the certain media content items, the relationship relating to at least one of geographical proximity, time proximity, similarity of caption terms, similarity of a place, similarity of a visual feature, similarity of an event, similarity of a metric, or similarity of a user statistic.

10. The method of claim 1, further comprising:
generating, by the one or more processors, a set of annotations for a particular media content item, in a plurality of media content items, based on metadata of the particular media content item.

11. The method of claim 1, wherein the at least one annotation relates to a particular time, a particular geographic location, a place, a topic, a visual feature, a caption, an event, a media quality of a particular media content item, or a user statistic relating to the particular media content item.

12. A system comprising:
one or more processors;
one or more machine-readable mediums storing instructions that, when executed by the one or more processors, cause the system to perform operations comprising:
determining a set of attributes for a collection of media content items based on at least one annotation of a media content item included in the collection of media content items;
storing, on a new index of a search service index, the collection of media content items in association with the set of attributes, the storing comprising swapping a current index of the search service index with the new index such that a previous version of the collection stored on the current index is replaced by the collection stored on the new index;
searching, on the new index of the search service index, a plurality of collections of media content items based on a search request from a client device to identify a set of collections of interest, the plurality of collections of media content items including the stored collection of media content items; and
providing search response to the client device based on the searching, the search response identifying the stored collection of media content items as part of the set of collections of interest.

13. The system of claim 12, wherein the determining the collection of media content items from the plurality of media content items comprises determining the plurality of collections of media content items, the operations further comprising:
reconciling the plurality of collections by merging at least two collections of media content items, in the plurality of collections, based on a similarity between at least one attribute of each of the at least two collections of media content items.

14. The system of claim 12, wherein the determining the collection of media content items from the plurality of media content items comprises determining the plurality of collections of media content items, the operations further comprising:
reconciling the plurality of collections by removing a particular collection of media content items, from the plurality of collections, based on a similarity between at least one attribute of the particular collection of media content items and another collection of media content items in the plurality of collections.

15. The system of claim 12, wherein the determining the collection of media content items from the plurality of media content items comprises determining the plurality of collections of media content items, the operations further comprising:
filtering the plurality of collections of media content items to produce a filtered plurality of collections of media content items that includes media content items having at least a minimum set of attributes.

16. The system of claim 12, wherein the determining the collection of media content items from the plurality of media content items comprises:
selecting a highlight media content item, from the collection of media content items, to represent the collection of media content items based on a set of scores associated with the highlight media content item.

17. The system of claim 12, wherein the set of attributes include at least one of a caption associated with the collection of media content items, a place name associated with the collection of media content items, and a category associated with the collection of media content items.

18. The system of claim 12, wherein the operations further comprise:
generating, by the one or more processors, a set of annotations for a particular media content item, in a plurality of media content items, based on metadata of the particular media content item.

19. The system of claim 12, wherein the at least one annotation relates to a particular time, a particular geographic location, a place, a topic, a visual feature, a caption, an event, a media quality of a particular media content item, or a user statistic relating to the particular media content item.

20. A non-transitory machine-readable medium storing instructions that, when executed by one or more computer processors, cause the one or more processors to perform operations comprising:

determining a set of attributes for a collection of media content items based on at least one annotation of a media content item included in the collection of media content items;

storing, on a new index of a search service index, the collection of media content items in association with the set of attributes, the storing comprising swapping a current index of the search service index with the new index such that a previous version of the collection stored on the current index is replaced by the collection stored on the new index;

searching, on the new index of the search service index, a plurality of collections of media content items based on a search request from a client device to identify a set of collections of interest, the plurality of collections of media content items including the stored collection of media content items; and providing search response to the client device based on the searching, the search response identifying the stored collection of media content items as part of the set of collections of interest.

* * * * *

UNITED STATES PATENT AND TRADEMARK OFFICE
CERTIFICATE OF CORRECTION

PATENT NO. : 11,720,640 B2  
APPLICATION NO. : 17/559166  
DATED : August 8, 2023  
INVENTOR(S) : Al Majid et al.

Page 1 of 1

It is certified that error appears in the above-identified patent and that said Letters Patent is hereby corrected as shown below:

On the Title Page

On page 4, in Column 1, under "U.S. Patent Documents", Line 10, delete "2008/0021421" and insert --2008/0214210-- therefor On page 4, in Column 1, under "U.S. Patent Documents", Line 32, delete "2009/0008971" and insert --2009/0089710-- therefor On page 4, in Column 2, under "U.S. Patent Documents", Line 73, delete "2012/0001651" and insert --2012/0165100-- therefor Signed and Sealed this  
Twelfth Day of August, 2025

Coke Morgan Stewart  
*Acting Director of the United States Patent and Trademark Office*